US012743401B2

(12) United States Patent
Desmarets

(10) Patent No.: US 12,743,401 B2
(45) **Date of Patent: *Sep. 22, 2026**

(54) CONSTRUCTION OF DATABASE SCHEMA MODELS FOR DATABASE SYSTEMS AND REST API'S

(71) Applicant: IntegrIT S.A./N.V., Beersel (BE)

(72) Inventor: Pascal Desmarets, Beersel (BE)

(73) Assignee: IntegrIT S.A./N.V., Beersel (BE)

(*) Notice: Subject to any disclaimer, the term of this patent is extended or adjusted under 35 U.S.C. 154(b) by 0 days.

This patent is subject to a terminal disclaimer.

(21) Appl. No.: 19/026,638

(22) Filed: Jan. 17, 2025

(65) Prior Publication Data

US 2025/0156380 A1 May 15, 2025

Related U.S. Application Data

(63) Continuation-in-part of application No. 17/313,018, filed on May 6, 2021, now Pat. No. 12,242,436, (Continued)

(30) Foreign Application Priority Data

Mar. 2, 2016 (EP) .................................... 16158241
Sep. 30, 2016 (EP) .................................... 16191695

(51) Int. Cl.
*G06F 16/21* (2019.01)
*G06F 16/16* (2019.01)
(Continued)

(52) U.S. Cl.
CPC .......... *G06F 16/213* (2019.01); *G06F 16/168* (2019.01); *G06F 16/212* (2019.01); *G06F 16/248* (2019.01); *G06F 16/252* (2019.01)

(58) Field of Classification Search
CPC .... G06F 16/213; G06F 16/168; G06F 16/212; G06F 16/248; G06F 16/252; G06F 16/211
(Continued)

(56) References Cited

U.S. PATENT DOCUMENTS 5,596,746 A 1/1997 Shen et al.
6,665,677 B1 * 12/2003 Wotring ................ G06F 16/258
(Continued)

FOREIGN PATENT DOCUMENTS

EP 0910024 A2 4/1999
EP 2827262 A1 1/2015

OTHER PUBLICATIONS

Chuck Murray, Oracle SQL Developer Data Modeler User's Guide, Release 4.0 E48205-06, pp. 1-172, Aug. 2014 (Year: 2014).*
(Continued)

*Primary Examiner* — Cam Y T Truong
(74) *Attorney, Agent, or Firm* — Ipsilon USA—NLO

(57) ABSTRACT

The present invention relates to a method for constructing a schema model by a user by means of a computer, comprising the steps of: providing a set of collections and/or optionally one or more relationships linking at least two of said set of collections; editing one or more of said set of collections, each of which associated with a schema definition displayed by a single table on an entity relationship diagram on a graphical interface on said computer and comprising at least one object and/or one field; automatically generating by means of said computer said schema model; wherein said set of collections comprises at least one collection comprising a nested object comprising lower level nodes, each of said lower level nodes being displayed on the single table of the
(Continued)

collection that comprises said nested object, wherein the schema model is generated for a database system or a REST API or a GraphQL API.

12 Claims, 65 Drawing Sheets

Related U.S. Application Data which is a continuation of application No. 16/081,173, filed as application No. PCT/EP2016/079953 on Dec. 6, 2016, now Pat. No. 11,100,059.

(51) Int. Cl.
*G06F 16/248* (2019.01)
*G06F 16/25* (2019.01)

(58) Field of Classification Search
USPC .......................................................... 707/803
See application file for complete search history.

(56) References Cited

U.S. PATENT DOCUMENTS

2005/0132276 A1* 6/2005 Panditharadhya ..... G06Q 10/10 715/275
2006/0173873 A1* 8/2006 Prompt ................. G06F 16/284
2010/0131565 A1 5/2010 Weinberg et al.
2012/0005241 A1 1/2012 Ortel
2015/0161199 A1* 6/2015 Pinko .................... G06F 9/4488 707/736
2017/0090876 A1* 3/2017 Hale ..................... G06F 16/245
2017/0185593 A1* 6/2017 Kumar ................ G06F 16/2228

OTHER PUBLICATIONS

Chuck Marray, OracleSQL Developer Data Modeler User's Guide Release 4.0 E48205-06, pp. 1-172, Aug. 2014 (Year: 2014).
Anonymous: "Data Modeler Concepts and Usage", Jun. 1, 2010, XP055350802, Retrieved from the Internet, Seciton 1.3.1, p. 22-3.d, p. 31-1.7, Figure 11.

* cited by examiner

Source: Google Trends: http://www.google.com/trends/explore?q=xml+api#q=xml%20api%2C%20json%20api

```
db.createCollection( "contacts", {
  validator: { $or:
    [
      { phone: { $type: "string" } },
      { email: { $regex: /@mongodb\.com$/ } },
      { status: { $in: [ "Unknown", "Incomplete" ] } }
    ]
  }
} )
```

Fig. 13
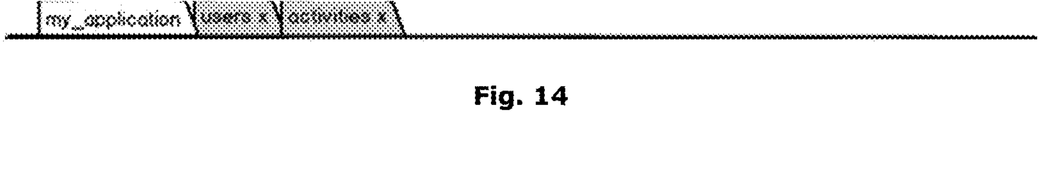
Fig. 14
Diagram
DB Definitions
Documentation
Fig. 15
Fig. 16

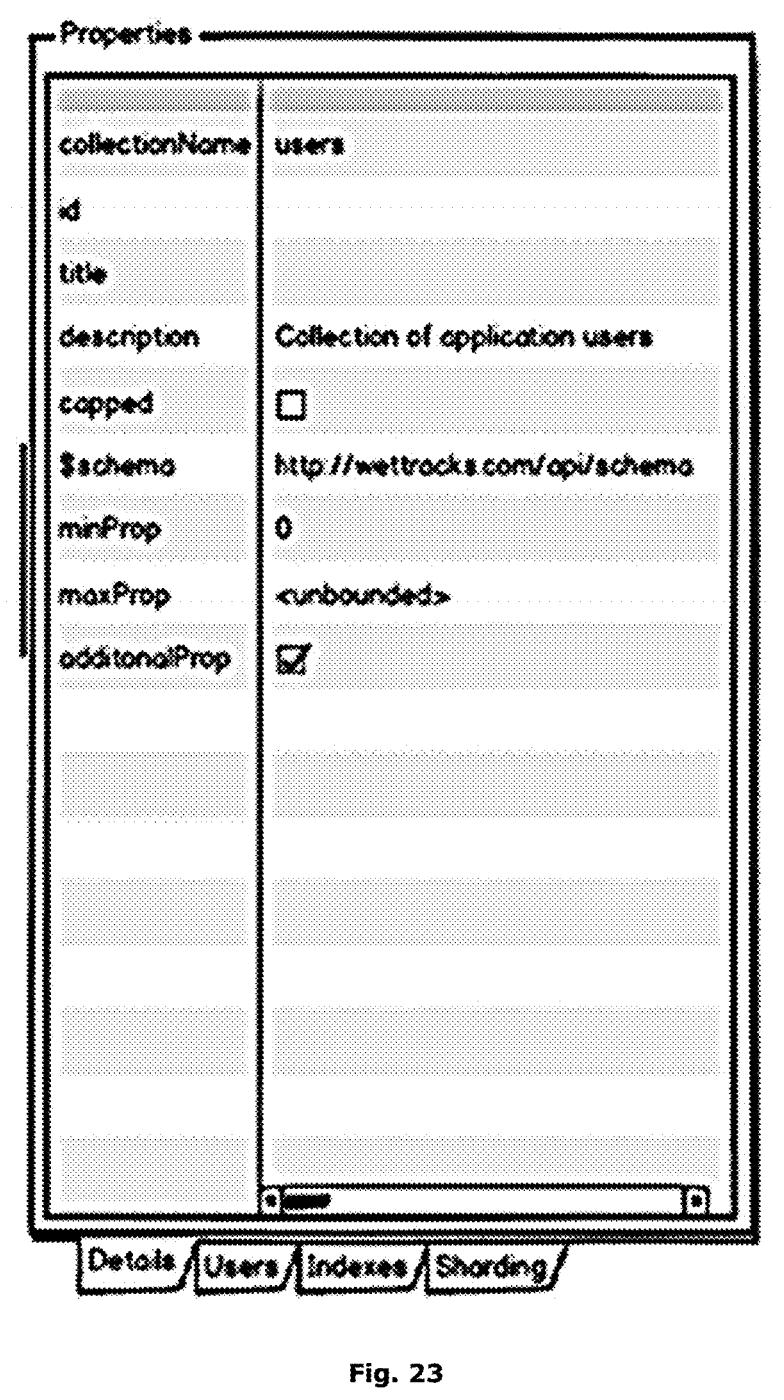

Properties

| | |
|---|---|
| collectionName | users |
| id | |
| title | |
| description | Collection of application users |
| capped | ☐ |
| $schema | http://wettrocks.com/api/schema |
| minProp | 0 |
| maxProp | <unbounded> |
| additonalProp | ☑ |

Details Users Indexes Sharding

Fig. 23

Properties
reference
type
string
name
last_name
id
title
description
Last name of the user
dependencies
required
primaryKey
*foreignKey
*foreignMaster
default
minLength
maxLength
pattern
*format
enumeration
sample
John Doe Properties
reference
type multiple
name amount
id
title
description Price as number or te
dependencies
required
primaryKey
*foreignKey
*foreignMaster
default
(0)
(1)
type string
minLength
maxLength
pattern
*format
enumeration
sample 10 bucks JSON Schema display configuration Widths Min:

Max:

Distances

Parent/Child:

Child/Child:

Show in diagram

Descriptions, limit width:

Details

OK

Cancel

Predefined

Load/Save

Relationship: countriesRegions
Parent: collection countries, field code, cardinality 1
Child: collection regions, field iso_country, cardinality 1..n Relationship: New Relationship(5)
Parent: collection regions, field continent, cardinality 1..n
Child: collection countries, field continent, cardinality 1

Fig. 62

| adminArea - array | | |
|---|---|---|
| id | pk | <str> |
| name | | <str> |
| level | | <num> |
| ⊟AAR_adminArea | | <arr> |
| ⊟[0] | | <doc> |
| id | pk | <str> |
| name | | <str> |
| level | | <num> |
| ⊟AAR_adminArea | | <arr> |
| ⊟[0] | | <doc> |
| id | pk | <str> |
| name | | <str> |
| level | | <num> |

| adminArea - array | | |
|---|---|---|
| id | pk | <str> |
| name | | <str> |
| level | | <num> |
| ⊟AAR_adminArea | | <arr> |
| ⊟[0] | | <doc> |
| id | pk | <str> |
| name | | <str> |
| level | | <num> |
| ⊟AAR_adminArea | | <arr> |
| ⊟[0] | | <doc> |
| id | pk | <str> |
| name | | <str> |
| level | | <num> |

Suggest denormalization ✖

Table selection:

- ☐ model
  - ☐ table1
  - ☐ table2
  - ☐ ...
  - ☐ table N

Parameters:

Favor embedding: ○ Sub-document in child ○ Array in parent ◉ Both

Cascading levels: 3

Recursion levels: 3

Cancel Submit

```
{
    "_id": ObjectId("507f1f77bcf86cd799439011"),
    "username": "string sample",
    "contact": {
        "phone": "123-456-7890",
        "email": "xyw@example.com"
    },
    "access": {
        "level": 5,
        "group": "dev"
    },
    "status": "active"
}
```

| embedding | | |
|---|---|---|
| _id | pk | <oid> |
| username | | <str> |
| ⊟ contact | | <obj> |
| phone | | <str> |
| email | | <str> |
| ⊟ access | | <obj> |
| level | | <num> |
| group | | <str> |
| status | | <str> |

Operations ERD | Schema ERD | Type Definitions | GraphQL SDL

CONSTRUCTION OF DATABASE SCHEMA MODELS FOR DATABASE SYSTEMS AND REST API'S

TECHNICAL FIELD

The invention pertains to the technical field of database systems, in particular to the construction of database schema models for database systems and REST APIs. In addition, the invention pertains to the technical field of GraphQL API's.

BACKGROUND

While many present day data storage and data management systems still rely exclusively on relational database systems and the related special-purpose programming language SQL (Structured Query Language), many application developers are moving to database systems that are "Not Only SQL", i.e. NoSQL (originally: "Non SQL") database systems such as MongoDB, Couchbase, CouchDB, Amazon DynamoDB, RavenDB, Microsoft Azure DocumentDB, MarkLogic, and EnterpriseDB. Indeed, NoSQL databases offer important advantages for application developers: flexibility, fast and easy evolution, as well as the ability to start storing and accessing data with minimal effort and setup. This is equally true for JSON-based document-store databases, a class of NoSQL databases relating to the present invention that is organized as document store (as opposed to relational database) and relying on JSON (JavaScript Object Notation), a format also commonly used in implementing REST APIs (Application Programming Interfaces) and web services (where REST stands for Representational State Transfer, and a system complying to the so-called constraints of REST is called RESTful).

Just as for traditional databases, the planning and set-up of a NoSQL database is in need of a database model (or map) to help evaluate design options before the actual implementation. Said database model helps to think through the implications of different alternatives, to recognize potential hurdles before committing sizable amounts of development effort, and to plan ahead in order to minimize later rework. In the end, a modeling process aided by a good database model accelerates development, increases the quality of the application, and reduces execution risks.

Further, said database model is particularly important in the case of a NoSQL database, since it is able to handle the increased complexity associated with the data and the (typically, very large) scale of NoSQL databases. Additionally, it circumvents the NoSQL-related problem that data structures are only tacitly described in the application code, forcing anyone involved in the database management to examine the code, which is obviously not the most productive way to engage in a fruitful dialog between analysts, architects, designers, developers, and DBAs.

Despite the popularity of NoSQL databases, there remains a need in the art for a good database model for this type of databases. The existing traditional methods and tools of classic relational databases cannot be applied to NoSQL and REST APIs. As a matter of fact, this argument has sometimes been used as a justification against the adoption and implementation of NoSQL solutions.

An earlier attempted solution tried to model a JSON data store, but did not provide a graphical way to represent the collections' schemas. Another attempted solution provided a tree-like structured diagram for a single collection, but did not offer a way to graphically model the multiple collections that make up a database. Another attempted solution defines 'visual design' of a REST API as 'described in a human readable format—in other words, plain text' and hence fails to provide a diagram.

EP 0 910 024 discloses a method, and associated system, for converting object oriented models into an actual operable database. The method and system automatically convert object oriented models into inputs that are compatible with a target product data manager platform. A problem with EP 0 910 024 is that it is limited to relational database schema models, lacking means to handle typical features of NoSQL environments, such as nested objects.

U.S. Pat. No. 5,596,746 discloses an algorithm for transforming data base schema information to object modeling notation utilizing meta models of the data base tables and the target object modeling notation respectively to bridge the gap between the data base schema representation and the object model representation. Similar to EP 0 910 024, U.S. Pat. No. 5,596,746 is limited to relational database schema models, and hence lacks mechanisms to handle NoSQL-related features such as nested objects.

The present invention aims to resolve at least some of the problems mentioned above. The invention thereto aims to provide a method and system to graphically model schemas for NoSQL document databases and REST API's which is both functional and clear, thereby facilitating the work of, and the dialog between analysts, architects, designers, developers, testers, and operators of systems that are based on such technologies.

SUMMARY OF THE INVENTION

In the database community, there is an increasing need for database management systems (DMBSs) that support a combination of data models, relational and non-relational, in a single DBMS platform. Hence, a convergence between RDBMSes and other data models (e.g., a NoSQL document database) takes place, creating the need for multi-model database schema models, and new methods suitable for the construction of a broad range of database schema models, including classical as well as multi-model database schema models. The present invention is directed at such methods and systems for constructing a database schema model. Specifically, this invention relates to a GUI-supported construction method of database schema models that extends the typical, table-like representation of collections, known, e.g., from both RDBMSes and NoSQL document databases, with the concept of nesting of one or more objects within a single collection with table-like representation, which is not possible with state of the art methods. Editing of said single collection is enabled by a related tree diagram, representing the schema definition of said single collection.

In this regard, the present invention provides a very general solution to a known problem, such as the basic example problem discussed below in the section "Detailed description" (Example 2), which provides a clear and accessible introduction to the overall concept.

In a first aspect, the present invention concerns a method for constructing a database schema model by a user by means of a computer, comprising the steps of:

(a) providing a set of collections and optionally one or more relationships linking at least two of said set of collections;

(b) editing one or more of said set of collections, each of which associated with a schema definition displayed by a single table on an entity relationship diagram on a graphical interface on said computer and comprising at least one object and/or one field, said schema definition editable via a tree diagram on said graphical user interface on said computer;

(c) automatically generating by means of said computer said database schema model for a database system or a REST API;

characterized in that, said set of collections comprises at least one collection comprising a nested object editable via said tree diagram with two levels or more.

According to separate aspects, the invention may relate to applications for a database system, a REST API, or a combination thereof.

According to a further aspect, which is not intended to limit the scope of the invention in any way, the invention may relate to GraphQL instead of database systems and/or instead of REST APIs. The latter is described in more detail in EXAMPLE 5 below. Such embodiments may, e.g., relate to any or any combination of the following example features, which may be considered both separately and in their combination:

(Beginning of Listing of Example Features Relating to GraphQL)

Visual Representation of Nested Structures in GraphQL Schema Definitions and their Corresponding Requests and Responses Computer-implemented methods for visually representing GraphQL schema definitions, requests, and responses in a hierarchical and unified format.

The creation, via a user interface, of a GraphQL schema definition comprising a plurality of types, wherein each type includes fields, and optionally associated arguments, directives, and optionally nested references to other types.

The creation, via one or more GraphQL operations, including queries, mutations, or subscriptions, each comprising a request and an associated response schema, both represented as JSON objects with potentially nested structures.

The processing of the GraphQL schema definition to identify references among types, fields, arguments, and directives, and to determine the structural sequence of fields and nested elements based on the schema.

The processing of the GraphQL operations to extract structures.

The extraction of the structure of requests, representing the references and relationships between the operation's fields, input objects, variables, and arguments.

The extraction, optionally, of hierarchical structure of responses, representing the schema structure and sequence of JSON objects returned by the server.

The generation of a unified visual representation comprising one or more representations.

The generation of a representation of the schema definition, wherein each type, its fields, arguments, directives, and nested types are represented within a single entity-relationship diagram box, as optionally nested hierarchical sub-elements, while maintaining links to their independent definitions, and ordering the displayed fields and nested elements to mirror the structural sequence of a JSON response corresponding to the schema.

The generation, optionally, of a hierarchical representation of the schema definition, wherein each type, its fields, arguments, directives, and optionally nested types are represented in a tree diagram as nested hierarchical sub-elements, while maintaining links to their independent definitions.

The generation, optionally, of a representation of requests, displayed as an optionally nested structure within the operation's associated entity-relationship diagram box.

The generation, optionally, of a representation of responses, displayed as an optionally nested structure within the operation's associated entity-relationship diagram box.

The presentation, on a display device, of the unified visual representation of the schema definition, requests, and responses, wherein the optionally hierarchical structures of schema elements, requests, and responses visually represent the structural correspondence between the schema and JSON requests and responses.

The provision of user interaction means with the visual representation to modify the schema, requests, or responses, wherein any modification to the visual representation is synchronized with the underlying textual definition of the GraphQL schema, requests, and responses.

wherein the hierarchical visual representation supports GraphQL Schema Definition Language constructs, including scalar types, object types, input types, enum types, union types, and interface types, and displays their respective fields, arguments, extends, and directives in a single visual entity-relationship diagram box.

The provision of a hierarchical visual representation, that, optionally, dynamically updates to display fragments, unions, or interfaces as inline hierarchical sub-elements when referenced within other types or queries.

The provision of a real-time synchronization mechanism between the optionally hierarchical visual representation and a JSON representation of the schema, such that changes to the schema are reflected in both the visual representation and the JSON representation.

The provision of a hierarchical visual representation that is, optionally, optimized for developer usability by presenting the schema elements in a structure that mimics the order and hierarchy of JSON responses returned by a GraphQL API query.

The automated generation of a syntactically correct GraphQL schema definition language file in GraphQL Schema Language format, including all types, fields, arguments, directives, and operations derived from the visual representation.

The automated validation of the automatically generated GraphQL schema definition language file for compliance with GraphQL syntax rules and the detection of errors or inconsistencies in the schema prior to export.

The provision of a means for reverse-engineering. This may, e.g., relate to reverse-engineering an existing GraphQL schema definition language file by parsing the schema to extract its types, fields, arguments, directives, and nested references, and generating a corresponding hierarchical visual representation of the schema, requests, and responses in the form of an entity-relationship diagram.

The provision of a means for forward-engineering.

(End of Listing of Example Features Relating to GraphQL)

Hereby, said "set" may comprise one or more collections. In a preferred embodiment of the method according to the present invention, said set of collections comprises at least two collections, and step (b) comprises generating and/or editing one or more relationships linking at least two collections belonging to said set of collections via said entity relationship diagram on said graphical user interface on said computer; and at least one of said one or more relationships links a first field belonging to a first collection belonging to said set of collections to a second field belonging to a second collection belonging to said set of collections.

In the context of the present invention, the term "collection" comprises any table-like representation of data within the context of databases and database management systems (DBMSes), such as a collection in a NoSQL document database, a REST-API-object, or a "classical" table in a relational database management system (RDBMS). Regardless of whether said collections are generated by the user via said graphical user interface or whether said collections have been imported from another format relating to, e.g., a NoSQL document database, a REST API or a RDBMS, the graphical interactive representation on a graphical user interface of said collections and their interrelationship is an integral part of the present invention.

For said graphical interactive representation of said collections, a tree diagram is used. Hereby, the term "tree diagram" comprises any tree-like structured diagram, said diagram comprising nodes and branches. Hereby, one of said nodes is a root node situated at a so-called top level, connected to different nodes at a lower level by branches, which nodes, in their turn, may be connected to branches at further lower levels. Hereby, the number of levels is counted excluding the top level. A node which is not connected to nodes at lower level is called a leaf node. Each node may comprise a field or an object, whereby an object at a given level comprises various nodes at a level lower than said given level. A nested object is therefore an object that is contained as node within a larger collection, whereby the presence of said nested object results in two levels or more for the tree diagram of said larger collection. In prior art methods, said nested object is not found in RDBMSes, since these assume "flat tables", limited to a table title at top level, and one or more attributes at the first level. This is a result of the fact that in RDBMSes, said nodes in said tree diagram all concern fields and not objects, whereby fields are by default leaf nodes. Likewise, said tree diagram with said two levels or more is found in NoSQL document DBMSes.

The interaction of the user with said graphical interactive representation of said collections allows for a variety of interactive manipulations, such as the editing of properties of each node, the rearranging of nodes within a collection, and the moving of nodes from one collection to another collection.

For said graphical interactive representation of said relationships, an entity relationship diagram is used. Hereby, the term "entity relationship diagram" is to be interpreted in the context of databases and DBMSes, with entities corresponding to collections, and relationships between a first field in a first collection and a second field in a second collection. This type of graphical interactive representation is partially found in RDBMS and NoSQL prior art methods. A related graphical representation is found in many RDBMSes, whereby each collection (a flat table) is a single entity that relates to one or more other collections through a foreign key relationship, involving the concepts of a foreign key and a primary key familiar to the skilled person. In a preferred embodiment of the present invention, two collections can be linked by more than one relationship. Hereby, said relationships may concern foreign key relationships but may also concern foreign master relationships. Linking collections by more than one relationship is desirable in view of the presence of nested objects, which typically exhibit a multitude of relationships, for instance due to the application of so-called denormalization as described in this document. Since RDBMSes do not allow nesting objects, the need for more than one relationship between two collections is much less felt. Furthermore, the reason that said graphical interactive representation of said relationships is not found in NoSQL prior art methods lies in the fact that NoSQL models are inherently schema-less, addressing collections mainly as isolated entities, without a useful way of defining relationships between a first field of a first collection and a second field of a second collection.

Also the interaction of the user with said graphical interactive representation of said relationships allows for a variety of interactive manipulations, such as the editing of properties of each relationship and the rearranging of collections in order to generate new relationships or to edit existing relationships.

Overall, the present invention has the advantage of enabling to handle a very general structure, such as a JSON structure, through improved structure (less collections, only "true" relationships) (particularly in the ERD), sequence preservation (both in the ERD and the tree diagram), interaction (both in the ERD and the tree diagram), and indentation (reflecting nesting) (particularly in the ERD), while state of the art methods fail to do so. The result of the present method is not only more true to the corresponding general structure, such as a JSON document definition, but is also more compact in terms of ERD, allowing for a clearer and overall better overview. Additionally, also the interactive editing of the database schema model is more flexible, with richer interaction thanks to the choice between the ERD and the tree diagram. This is discussed in more detail in Example 2. A related advantage is the ability to better handle polymorphism, as discussed in more detail in Example 4.

A key advantage of an embodiment according to the present invention is that the user is no longer constrained by the limitations of NoSQL and RDBMS prior art methods, allowing both object nesting and versatile relationship generation. In a preferred embodiment, individual collections (which may concern NoSQL collections but may also concern REST-API-objects) are editable in JSON schema definition via a tree diagram, while the relationships between collections are simultaneously editable via said entity relationship diagram. In a further preferred embodiment, this leads a single integrated interactive representation as illustrated, e.g., by FIGS. 60, 61, 63, 65, 66 and 68, greatly improving the efficiency with which said database schema model can be constructed and edited. Also, by providing such an explicit representation, the present invention overcomes the problem with known NoSQL methods, wherein data structures are only tacitly described in the application code.

A related advantage of the present invention is the ability to model relationships. As mentioned above, NoSQL models are inherently schema-less, addressing collections mainly as isolated entities, without possibility of defining relationships between a first field of a first collection and a second field of a second collection. The latter is particularly problematic when a user wants to import a relational database schema model in a NoSQL environment, or, for any reason, desires to follow a RDBMS-like approach by linking collections. While the foreign key relationships comprised in the relational database schema typically play a key role in the organization of data, there is no concept available in NoSQL to model these or other relationships. In a preferred embodiment of the present invention, the database schema model allows to generate and edit foreign key relationships, and, related, leave foreign key relationships intact when importing relational database schema models.

In a further preferred embodiment of the method according to the present invention, said one or more objects comprise an array and/or a sub-document. This allows to incorporate structures known from NoSQL. Also, this plays an important role in the denormalization detailed below.

In a further preferred embodiment, said database schema model is formatted according to any or any combination of the following formats: JSON Schema, YAML, Mongoose, RAML, Swagger, Apache AVRO or Parquet. This has the advantage of providing the user with a format matching his/her specific needs.

According to another preferred embodiment, said automatic generation in step (d) automatically generates a human-readable manual for said database schema model based at least partly on a logical link defined by said one or more relationships. This has the advantage of improving the automated generation of manuals, by incorporating the information that is inherent to the relationships in the generated manual.

In another preferred embodiment, said first collection and said second collection are linked by more than one relationship generated and/or edited in step (c). This has the advantage of further alleviating restrictions imposed by traditional prior art methods. As opposed to NoSQL DBMSes, the database schema model according to the present invention explicitly supports relationships between collections; as opposed to RDBMSes, two collections can be related by more than one relation. In a related further embodiment, on top of that, said first field belonging to said first collection is linked to both said second field and a third field belonging to said second collection by a first and second relationship, respectively. By allowing multiple relationships associated with a single field, which are preferably shown in a single integrated graphical interactive representation, flexibility for the end user is increased.

In a further preferred embodiment, said providing in step (a) comprises generating one or more of said set of collections on said graphical user interface on said computer. The user may thus choose to generate one or more collections directly on screen, and construct a database schema model from there. This has the advantage that the user can manually intervene in said construction, or even construct a database schema model from scratch.

According to a further embodiment, said providing in step (a) comprises denormalizing a relational database schema model provided by the user, said denormalizing comprising extracting said set of collections from a set of tables belonging to said relational database schema model, as well as any foreign key relationships belonging to said relational database schema model, for inclusion in said database schema model. This has the practical advantage that a user desiring to construct a database with NoSQL features such as said database schema model may take an existing available relational database schema model as a starting point, as is often desirable in practice. By "importing" both the collections and the foreign key relationships, all vital aspects of the relational database are carried over to said database schema model to be constructed. According to a related further embodiment, said denormalizing in step (a) further comprises processing a foreign key relationship between a parent collection comprising a primary key and a child collection comprising a foreign key, said processing comprising any or any combination of the following: including a nested sub-document in said child collection, said nested sub-document comprising one or more relationships to said parent collection; including a nested array in said parent collection, said nested array comprising one or more relationships to said child collection. This has the advantage that the features of the relational database are translated "without loss" to a context with nested objects, which is not possible in a RDBMS. This can be done according to different strategies listed above and commented in the detailed description below. In a sense, this translation comprises an "upgrade" of the original relational database schema model, in that the original collections and relationships are preserved, while the possibilities of interacting with said database have been extended to include NoSQL functionality. In a further related embodiment, said processing of a foreign key relationship comprises selecting one or more denormalization preferences on said graphical user interface on said computer, said denormalization preferences comprising any or any combination of the following: a table selection; an embedding preference with respect to said including of said nested sub-document in said child collection and/or of said nested array in said parent collection; a maximum number of cascading levels, a maximum number of recursion levels. This has the advantage that the user may customize the way in which the original relational database is translated into said database schema model, aiming either for a more concise result (e.g. with less tables, less nesting, less recursions) or a more extensive result (more tables, more nesting, more recursions).

In a second aspect, the present invention provides a computer-implemented method for constructing a database schema model upon input of a user according to a method according to the present invention, comprising the steps of:

(i) receiving a set of collections and/or optionally one or more relationships linking at least two of said set of collections, optionally upon input of said user via a graphical user interface;

(ii) receiving edit instructions for each of said set of collections with respect to a schema definition upon input of said user via a tree diagram on said graphical user interface;

(iii) generating upon request of said user said database schema model for a database system or a REST API;

characterized in that, said set of collections comprises at least one collection comprising a nested object editable via said tree diagram with two levels or more.

In a preferred embodiment of said computer-implemented method, said set of collections comprises at least two collections, and step (ii) comprises receiving generate and/or edit instructions with respect to one or more relationships linking at least two collections belonging to said set of collections upon input of said user via said entity relationship diagram on said graphical user interface. Furthermore, at least one of said one or more relationships links a first field belonging to a first collection belonging to said set of collections to a second field belonging to a second collection belonging to said set of collections.

In a third aspect, the present invention provides a use of a database schema model constructed with a method according to any of the presented invention in a database system or a REST API. In a preferred embodiment thereof, said database system is any or any combination of the following: MongoDB, Couchbase, CouchDB, Amazon DynamoDB, RavenDB, Microsoft Azure DocumentDB, MarkLogic, EnterpriseDB, Oracle SQL, MySQL, PostgreSQL, Microsoft SQL, Oracle for NoSQL, ElasticSearch, Snowflake, FinchDB, MariaDB, IBM Cloudant, Google Cloud Datastore, Cassandra, BerkeleyDB, RethinkDB, Mapr. This has the advantage of providing a superior user experience due to the integration of the present invention in the working environment to which it applies, yielding improved convenience for the user.

In a fourth aspect, the present invention provides a computer system for constructing a database schema model upon input of a user, said computer system comprising a processor, non-volatile memory, program code present on said memory for execution on said processor, a graphical interface, wherein said computer is configured to carry out a computer-implemented method according to the present invention. The advantages of such a computer system are similar to those of the related computer-implemented method.

DESCRIPTION OF FIGURES

The present invention may be more readily described by reference to the accompanying drawings in which:

FIG. 13 shows a sixth view of the central pane, displaying an example database documentation.

FIG. 14 shows example top tabs of the central pane.

FIG. 15 shows the first set of bottom tabs of the central pane (corresponding to the database top tab).

FIG. 16 shows the second set of bottom tabs of the central pane (corresponding to the collection top tabs).

FIG. 23 shows a first view of the properties at collection level.

Figure 62:
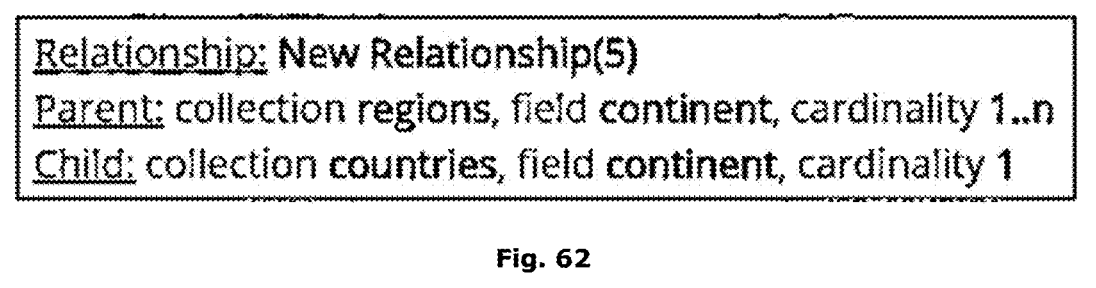

FIG. 62 illustrates a foreign key relationship.

DETAILED DESCRIPTION OF THE INVENTION

Figure 1:
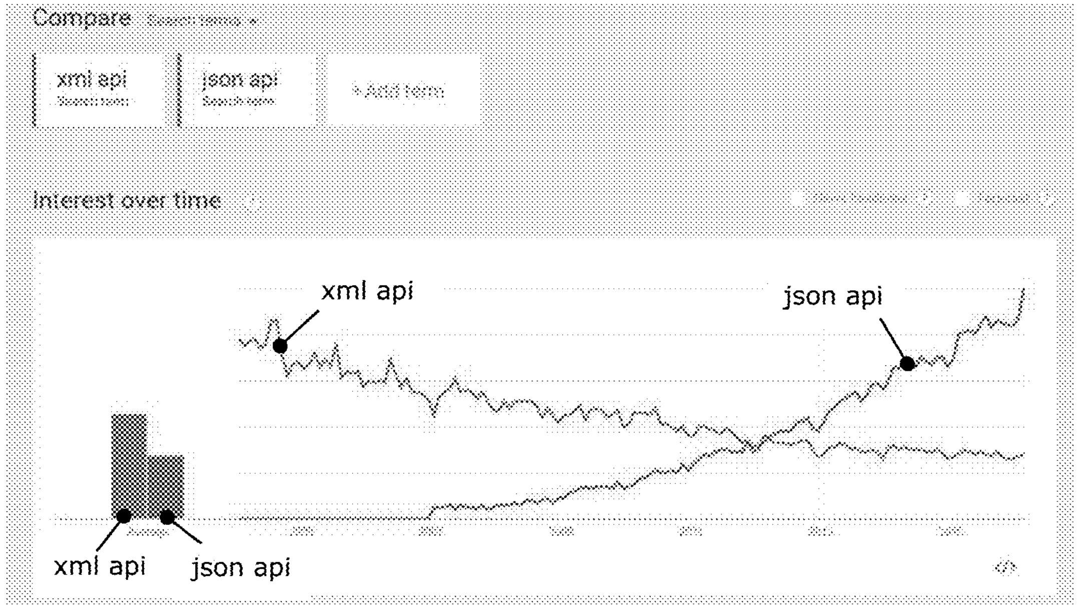
FIG. 1 illustrates trends in the rise of JSON.

In this document, the term "document" relates to a collection; particularly, data belonging to a collection is typically stored in one or more documents, preferably JSON documents. In this document, both "foreign master relationships" and "foreign key relationships" fall under the class of "relationships", whereby foreign master relationships concern relationships that are not foreign key relationships. Furthermore, the acronym "GUI" stands for Graphical User Interface.

A key aim of the present invention is to provide programmers, application developers and database managers with a powerful new method to construct database models. To this end, the present invention combines the graphical interactive representation of collections in a tree diagram with the graphical interactive representation of relationships between collections in an entity relationship diagram. Together, these graphical representations provide both the schema model and the documentation of that model. The present invention facilitates the work of, and the dialog between a variety of users such as analysts, architects, designers, developers, testers, and operators of systems that are based on such technologies. In a preferred embodiment of the present invention, schemas and documentation can be generated in a variety of machine-based formats such as JSON Schema, Mongoose, collection definition scripts, RAML, Swagger, YAML, Apache AVRO or Parquet, or human-readable formats. In a further preferred embodiment, the user is facilitated in the importing of a relational database schema model and its translation into a database schema model according to the present invention.

According to another aspect of the current invention, which is not intended to limit the scope in any way, the present invention provides a method and system to graphically model a database schema model for NoSQL document databases and REST APIs. Specifically, it provides a method and system to combine 1) the graphical representation of collections (in NoSQL Document Databases) or objects (in REST APIs) through an Entity Relationship diagram, with 2) the graphical representation of the JSON Schema definition of said collections or objects through a Tree-like structured diagram. Together, these graphical representations provide the schema model of a NoSQL document database or REST API, and the documentation of that model. The invention is further described by the following non-limiting example which further illustrates the invention, and is not intended to, nor should it be interpreted to, limit the scope of the invention.

According to another aspect of the current invention, not intended to limit the scope in any way, the present invention provides a method for graphically modeling schemas for NoSQL document databases and REST APIs, comprising providing a graphical representation of one or more collections or one or more objects, and simultaneously providing a graphical representation of a JSON Schema definition of said collections or objects through a tree-like structured diagram.

According to another aspect of the current invention, not intended to limit the scope in any way, the present invention provides a system for graphically modeling schemas for NoSQL document databases and REST APIs, said system configured to provide a graphical representation of one or more collections or one or more objects, and to simultaneously provide a graphical representation of a JSON Schema definition of said collections or objects through a tree-like structured diagram.

The present invention is directed to the construction of database schema models, whereby the database schema model may be a simple known representations such as a single JSON document, but also a "multi-model" database schema model, as long as the database schema model exhibits said nesting corresponding to a tree diagram with two levels or more. Hereby, the term "multi-model" refers to a database schema model that comprises features of both relational databases and NoSQL databases, and hence cannot be assigned to only one of these categories, as is currently emerging in the database community.

The present invention relates to database schema models such as the ones considered by MongoDB and other NoSQL systems such as DynamoDB. Hereby, several specific terms are borrowed from the context of existing systems, in particular MongoDB. However, it is important to note that the terms used in the present invention are chosen in correspondence to MongoDB merely for clarity's sake, and are not to be interpreted as limiting the invention in any way. Hence, the terms "collection", "document", "field", "subdocument" and "array" are similar yet not necessarily identical to the counterpart terms of the same name in MongoDB and many other NoSQL systems and/or RDBMSes. Moreover, some NoSQL systems use different terms; particularly DynamoDB adopts a different naming convention. Also Couchbase and Cassandra adopt a slightly different terminology. The following list of counterpart terms is included for clarity's sake, without limiting the present invention in any sense.

| SOL | MongoDB | DynamoDB | Couchbase | Cassandra |
|---|---|---|---|---|
| Table | Collection | Table | Bucket | Table |
| Record | Document | Item | Document | Row |
| Column | Field | Attribute | Field | Column |
| Primary Key | ObjectID | Hash (& range) | Object ID | Primary Key |
| Index | Index | Index | Index | Index |
| Partition | Shard | Partition | Cluster | Partition |
| View | View | Global Secondary Index | View | Materialized View |
| n/a | Sub-document | Map | Map | Map |
| Array | Array | List | List | List |

Following are five examples relating to embodiments of the present invention. While Example 1 is directed to a multitude of aspects of the invention, Example 2 considers the simple case of a single JSON document with nesting, for which the invention equally applies. Example 3 relates to referencing in denormalization. Example 4 considers an example ERD and associated tree diagram according to an embodiment of the present invention. Example 5 considers example embodiments wherein the database schema model is generated for a GraphQL API.

Example 1

1. Project Drivers

The project relates to the activities of IntegrIT (doing business as Hackolade).

1.1 References

The following reading may be useful to inform the reader of the context:

JSON and BSON specifications: http://json.org/and http://bsonspec.org/

JSON Schema specification: http://json-schema.org/

Trends in the rise of JSON, cfr FIG. 1

1.2 the User Problem and Context of the Project 1.2.1 Schema-Less NoSQL Databases JSON-based document-store NoSQL databases (MongoDB, Couchbase, CouchDB, Amazon DynamoDB, MarkLogic, OrientDB, RavenDB, Microsoft Azure DocumentDB, EnterpriseDB, etc., cfr. http://db-engines.com/en/ranking/document+store) promote the concept of a "schema-less" approach with many advantages, such as the flexibility for the schema to easily evolve over time, or the ability to start storing and accessing data without first defining a schema.

The data transformations and data characteristics in NoSQL systems are not often mapped in models. The tools for such modeling haven't existed. The data isn't often captured in models; it's tacit in the code. To understand how the data is stored and read, the code has to be examined. The model is essentially "implicit" to the programmers and developers working on the system: it is in their brains and then is manifested in the code of the system.

The advantage of a schema-less DBMS is that one can start storing and accessing data without first defining a formal schema. While this sounds great, and certainly facilitates a speedy start to a data project, experience shows that a lack of forethought is usually followed by a lot of afterthought. As data volumes grow and access times become significant, thought needs to be given to re-organizing data in order to speed up access and update, and sometimes to change tradeoffs between the speed, consistency, and atomicity of various styles of access. It is also commonly the case that patterns emerge in the data's structure, and the realization grows that, although the DBMS demands no particular data schema, much of the data being stored has some significant schema in common.

1.2.2 Use of Schema Definitions

A data model of some kind is vital: definitions, elements, transformations, and relationships still need to be understood and documented. There is no way for an organization to gain a 360° view of their entire business at all data, system, application, decision process, transaction, and customer levels without some sort of models or maps to explain them.

A database model gives the opportunity to play with database design options on paper, on a whiteboard, or in a drawing tool, before one has to worry about the syntax of data definitions, data already stored, or application logic. It's a great way to think through the implications of data organization, and/or to recognize in advance important patterns in the data, before committing to any particular design. It's a lot easier to redraw part of a model than to recreate a database schema, move significant quantities of data around, and change application code.

A schema is a vehicle for describing content to determine compliance. It is often used under the covers as part of vetting content for entry into a program by a validation process.

It can also be effectively used as a tool for creating correct content and accelerating the correction process. This is especially true for content created by people or generated through interactive systems, where dynamic processes are part of the content definition.

Sometimes using a schema or other data definition capability is viewed as "locking down" a system, or making it inflexible. However, with the expressiveness of JSON Schema, the purpose of the schema is not to limit flexibility, but rather to correctly express only what is required from the data content, create useful notices of corrections required, and leave the remaining content to the programs to interpret.

1.2.3 Benefits of Using a Schema

Validation can be done with program logic. In fact, a significant portion of many programs is used to validate inputs to be processed by the program. This includes start-up command processing, reading configuration files, reading data files, receiving messages, and accepting user input.

In each case, the goal of the validation process is to determine whether the input content is correct and complete before invoking further processing. The use of a schema, and a corresponding validation function to apply the schema to the content, allows the validation function to be processed by a purpose-built function rather than bespoke coding. The schema definition, being in the domain of the data definition, is more expressive and easier to understand than program logic.

With simplified definition and maintenance, it is more likely that the validation will be:

More complete, since the time to produce schema content can be less than the time to write program logic to perform this task.

More readable. Reading program logic for validation often requires reading a mix of stream processing, type checking, and expression checking logic. Reading a schema focuses on the data representation, without the other processing logic mixed in.

Used correctly by others producing content. Often program logic is a black box, or the documentation limited, making determining all valid inputs for particular elements, or whether elements are required or optional, difficult to ascertain without excellent documentation being provided. Providing a schema to other parties makes the task of creating correct content to provide to the program much easier. Not all content benefits equally from using a schema. A program that only has one or two configuration options doesn't have a significant amount of validation code, and a program that expects free form content may not have enough definition to be very useful. Selecting the programs, and places in the program, where schema definitions can be of benefit is a design choice.

1.2.4 JSON Schema

In the message exchange space, JSON is commonly used in implementing REST web services. Its broad use reflects the flexibility of JSON-formatted content to support iterative definition for message exchanges between systems, coexistence with a range of technologies, and ease of understanding.

In addition to configuration files, many programs also have data management requirements. While some programs have requirements suitable for using databases, others have more modest needs and are better suited to the flexibility of using JSON files. However, for JSON-suited programs, as the content expands (both in the structure of the data model as well as the amount of data stored), there is greater risk of data consistency errors. Also, as is the case with many configuration files, updates to the data may be made with text editing tools and are subject to errors—often minor. Finding these errors is often more work than correcting them—a missing comma, misplaced closing } or ], or a typo in a keyword. Fortunately, there are two tools that address this well:

JSON syntax checkers, which find syntax errors.

JSON Schema, and its affiliated validation tools, which find content errors.

As JSON has gained support across a broad array of programming languages/runtime platforms, the use of JSON formatted files for configuration files and similar uses is now an available option for many projects.

JSON and JSON Schema are strong foundational technologies, with many avenues for building interesting and useful capabilities around them.

1.3 Goals

The present invention allows analysts, solution designers, architects, developers, and database administrators to visually design, model, define, and create documentation for the schemas of JSON Document-based NoSQL databases and REST APIs. The related application enables users to do with JSON documents what has been possible respectively for relational databases and for XML documents.

The graphical interface will let the user visualize and maintain a diagram of the model collections and their relationships, as well as the content of the collections. The outputs of the model will be: JSON documents and JSON-Schema v4-compliant JSON (http://json-schema.org/documentation.html), scripts (MongoDB, Mongoose, etc.), and a detailed documentation of the model in HTML (as well as Markdown, PDF and RTF formats) as well as RAML and Swagger.

The application will store in a local or central repository the properties of one or more documents defined by the user, as well as their relationships, if any.

2. Requirements 2.1 Business Requirements 2.1.1 Domain

Figure 2:
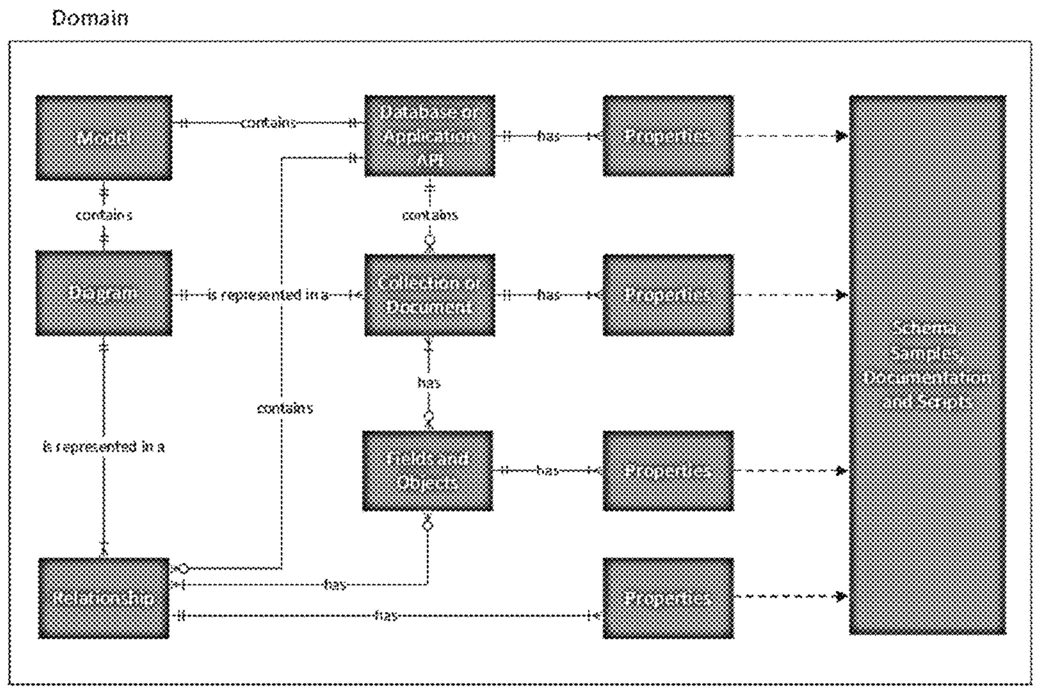
FIG. 2 illustrates the domain model.

Cfr FIG. 2. The application lets a user create a Model. The model is made of one Diagram for one Database (for MongoDB and other NoSQL systems) or Application (for REST APIs.) A Database is made of one or more Collections (or Documents) and possibly of logical Relationships between them. A Collection is made of Fields and Objects. It is possible for Relationships to exist between certain Fields of different Collections. The Database and each of its Collection, and each of the Collection's Fields and Objects, as well as Relationships, all have Properties. Collections and Relationships are represented in a Diagram. Diagram and properties lead to outputs in the form of Schemas, Samples, Scripts, and Documentation files.

2.1.2 Business Use Cases

- Storage/retrieval of models
  - User creates a new model from scratch
  - User retrieves a previously stored model
  - User saves or cancel changes since last save
  - User saves a model under a new name as a new stored version of the previously saved model
- Modeling
  - User defines a database and its properties
    - Graphically adapts layout of entities
  - User creates Collections, their content and related properties
    - Graphically
    - With a grid
    - Through the text-based editing of JSON Schema
  - User creates Relationships and their properties
  - User can visualize and print different outputs:
    - Model Entity Relationship (ER) diagram.
    - Collection Document Type Definition (DTD) diagram
    - JSON document sample
    - JSON Schema.
    - HTML/Markdown/PDF/RTF documentation.
    - MongoDB Script
    - Mongoose Schema.
    - Scripts for other database vendors
- Utilities
  - Where-used capability
  - JSON validator
  - JSON Schema validator
  - Model comparison
  - Reverse engineer a database schema
  - Reverse engineer JSON documents and JSON Schema files
  - Repository
  - License key management
  - Check for and install updates to the application Regarding said Model Entity Relationship (ER) diagram, note that strictly speaking the concept of ER is generally related to relational databases, and not JSON or NoSQL databases. For ease of communication however, the concept is adopted in this document, but the vocabulary will not transpire in the application.

Regarding said Collection Document Type Definition (DTD) diagram, note that strictly speaking, the concept of DTD is related to XML and not JSON. For ease of communication however, the concept is adopted in this document, but the vocabulary will not transpire in the application.

2.2 Functional Requirements 2.2.1 User Interface 2.2.1.1 Application Sections

Figure 3:
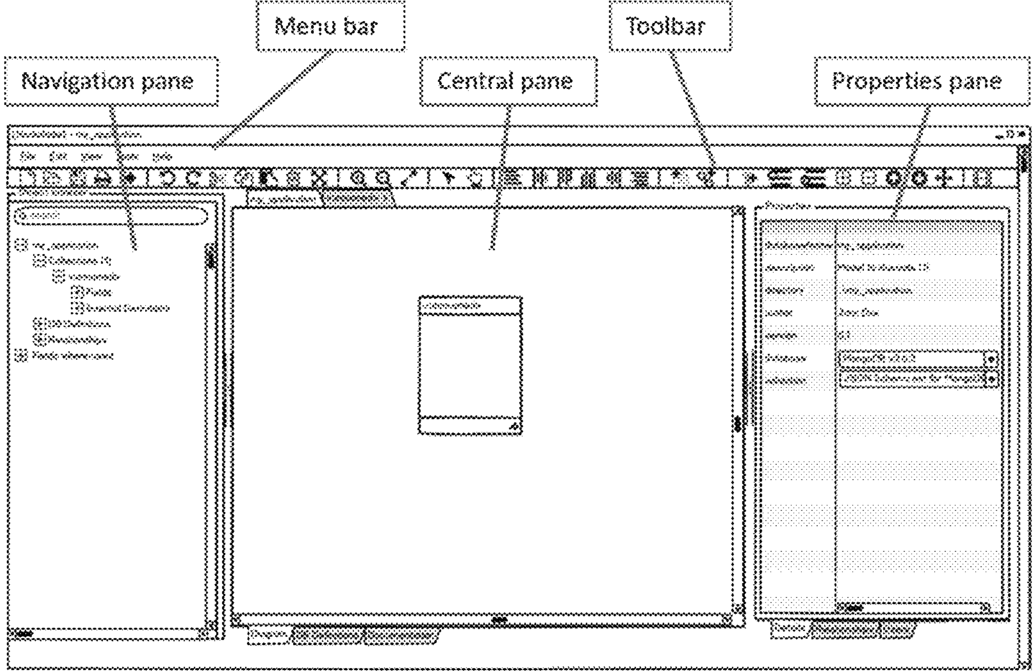
FIG. 3 illustrates the graphical user interface.

The application screen is divided in several sections, cfr. FIG. 3.

The different sections are described below.

2.2.1.1.1 Menu Bar

Figures 4, 5:
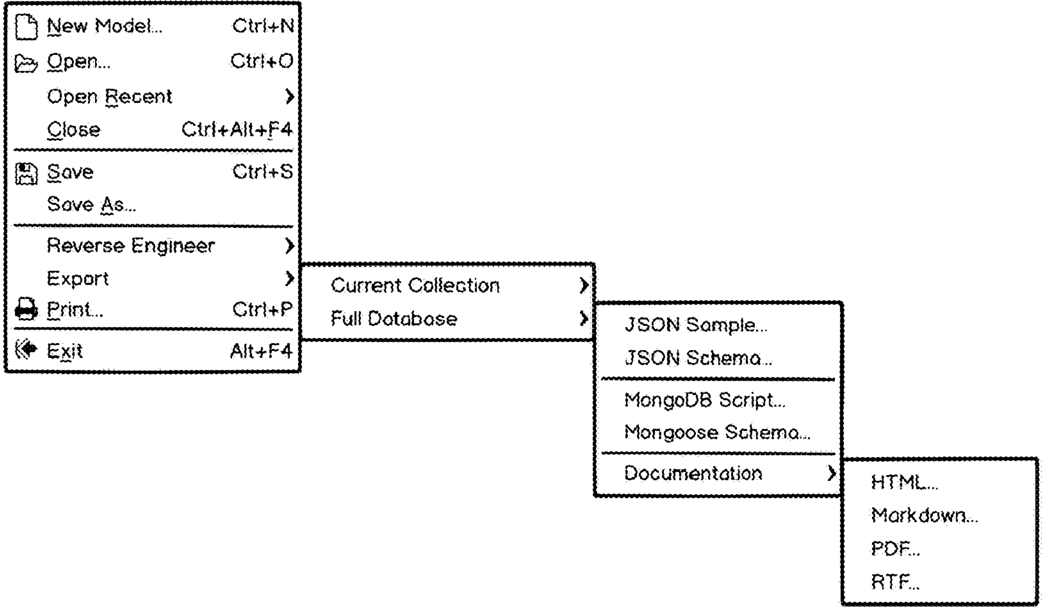
FIG. 4 shows the menu bar.
FIG. 5 shows the file menu (item: Export).

Cfr FIG. 4. These menus are configured in JSON documents to allow easy changes in relevant properties without programming impact. Options are greyed out if unavailable to the user in the application context.

Each menu option is described in further detail below.

2.2.1.1.1.1 File Menu

Figure 6:
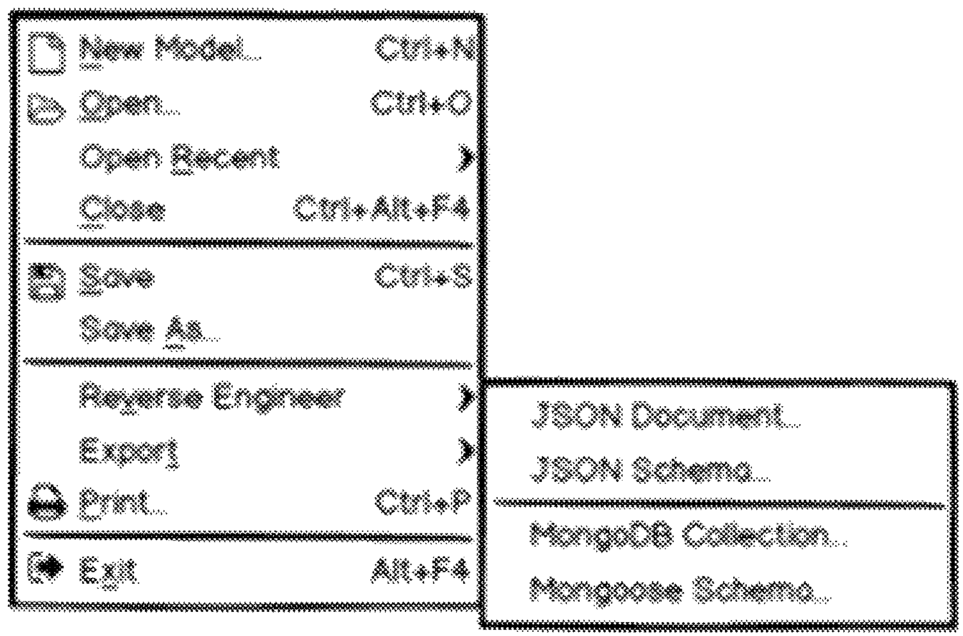
FIG. 6 shows the file menu (item: Reverse Engineer).

Cfr FIGS. 5 & 6.

| | |
|---|---|
| New Model | Create a new model. If current model has unsaved changes, user is prompted to Save (or Save As if current model has never been saved. ) In a later phase, user may be prompted to choose a model type (MongoDB, other NoSQL, REST API, basic JSON, . . . ) |

-continued

| | |
|---|---|
| Open . . . | Retrieve an existing model. |
| Open Recent | Show sub-menu of last 5 model names opened. |
| Close | Close model. |
| Save | Save all changes to model. |
| Save As . . . | Save the model to a different repository name. |
| Reverse Engineer . . . | Select a JSON Document file, JSON Schema file, or Mongoose Schema on the file system, so the application can derive some collection properties. Specify access to a database, so the application can derive some collection properties. |
| Export | Export, for the current collection or for the entire database, the JSON Sample, JSON Schema, MongoDB Script, Mongoose schema, other NoSQL database, or documentation. |
| Print . . . | Print the current diagram. |
| Exit | Quit the application. |

2.2.1.1.2 Object Browser

Figure 7:
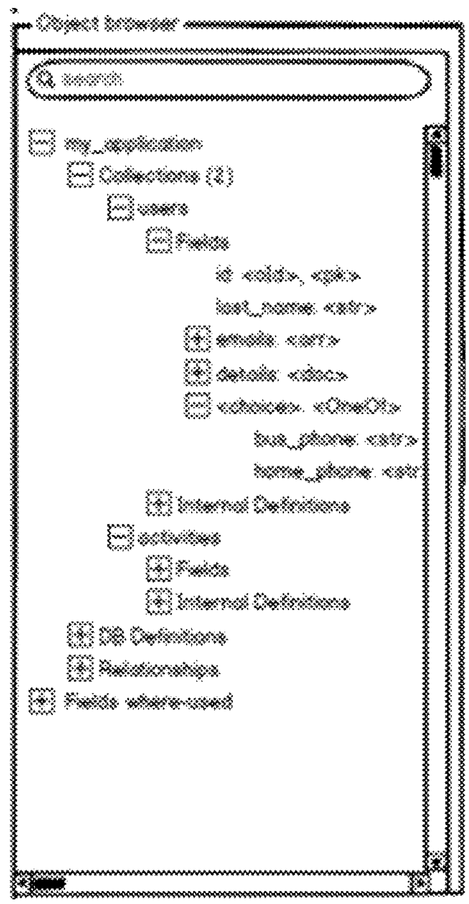
FIG. 7 shows the Object browser.

Cfr FIG. 7. This pane is dynamically constructed based on entities created in the Central and Properties panes. It provides a structured outline view of the model, and a quick access to elements of the model. This pane also includes a search bar as well as a 'where used' view of the elements.

If the data does not fit in the pane, vertical and horizontal scroll bars appear.

When elements in the pane are clicked, the central and the properties pane display more information.

Thanks to a toggle in the View menu, the user may choose to make the pane disappear (in order to provide more space for the central pane), or to make it re-appear.

2.2.1.1.3 Central Pane

Figure 8:
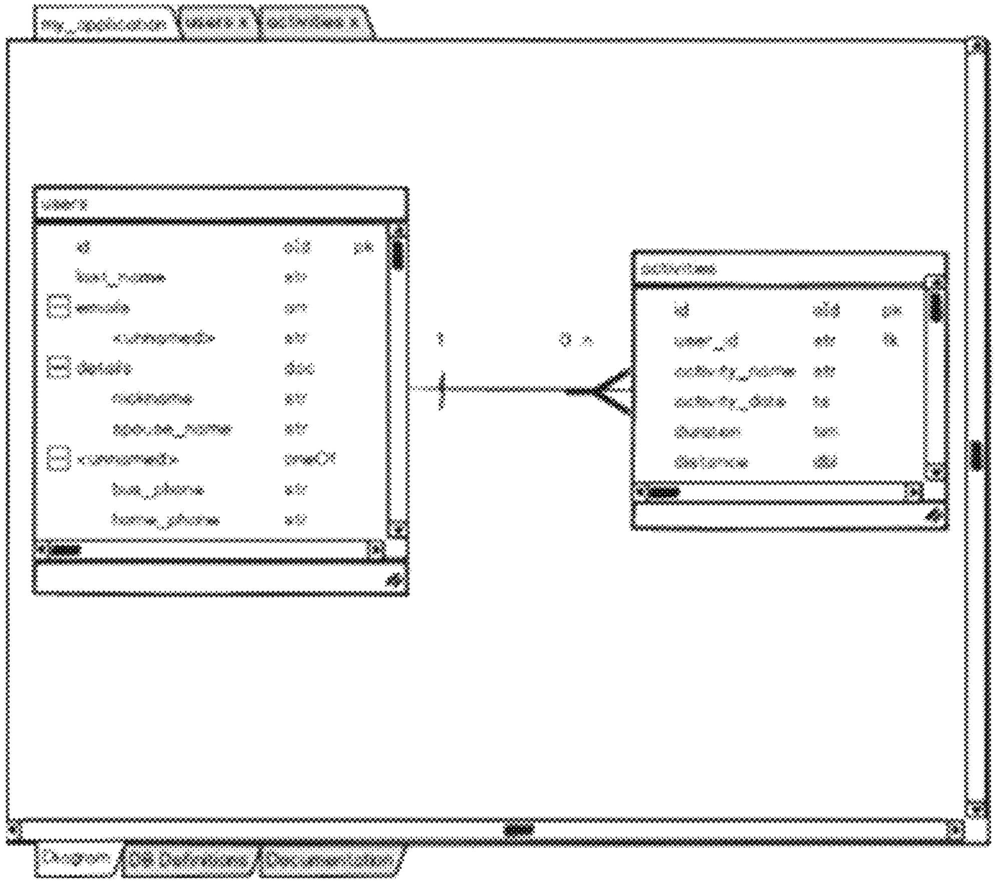
FIG. 8 shows a first view of the central pane, displaying an example entity relationship diagram.
Figure 9:
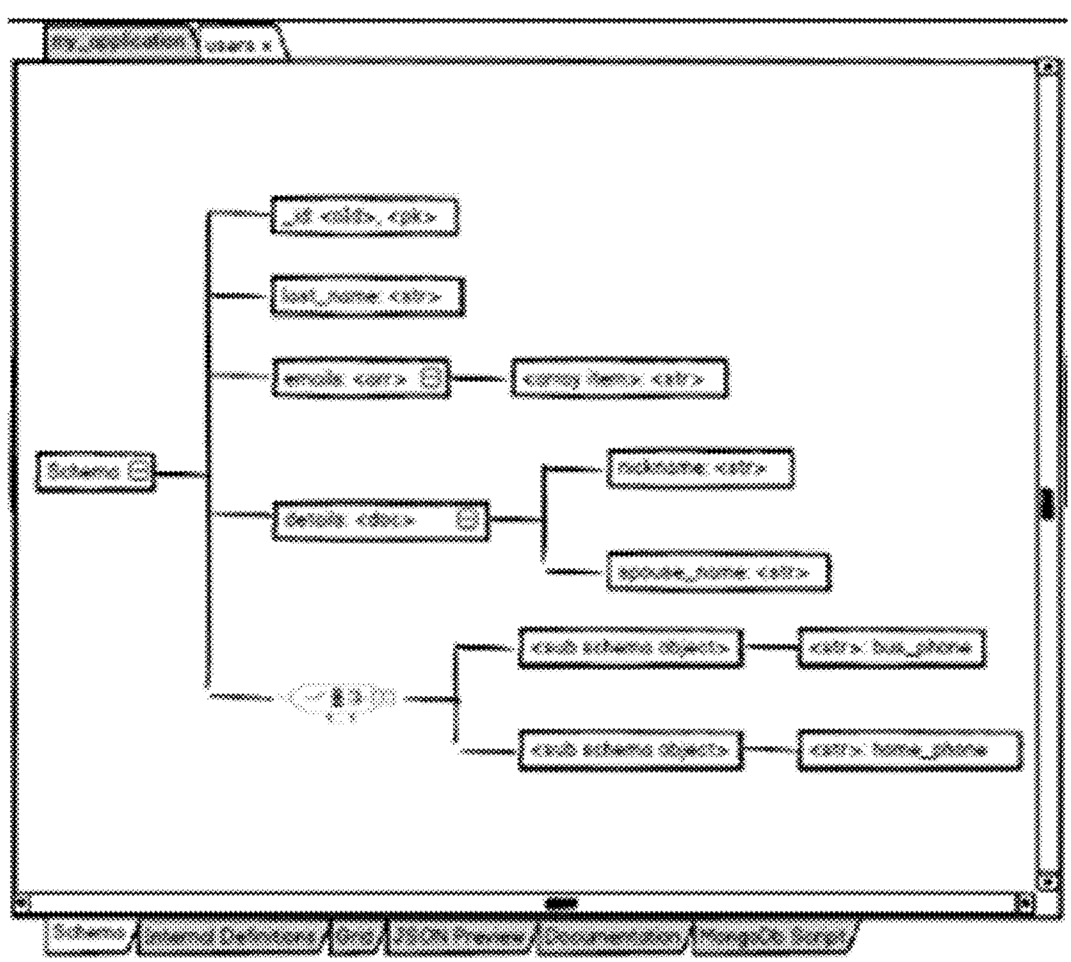
FIG. 9 shows a second view of the central pane, displaying an example tree-like structured diagram.
Figure 10:
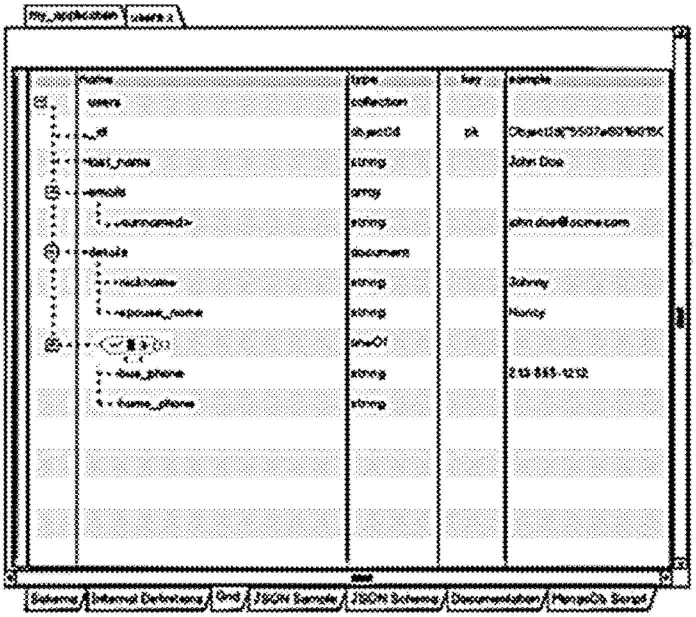
FIG. 10 shows a third view of the central pane, displaying an example grid view.
Figures 11, 12:
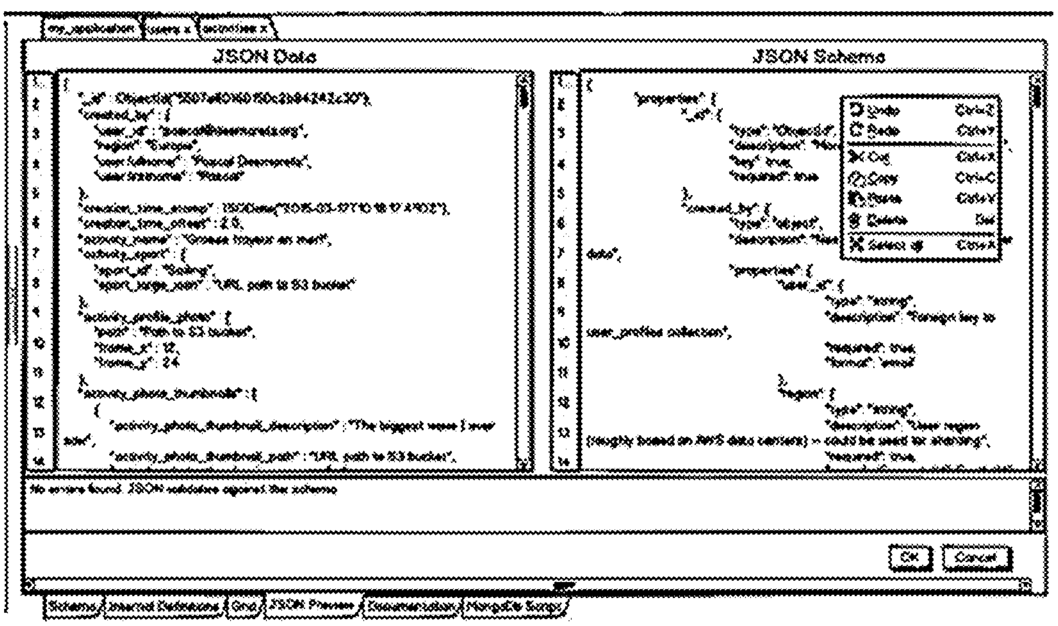
FIG. 11 shows a fourth view of the central pane, displaying an example JSON preview.
FIG. 12 shows a fifth view of the central pane, displaying an example database creation script.

The Central pane serves several purposes:

- Graphical view of the database entity relationship diagram, cfr FIG. 8
- Graphical view of the field hierarchy diagram for a collection, cfr FIG. 9
- Graphical view of database and collection definitions, cfr FIG. 8
- Grid view of the fields of a collection, cfr FIG. 10
- JSON preview of a sample document for a collection and corresponding schema, cfr FIG. 11
- Preview of database creation script for a collection, cfr FIG. 12
- Database and collection documentation, cfr FIG. 13

The pane has 2 sets of dependent tabs: top and bottom.

The top set has one fixed tab, the tab for the model database, and one tab for each collection created or consulted, cfr FIG. 14. Collection can be closed, re-opened, and moved around, whereas the database tab remains fixed. If too many tabs are opened to fit in the width of the pane, depending on the library used, tabs will keep their size (full length of Collection name) with arrows left/right will let the user scroll (Firefox-style), or the tabs will shrink with a tooltip (Chrome-style.)

There are 2 bottom sets of fixed tabs, one set of bottom tab for the database top tab, cfr FIG. 15, and one set of bottom tab for the collection top tabs, cfr FIG. 16.

The bottom tabs cannot be closed or moved.

The central pane has both a vertical and a horizontal scroll bar if the data or diagram do not fit in the pane, particularly in responsive mode.

The central pane can display graphics (database and collection), a grid, JSON (sample/schema), documentation, or database script. These tabs are functionally linked together, and changes in one may have effects on the other, and vice-versa. They need to be dynamically updated.

The pane is permanent (cannot appear or disappear like the Object Browser or the Properties Pane.) However, its size may vary with the appearance or disappearance of the Object Browser and/or the Properties Pane. The user may manually modify the width distribution of the 3 panes.

Figure 17:
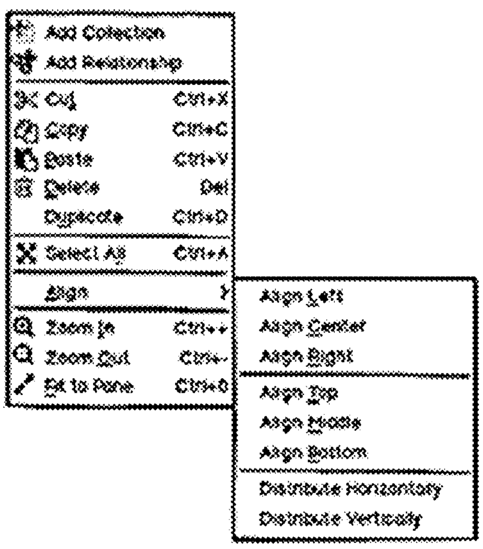
FIG. 17 shows the contextual menus (item: Align).
Figure 18:
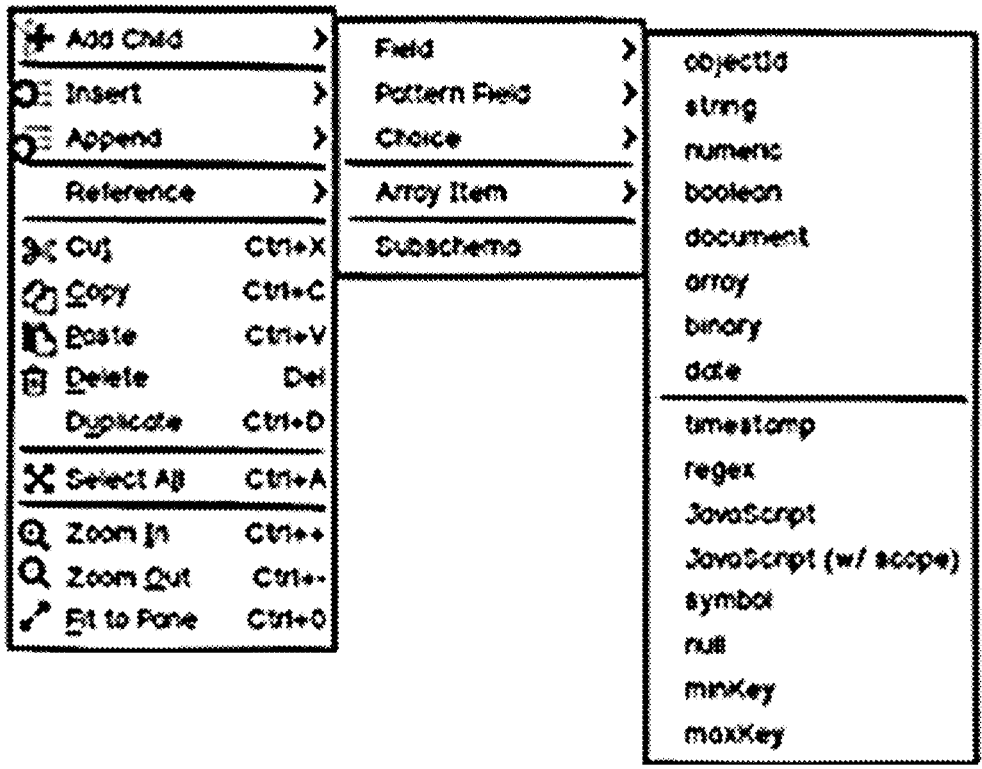
FIG. 18 shows the contextual menus (item: Add child).
Figure 19:
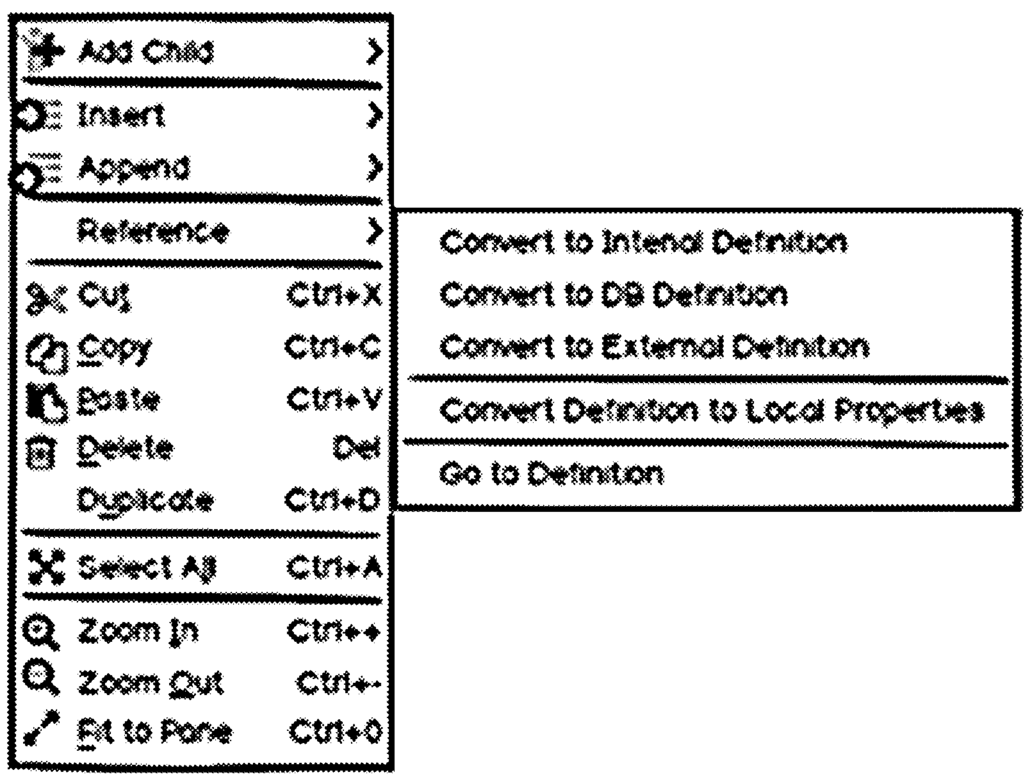
FIG. 19 shows the contextual menus (item: Reference).

The Central Pane supports contextual menus (right mouse click), cfr FIG. 17-19.

These contextual menus are configured in JSON documents to allow easy changes in relevant properties without programming impact. Options are greyed out if unavailable to the user in the application context.

Arrow keys direct the following behavior:

- In the ER diagram when a collection is selected: move it around
- In the DTD diagram: move from one element to the other:
  - Left and right arrow keys: move shallower or deeper in the tree
  - Up and down arrow keys: move along the elements of the current level in the tree 2.2.1.1.4 Properties Pane This pane is where most of the data entry is performed. It can have different configurations depending on the element being edited/displayed.

There are 3 levels of properties panes: database (including relationships), collection, and field. The appropriate properties pane is displayed depending on the element being selected in the Central Pane or the Object Browser. The properties panes for database and for collections have fixed bottom tabs.

Figure 20:
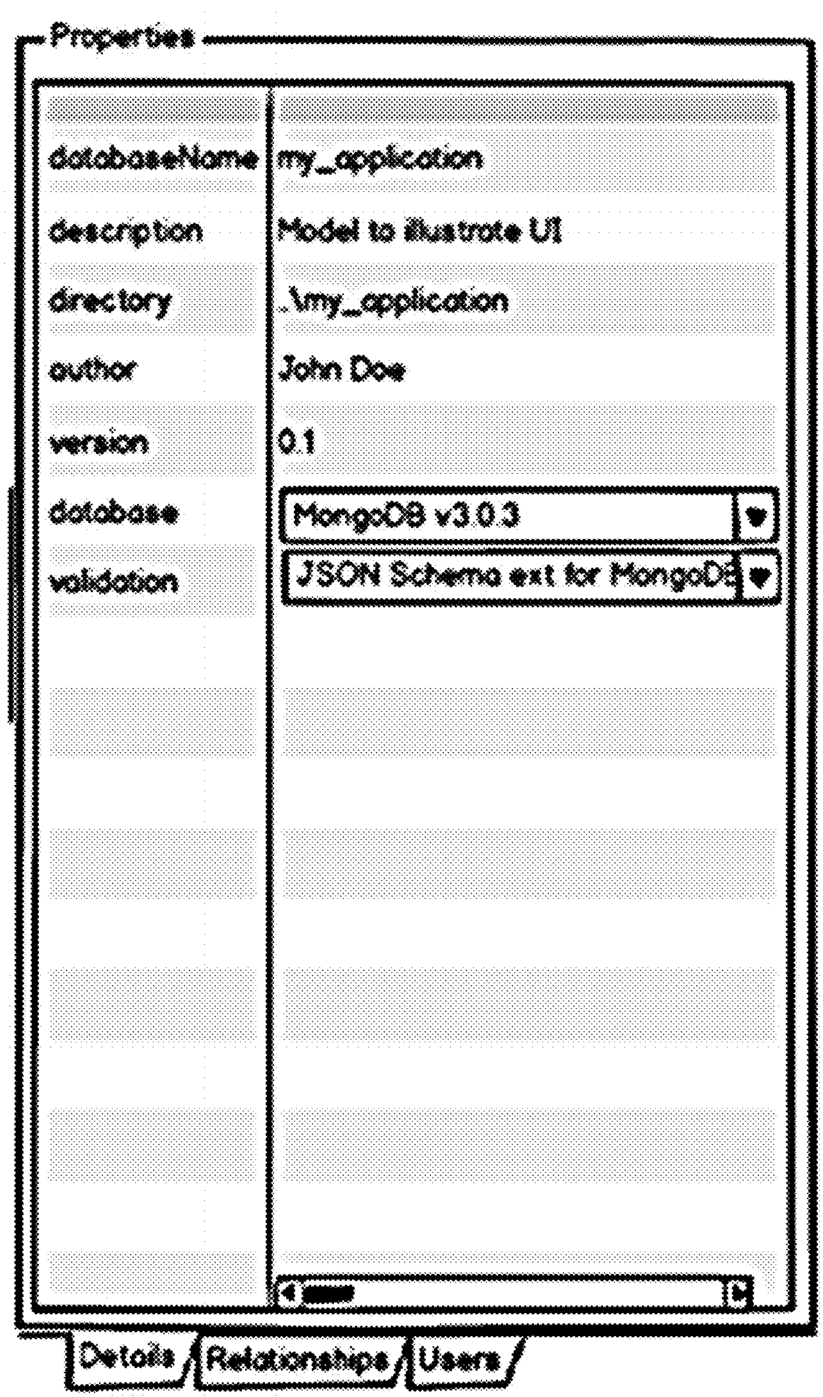
FIG. 20 shows a first view of the properties at database level.
Figure 21:
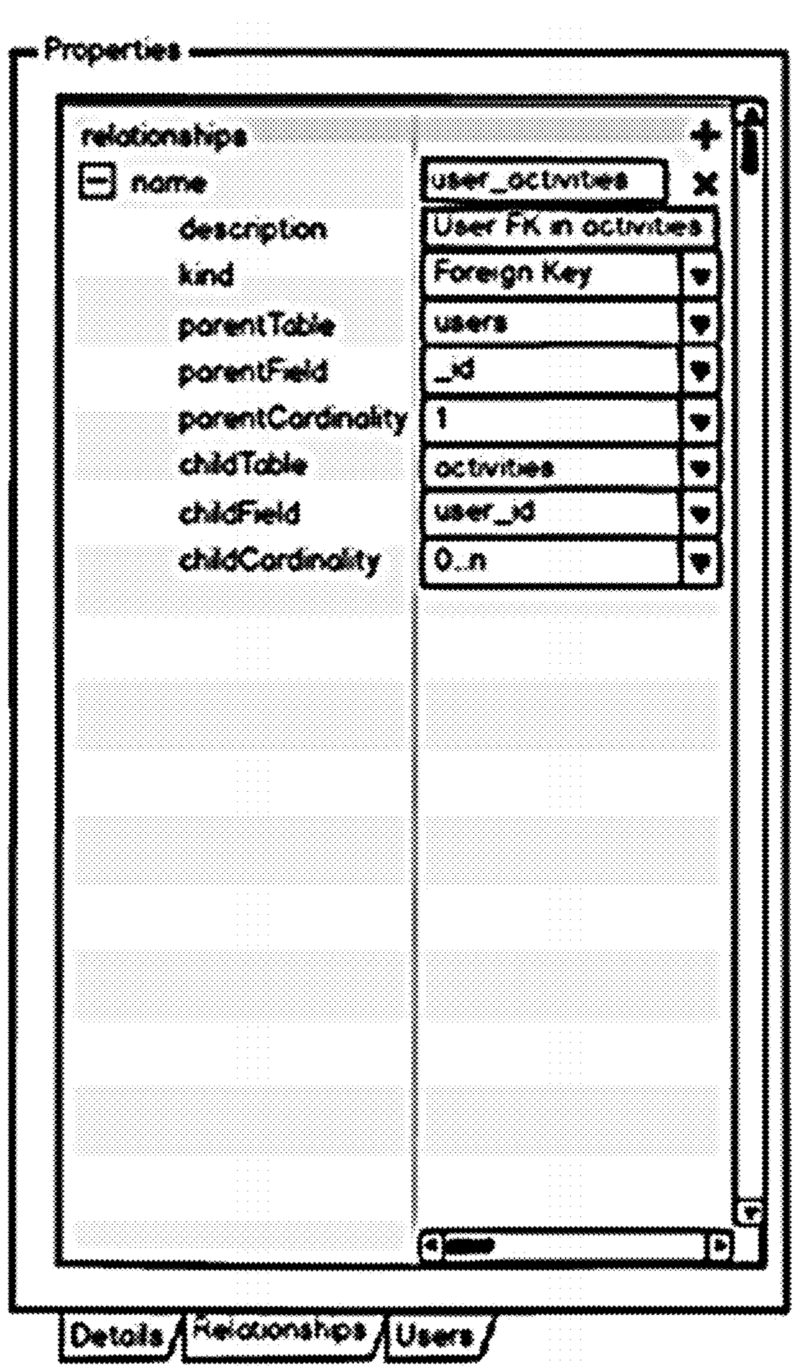
FIG. 21 shows a second view of the properties at database level.
Figure 22:
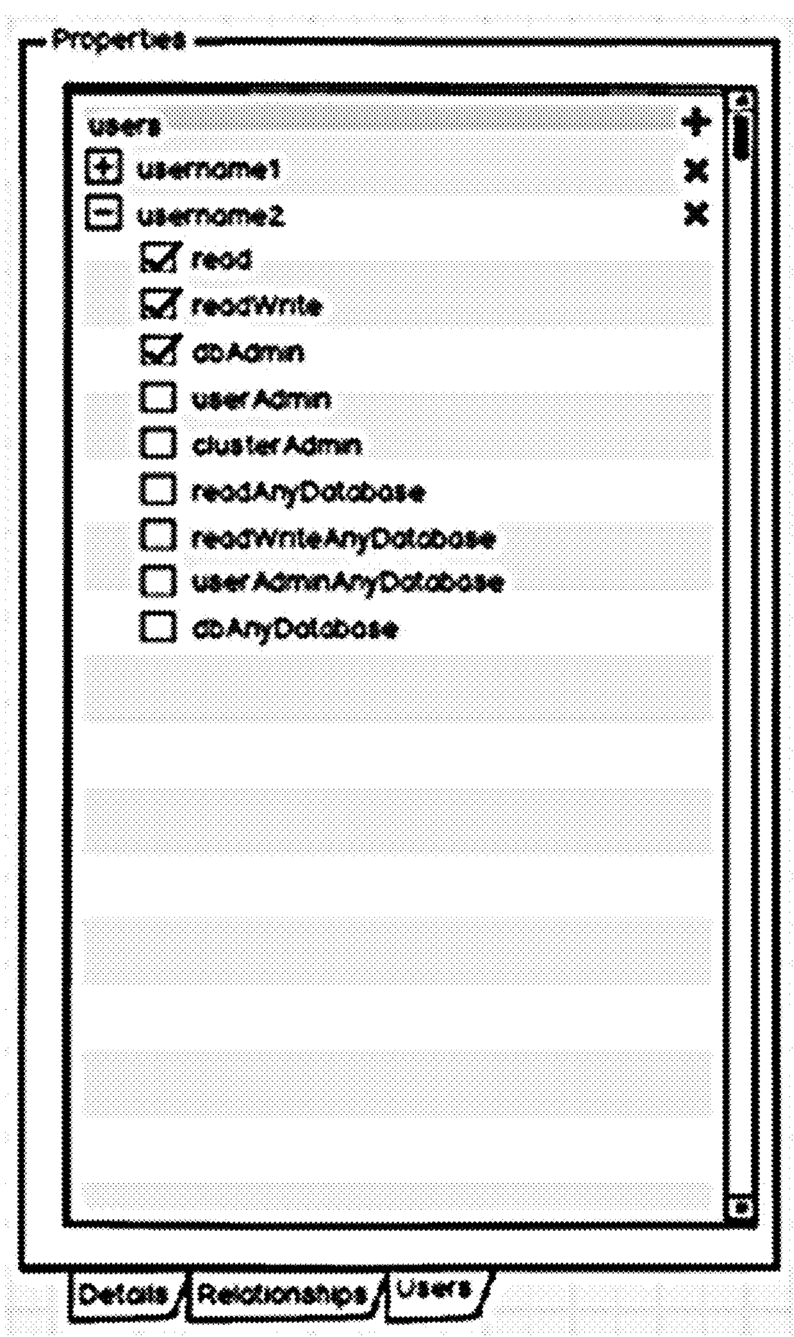
FIG. 22 shows a third view of the properties at database level.
Figure 24:
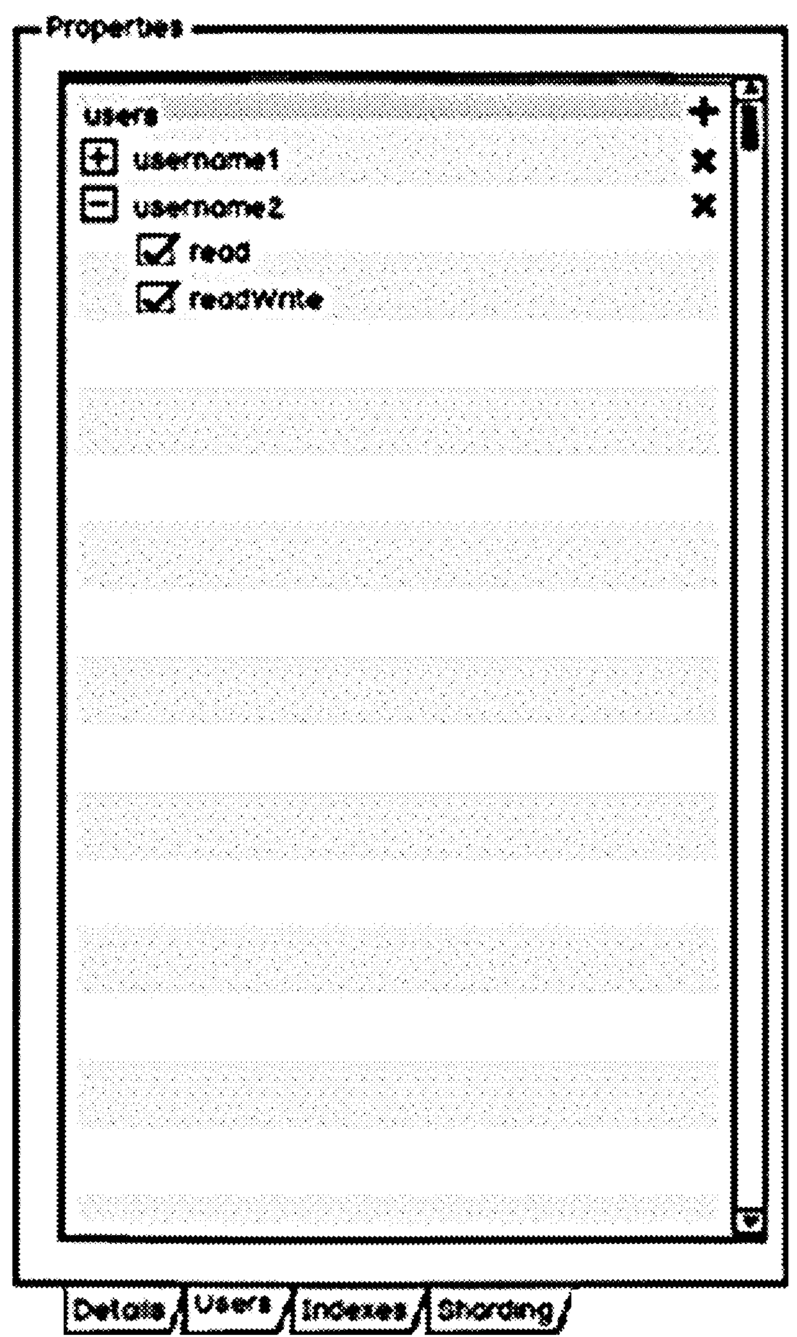
FIG. 24 shows a second view of the properties at collection level.
Figure 25:
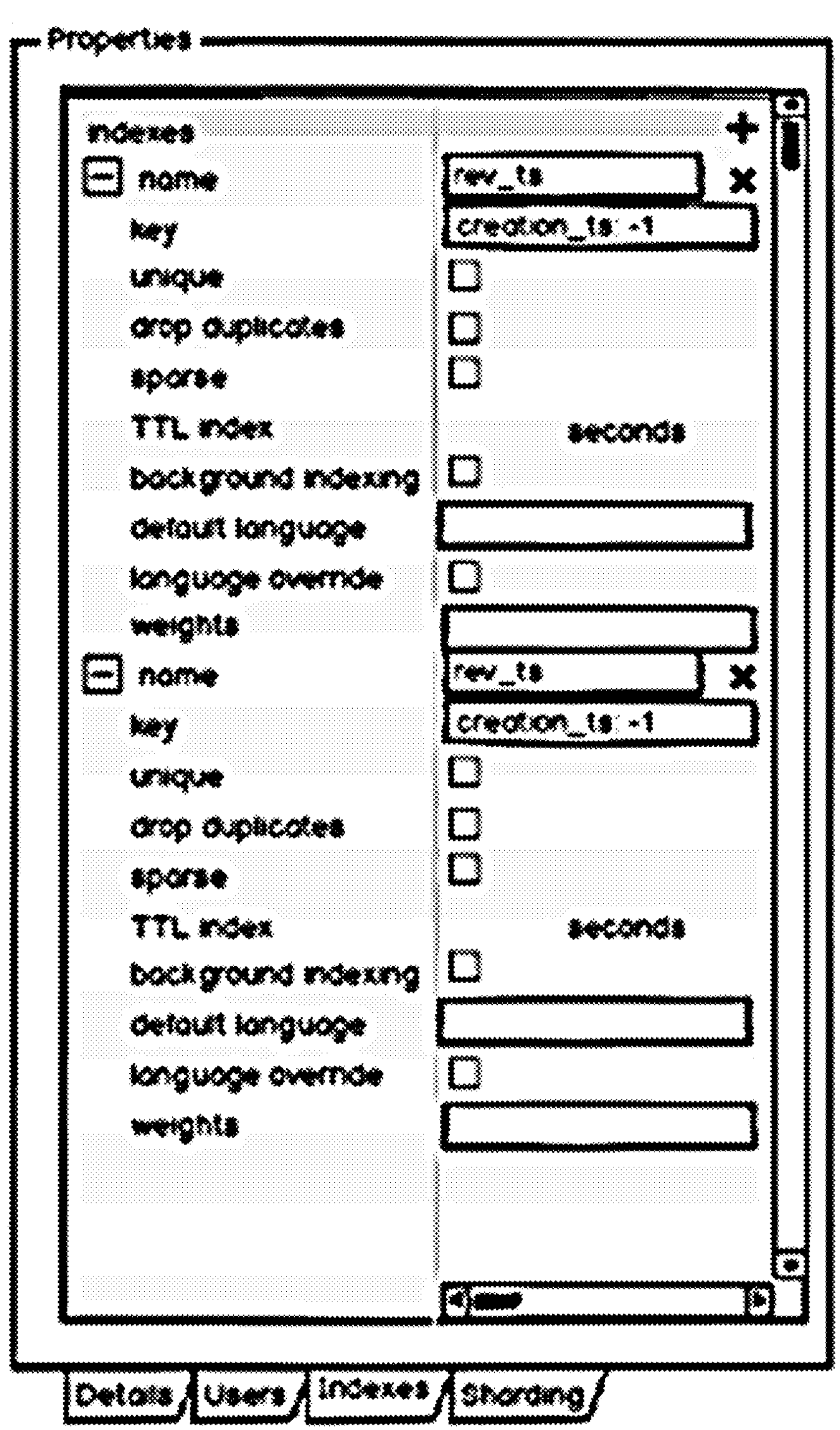
FIG. 25 shows a third view of the properties at collection level.
Figure 26:
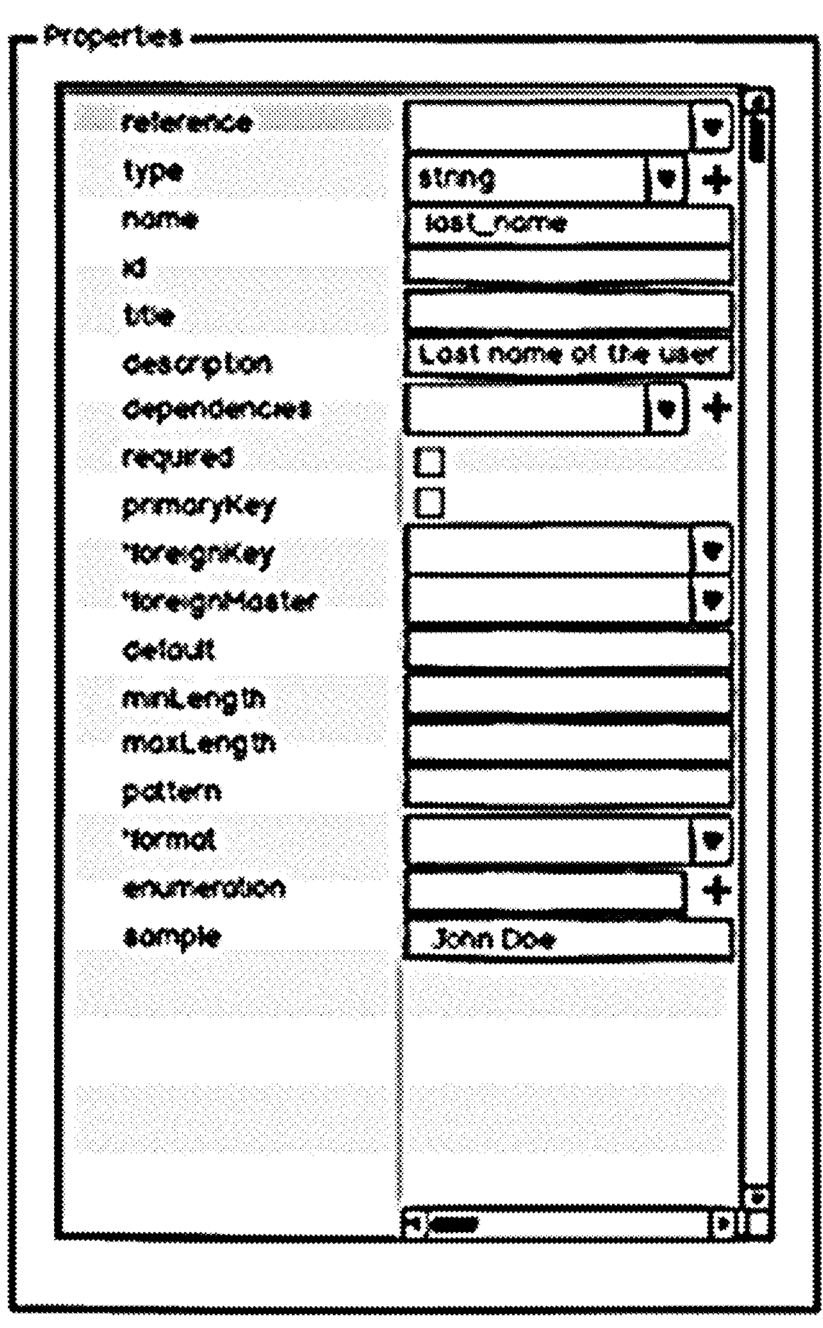
FIG. 26 shows a first view of the properties at field level.
Figure 27:
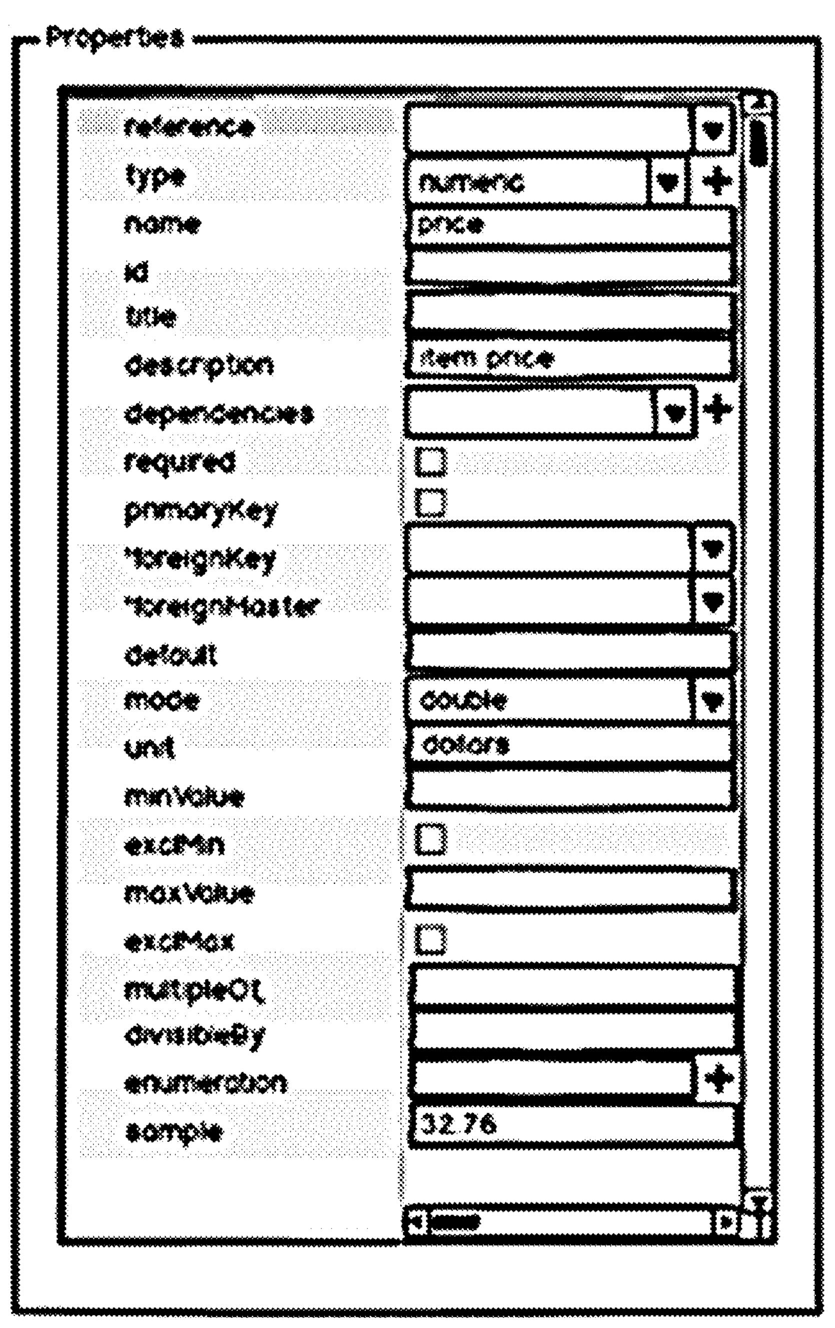
FIG. 27 shows a second view of the properties at field level.
Figure 28:
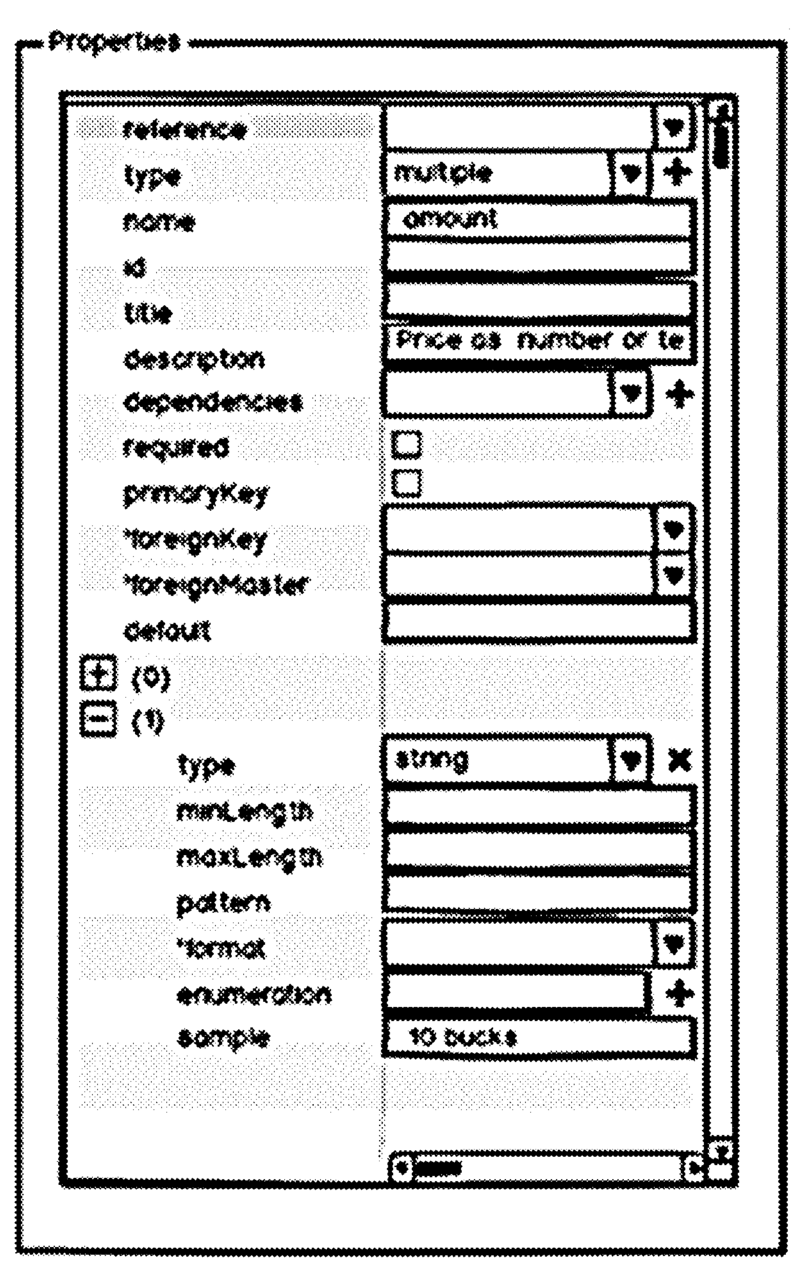
FIG. 28 shows a third view of the properties at field level.

- Properties at database level, cfr FIG. 20 through 22
- Properties at collection level, cfr FIG. 23 through 25
- Properties at field level, cfr FIG. 26 through 28

Properties are controlled by a JSON schema to allow easy changes in relevant properties without programming impact, and property entries are stored in each Collection's definition in a JSON document.

Fields are editable directly (no edit/cancel/save buttons).

If the data does not fit in the pane, vertical and horizontal scroll bars appear.

2.2.2 Core Functions 2.2.2.1 Creation of a Model

A model is made of diagram and relationships representing a database of collections made of fields.

Figure 29:
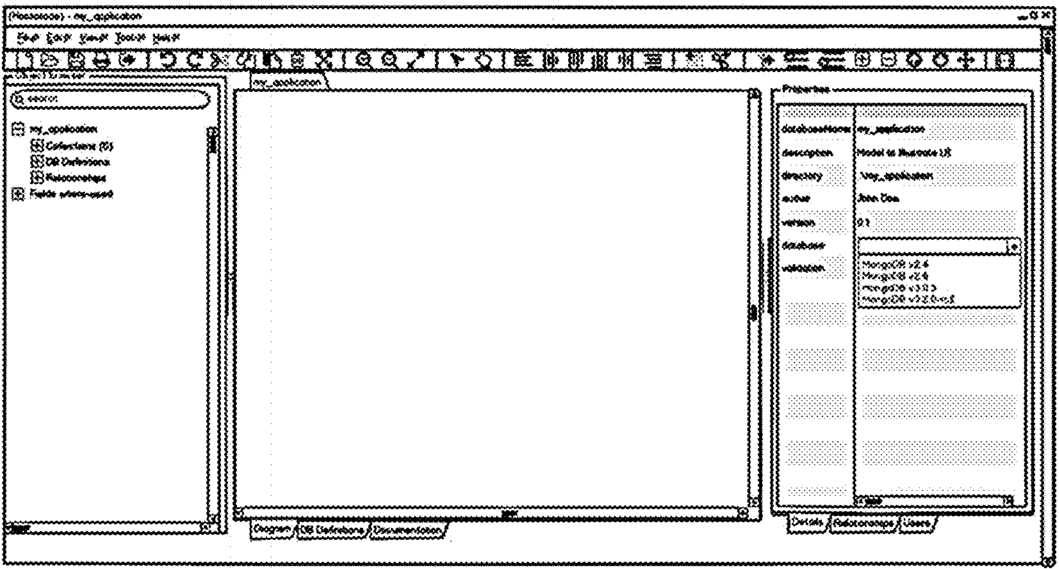
FIG. 29 illustrates a first step in the creation of a model.

When a new model is created from scratch, typically for a database underlying an application or API, the user gets an empty screen, cfr FIG. 29.

The unnamed top tab of the Central pane is active, as well as the bottom Diagram tab.

Figure 30:
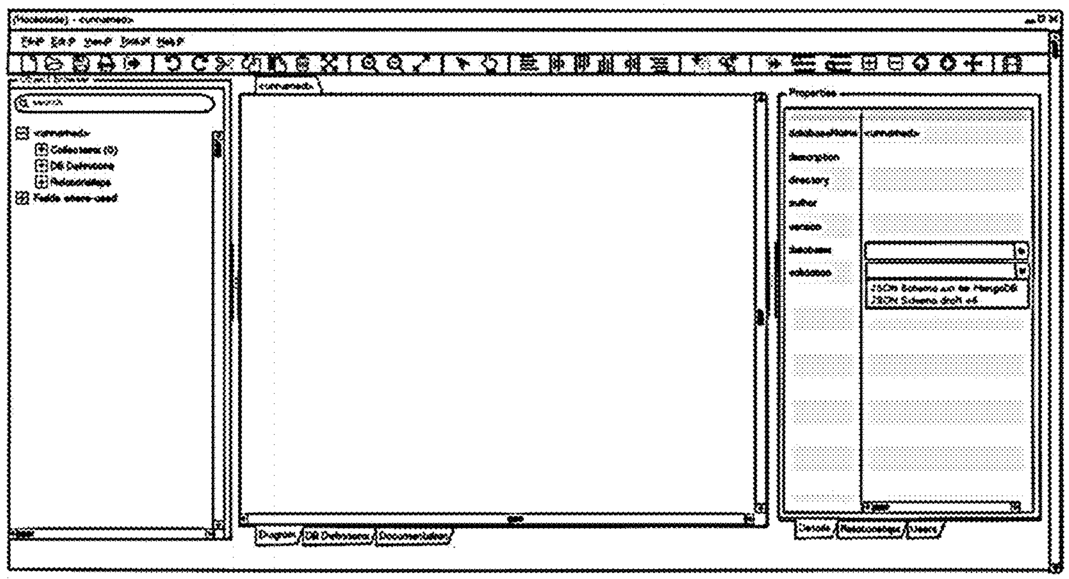
FIG. 30 illustrates a second step in the creation of a model.

At this point, the user starts by filling—in the properties for the database, cfr FIG. 30. Creating the name in the Properties pane dynamically updates the name in the fixed tab of the Central pane, in the Object Browser, and in the application Title bar (all the way at the top left).

2.2.2.2 Properties of a Database 2.2.2.2.1 Details

Figure 31:
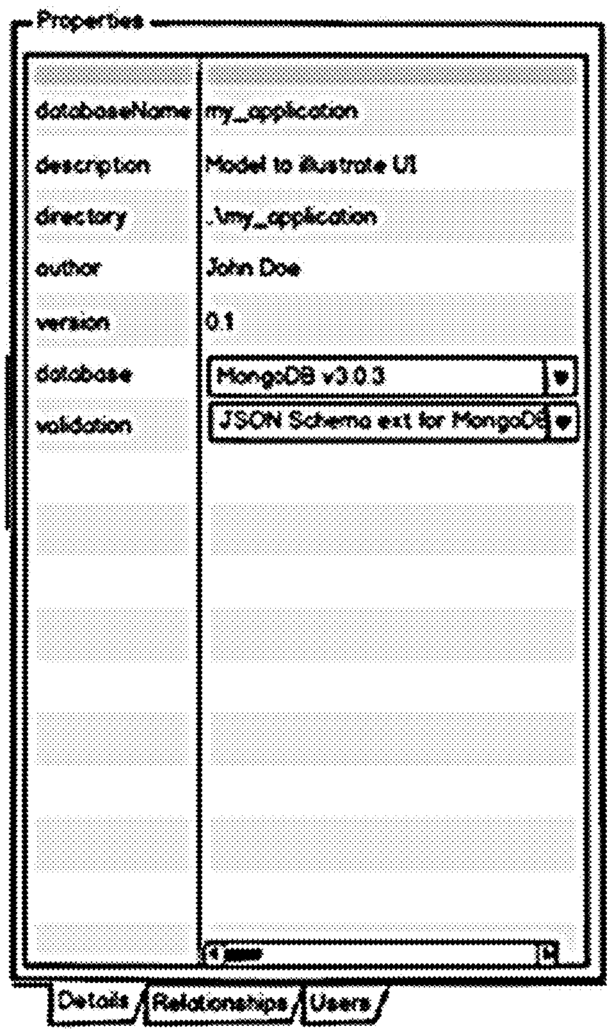
FIG. 31 shows the 'Details' tab of the properties of a database.

Most of the information maintained here is just for documentation purposes, or metadata for internal use by the application, cfr FIG. 31. Some may be used in script creation.

2.2.2.2.2 Relationships

Figure 32:
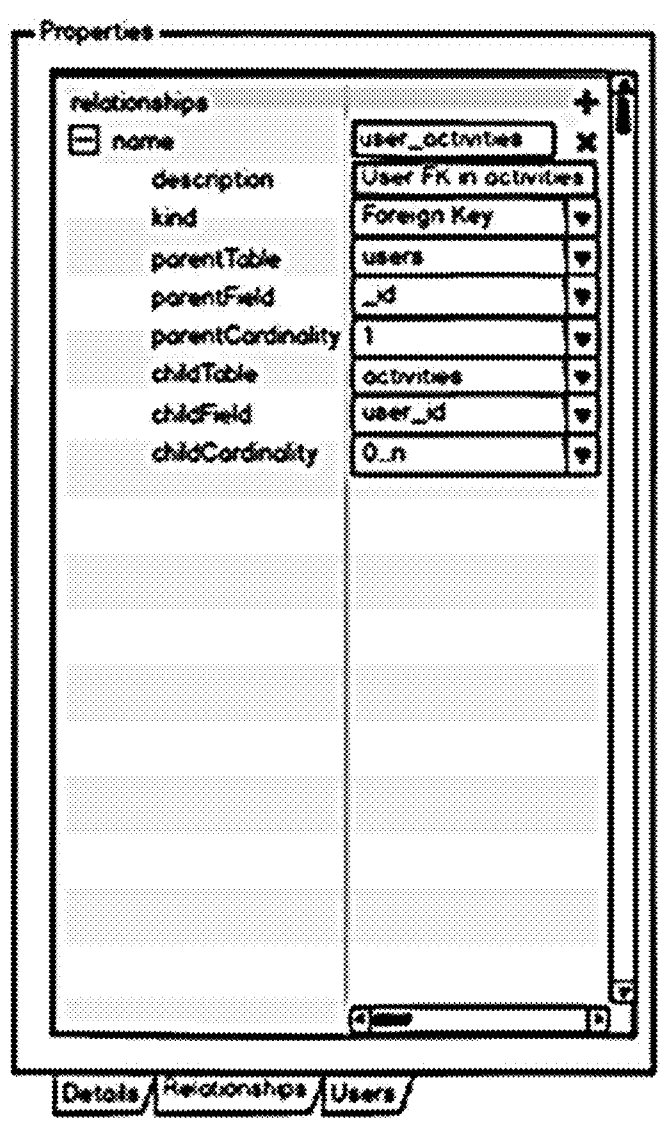
FIG. 32 shows the 'Relationships' tab of the properties of a database.

Relationships are links between different Collections of a Database. As a reminder, contrary to an RDBMS, relationships are not explicit in a schema-less NoSQL database, but well in the application code. They can however (and should) be documented here, and serve as a basis for design and troubleshooting discussions, cfr FIG. 32.

Until 2 or more Collections are created documented in the database, this tab is not enabled. There are 2 kinds of relationships: foreign key, and foreign master.

Just as in an RDBMS, a foreign key relationship makes reference to the unique identifier of a document in another Collection in the database. Particularly with the release of MongoDB v3.2 and the introduction of the $lookup functionality and the BI Connector, the documentation of foreign keys becomes a lot more relevant.

A foreign master relationship documents a denormalization, or the repetition of the content of a field in another collection. The source is considered the master (or parent) and the child is where the data is duplicated. Particular care should be given to making sure that children are updated when data in the master changes.

Important note: there can be more than one relationship between 2 tables. There can even be several relationships pointing to one field in a parent table, coming from different fields in a child table.

2.2.2.2.3 Users

The only information useful to a database (besides the name in the details section) is user credentials.

Figure 33:
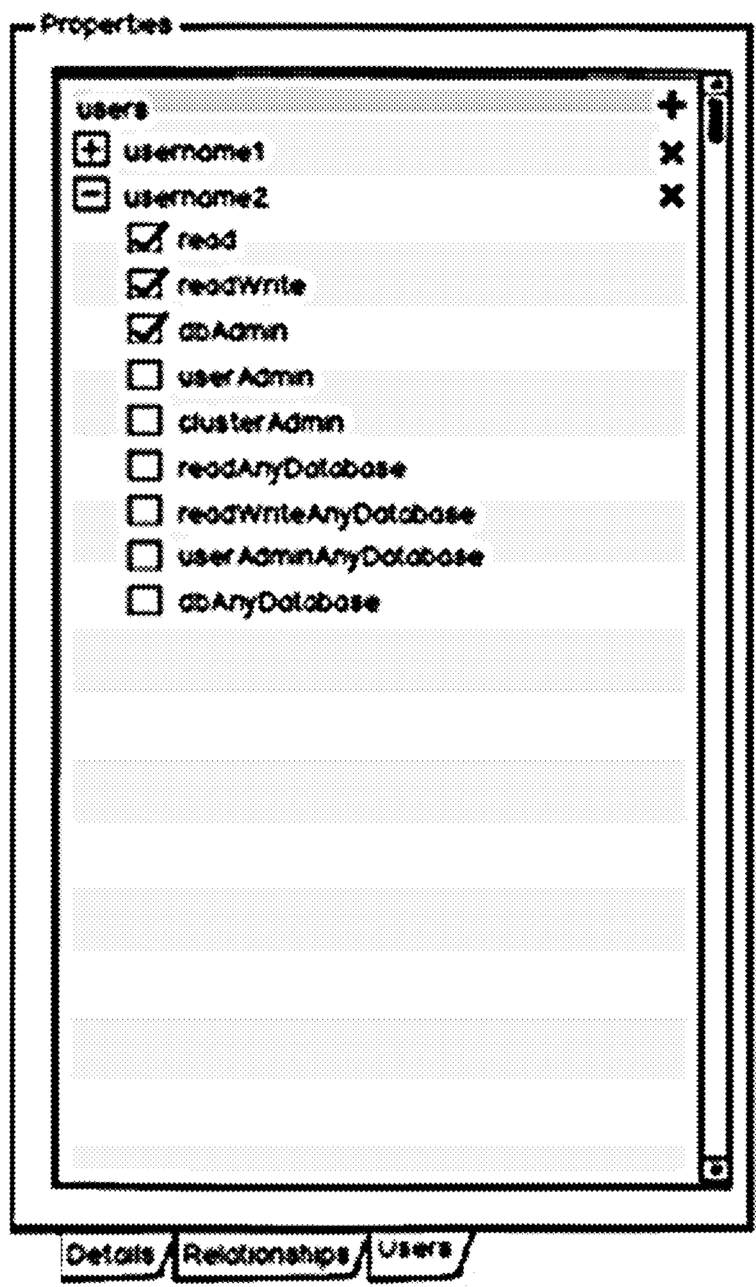
FIG. 33 shows the 'Users' tab of the properties of a database.

Additional credentials can be maintained at Collection level, cfr FIG. 33.

Note that security rights tend to change from version to version, and should therefore be tied to a version number.

2.2.2.3 Creation of a Collection

Figure 34:
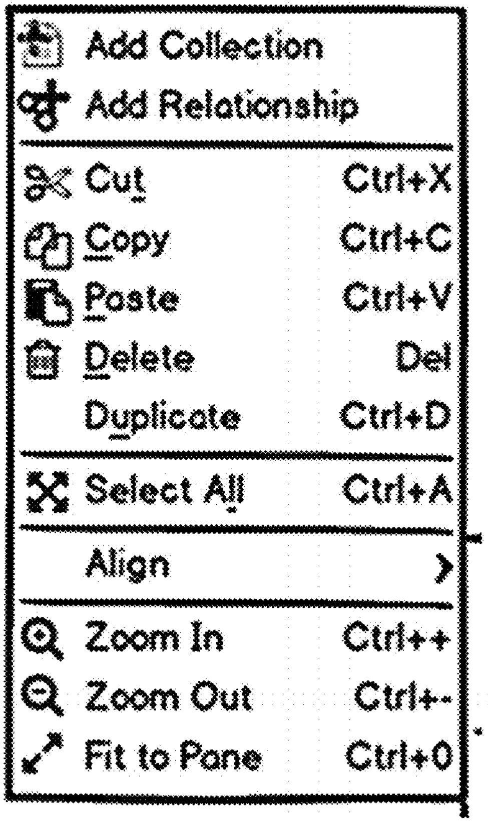
FIG. 34 shows a first step in the creation and editing of a collection.

The next step is to create a Collection. This can be done in 2 ways:

- By clicking on the Add Collection button in the toolbar,
- By doing a right-click of the mouse anywhere in the Central pane to get a contextual menu, and choosing the option “Add Collection”, cfr FIG. 34.

Figure 35:
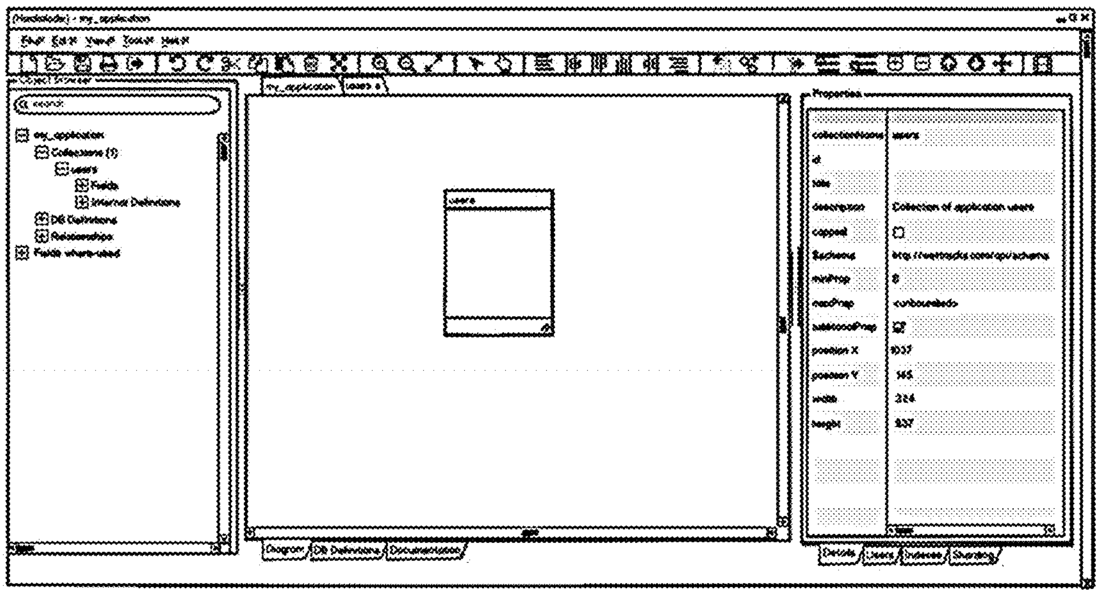
FIG. 35 shows a second step in the creation and editing of a collection.

A new empty collection now appears in the Central pane, cfr FIG. 35A tab appears at the top of the Central pane, but is not activated. An entry is created in the Object Browser hierarchy.

Now, in order for the user to start editing the new collection, 3 possibilities are offered:

- Double-click on the Collection box in the Central pane diagram,
- Single-click on the Collection line in the Object browser,
- or single-click on the Collection tab at top of the Central pane.

Figures 36, 37:
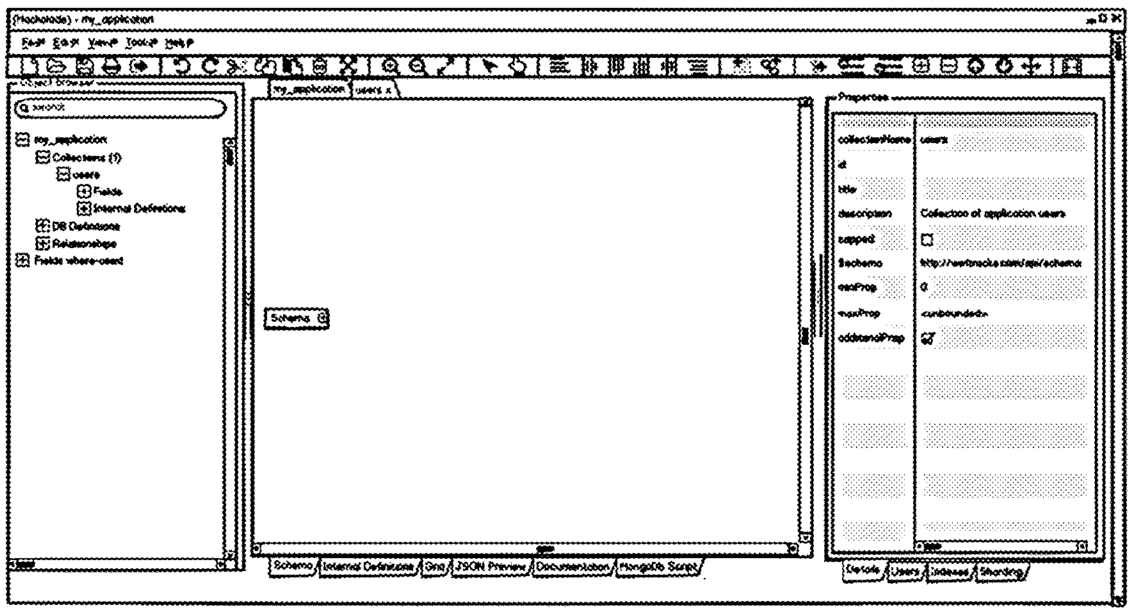
FIG. 36 shows a third step in the creation and editing of a collection.
FIG. 37 shows the 'Details' tab of the properties of a collection.

The Collection top tab is active, with the bottom Schema tab active, and the Central Pane displays a single fixed element: the root of the Collection schema, cfr FIG. 36.

As the user enters the Collection name in the properties, the name gets updated in the Central pane tab, and in the Object Browser. The user fills in additional properties.

2.2.2.4 Properties of a Collection 2.2.2.4.1 Details

The user can record here some data useful for the database creation script, as well as some info useful for the application, cfr FIG. 37.

2.2.2.4.2 Users

Figure 38:
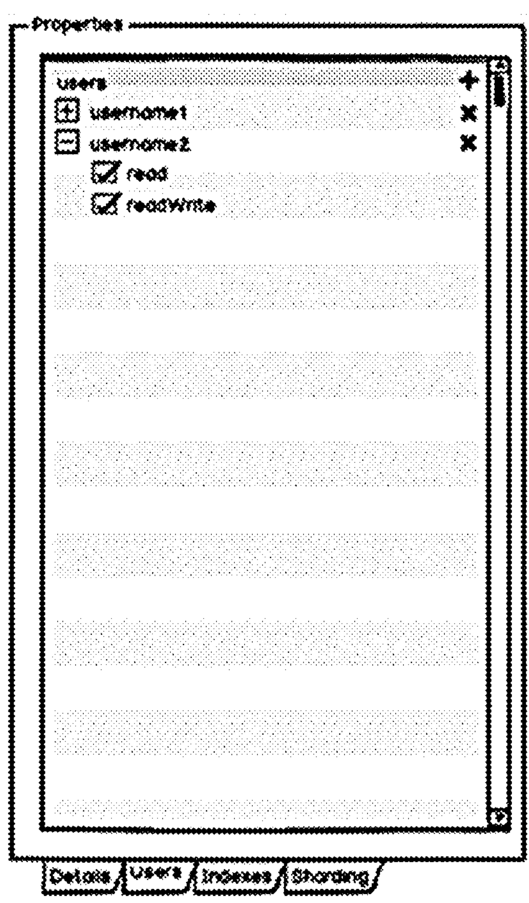
FIG. 38 shows the 'Users' tab of the properties of a collection.

Collection-level security credentials, cfr FIG. 38. Note that security rights tend to change from version to version, and should therefore be tied to a version number.

2.2.2.4.3 Indexes

Figure 39:
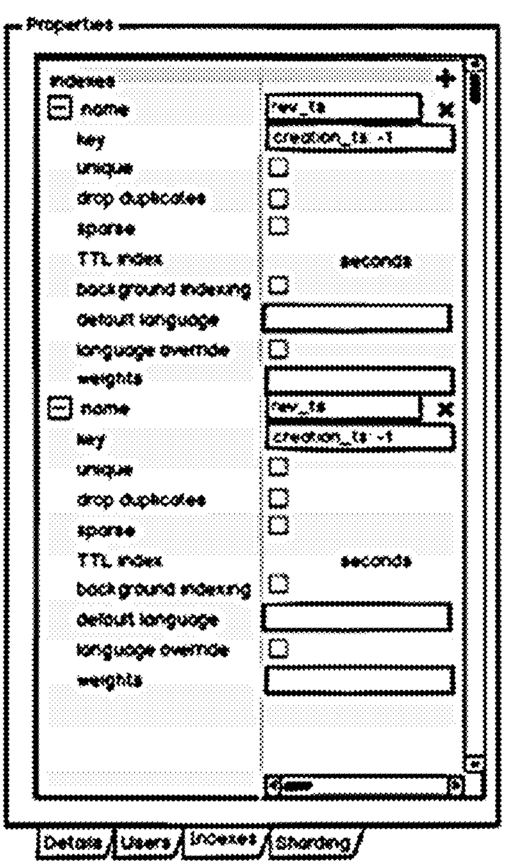
FIG. 39 shows the 'Indexes' tab of the properties of a collection.

The information is useful for documentation purposes as well as for the database creation script, cfr FIG. 39.

2.2.2.4.4 Sharding (To be determined)

2.2.2.5 Creation of Fields in Graphical View

Next, the user is ready to create fields for the Collection, in a variety of ways:

- Click on the Add Child button in the toolbar, which pops up the contextual menu,
- Or right-click on the Schema root to display a contextual menu, then click on Add Child, then Field, then the appropriate Field type
- By clicking on the ‘plus sign’ of the schema box (also for complex objects such as documents and arrays.)

Figure 40:
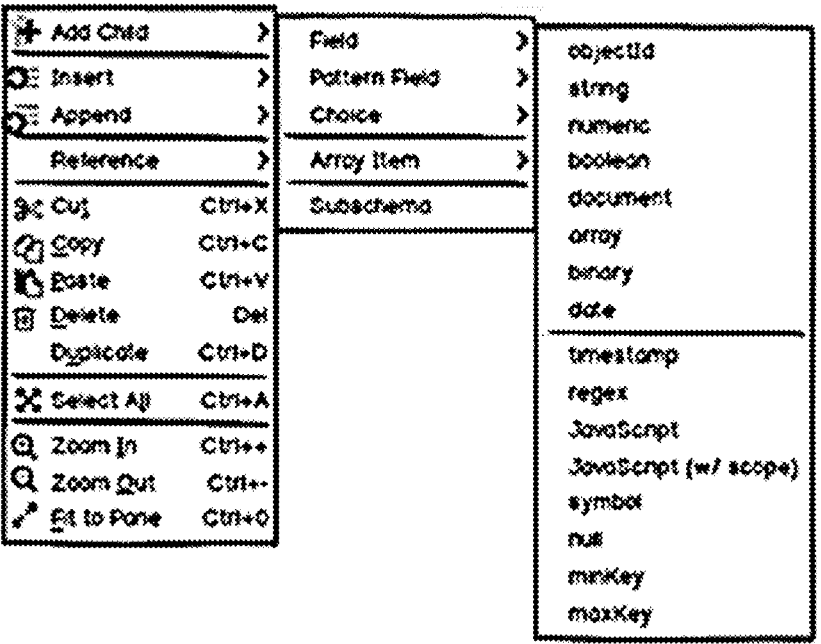
FIG. 40 illustrates the creation of fields for a collection.

The options accessible in the contextual menu, cfr FIG. 40 depend on the type of element selected prior to invoking the contextual menu.

2.2.2.5.1 Root Element

There is only one root possible per document. For the purpose of a NoSQL database schema, the root element can only be of type: document. Properties can be filled for the root element. One or more children can be created. The Insert, Append and Reference options are greyed-out since the functions are not possible for a root element.

2.2.2.5.2 Non-Root Elements

Figures 41, 42:
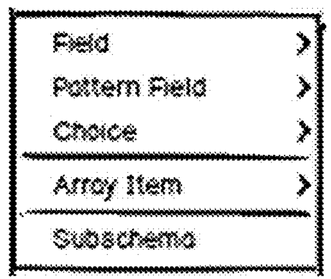
FIG. 41 illustrates the non-root elements that can be created.
FIG. 42 shows the properties of a field.
Figure 43:
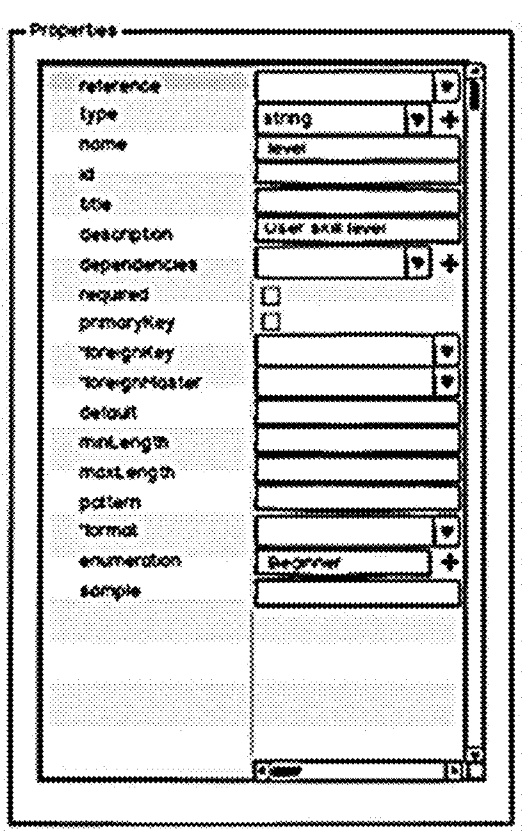
FIG. 43 shows a first step in the addition of entries with a 'plus' icon in the field properties.
Figure 44:
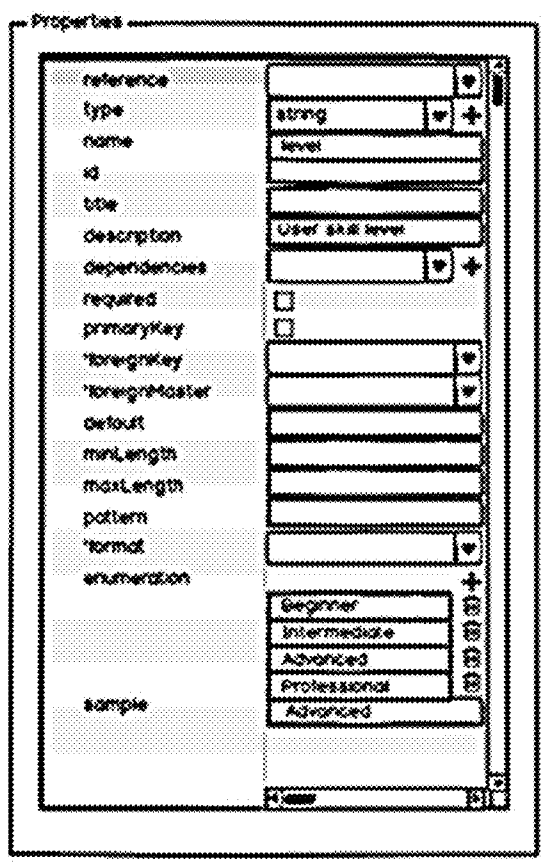
FIG. 44 shows a second step in the addition of entries with a 'plus' icon in the field properties.

For any other element than the root element, the 4 options (Add Child, Insert, Append, and Reference) are possible, cfr FIG. 41. The options of the sub-menu depend on the nature of the element selected. Let’s first define the different elements that can be created.

2.2.2.5.2.1 Field

This is the most common element in a schema. It defines the name-value pair that will be found in the JSON data. The properties define the details and constraints of both the name and the value in the pair. As defined by the JSON Schema specification, the available types for a field value are: string, numeric, boolean, object (document), array, and null. For the purpose of MongoDB, additional BSON types are available: objectID, binary, date, timestamp, regex, JavaScript, JavaScript with scope, symbol, minKey, and maxKey.

The nominal case is for an element to have only one type. The JSON specification however allows a field to be of multiple types. The application UI is able to define and maintain multiple types for a field, cfr FIG. 42 through 45.

The name of a standard field is a fixed string.

The nature of children is different for document, array, or other elements. Documents are allowed to have one or more Fields, Pattern Fields, and/or Choices as children. Arrays are allowed to have one or more Array Items and/or Choices as children. As for all other types of fields, the only possible child is ‘Choice’.

As a result, for all elements, a ‘plus sign’ ('+') appears at the right edge of the element box with label ‘Schema’ and the ‘Add Child’ option in the contextual menu is enabled. However, if the ‘plus sign’ is clicked and:

- The element is a document, array, or Choice, then the contextual sub-menu is opened below Add Child level;

The element is of any other type, then a Choice element is created.

For all elements, the options in the sub-menu of 'Add Child' appear as follows:

If the element is a document, then the options Field, Pattern Field, and Choices are enabled;

If the element is an array, then the options Array Item and Choices are enabled;

If the element is a Choice, then the options Choices and Subschema are enabled;

If the element if of any other type, then only the option Choices is enabled.

Since it is possible for an element to have multiple types, the available options are the sum of the options of each type of an element.

The Insert and Append functions in the contextual menu work in a similar way, except that while an element is selected, the Insert and Append behaviors are tied to the type of the parent element.

The properties of each field type are configured in a JSON Schema file.

2.2.2.5.2.2 Pattern Field

Pattern fields function in exactly the same way as standard fields, with only one exception: the name (in the name-value pair) is not a fixed string, but a regex pattern. This is particularly useful in MongoDB in combination with 'dot notation'.

2.2.2.5.2.3 Choice

In JSON Schema, there are 4 possible choices: "allOf", "one of", "anyOf", and "not".

Each of these elements contains an array, with each element of the array representing content that will be matched against. The choice of "allOf", "one of", "anyOf", or "not" determines how the validation processor will treat the results of the matches:

allOf requires that all elements in the array are matched successfully.

oneOf requires one, and only one, of the elements in the array to match successfully.

anyOf requires one or more of the elements in the array to be matched successfully.

not requires that no element in the array is matched successfully.

Schema definitions can use "allOf", "oneOf", "anyOf", and "not" individually or in combination, providing significant flexibility for defining elements that have complex definitions or contextual relationships. These choices apply both to fields and to field properties.

In both cases, the only possible child of Choice is a Subschema or another Choice. When clicking on the 'plus sign' of a Choice element, a Subschema element is created. Similarly, in the contextual submenu when a Choice element is selected, only the Subschema and Choices options are enabled. And when the child of Choice is selected, then the Subschema and Choices options are the only enabled options in the submenu of Insert and Append.

2.2.2.5.2.4 Array Item

This is the only possible child type of an Array field. Different types of array items are possible for a same parent element. Each can have from 0 to n occurrences, but can be limited by the minItems and maxItems properties of the Array. It has a behavior quite similar to that of a standard field, except that the field properties are limited in comparison. This is controlled in the Field Prop JSON Schema in Appendix.

2.2.2.5.2.5 Subschema

If the choice applies to a field, then the subschema is a document with all the schema possibilities of a JSON object.

The choice may also apply to an individual field property, in which case it is a simplified schema with the just the appropriate property of a field type. Example, a string field could have a format of ipv4 or ipv6.

2.2.2.6 Properties of a Field 2.2.2.6.1 Details

The field properties are located on the right-hand side in a dedicated pane. Depending on the field type selected in the previous step, the appropriate properties schema appears in the properties pane. The field properties are controlled by a Field Properties JSON Schema file found in appendix.

Vertical and horizontal scroll bars appear when content spills over the displayed pane size (variable according the responsiveness nature of the application.) Different types of input are possible in the properties pane:

Text field

Checkbox

Drop-down box: a list of values controlled either by the Field Properties JSON Schema (e.g.; possible string formats) or by entries in the DB or Collection (e.g.: foreign keys, references or field dependencies.)

Additionally, the properties pane allows the addition of other entries with a 'plus sign' icon. For example with enumerations, the user may fill one entry, then click the 'plus sign' icon so more entries are allowed underneath.

Multiple entries are also possible with drop-down boxes, such as dependencies.

A bit more complicated is the case of multiple types. In such case, some fields are common, and others are specific.

2.2.2.6.2 References

JSON Schema allows the creation of reusable definitions, so they don't need to be duplicated in multiple places. The definitions can cover a single field or a more complex structure like a document. A definition may exist at 3 levels:

Internal to a Collection (and therefore not available for referencing elsewhere than in its own collection), Database model workspace, in which case it is available to any collection of the database, External, i.e. in a public location on the Internet Definitions are not possible for Choices or Array Items. Only for Fields, Pattern Fields, and Subschemas. Therefore, the Reference option in the contextual menu is only enabled for these last 3 elements.

Figures 45, 46:
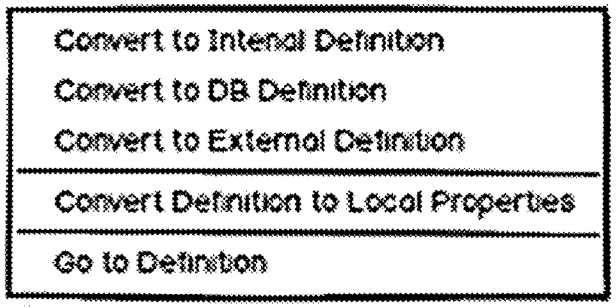
FIG. 45 shows the case of multiple types in the field properties.
FIG. 46 shows the reference option in the contextual menu.

The Reference option in the contextual menu leads to the following actions, cfr FIG. 46.

2.2.2.6.2.1 Convert to Internal Definition

When this option is selected, the system takes the element properties, copies them to the Definitions section of the same Collection JSON Schema, and replaces the element properties with a Reference to the newly created definition.

2.2.2.6.2.2 Convert to DB Definition

When this option is selected, the system takes the element properties, copies them to the Definitions section of the database model workspace JSON Schema, and replaces the element properties with a Reference to the newly created definition.

2.2.2.6.2.3 Convert to External Definition

The system takes the element properties, copies them to the Definitions section of JSON Schema to be stored in a central repository, and replaces the element properties with a Reference to the newly created definition.

2.2.2.6.2.4 Convert Definition to Local Properties

Once an element references a definition, the user may want to convert the reusable definition into a local instance, typically to diverge from the reusable definition. With this action, the Reference is removed from the element properties, and replaced by a full copy of the Definition previously referenced. The definition remains in place, as it may be used elsewhere in the DB or collection.

2.2.2.6.2.5 go to Definition

When an element references a Definition, choosing this option will let the user view the properties and details of the Definition.

2.2.2.7 Definitions

External definitions cannot be maintained in the application. Definitions appear in the Object Browser in a separate section.

2.2.2.7.1 at Collection Level

Figure 47:
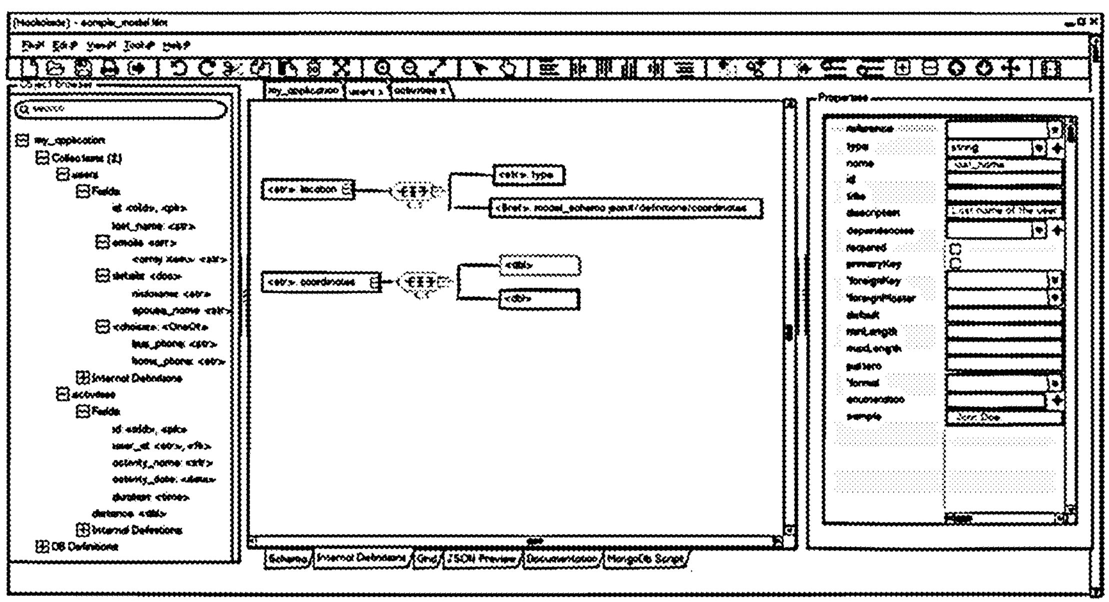
FIG. 47 shows a graphical view of the definitions at collection level.

Definitions at collection level are maintained in a graphical view similar to that of a complete collection schema, cfr FIG. 47.

2.2.2.7.2 at Database Level

Figure 48:
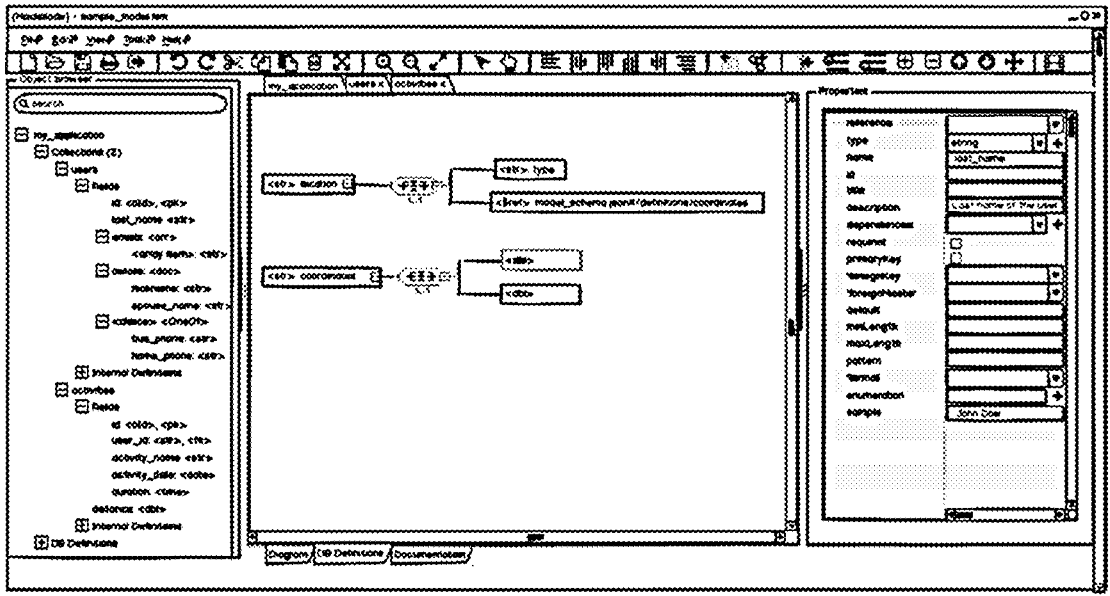
FIG. 48 shows a graphical view of the definitions at database level.

Definitions at database level are maintained in a graphical view similar to that of a complete collection schema, cfr FIG. 48.

2.2.2.8 Field where-Used and Search

In the Object Browser, there will be a dynamic tree view of where a field is referenced: collection and sub-objects, if any), and definitions.

2.2.2.9 Grid View

Figure 49:
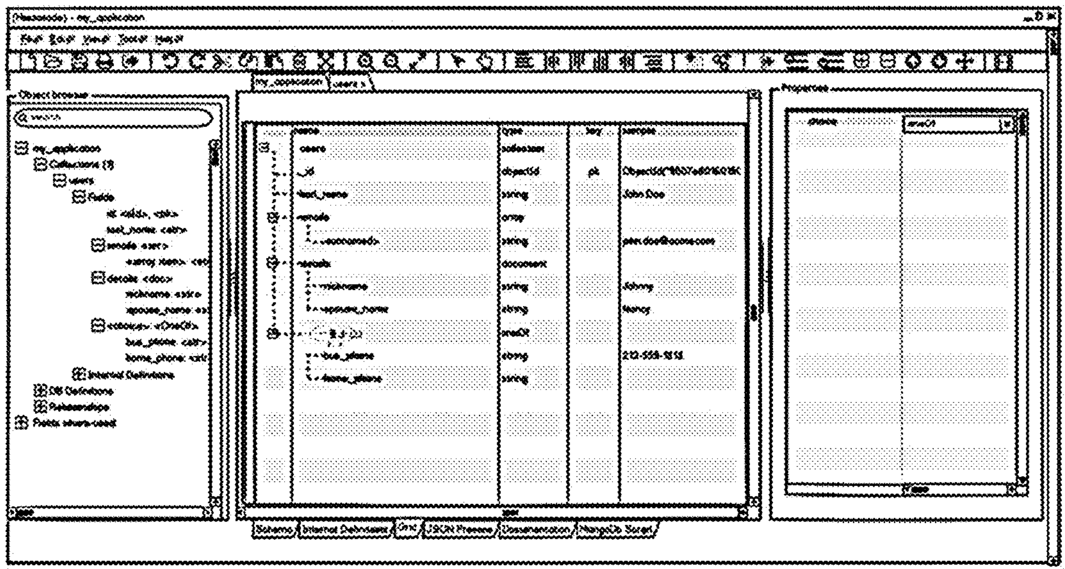
FIG. 49 shows an example grid view.

This view provides exactly the same functions as the graphical view, but with a different layout and visualization, cfr FIG. 49.

2.2.2.10 JSON Preview

Figure 50:
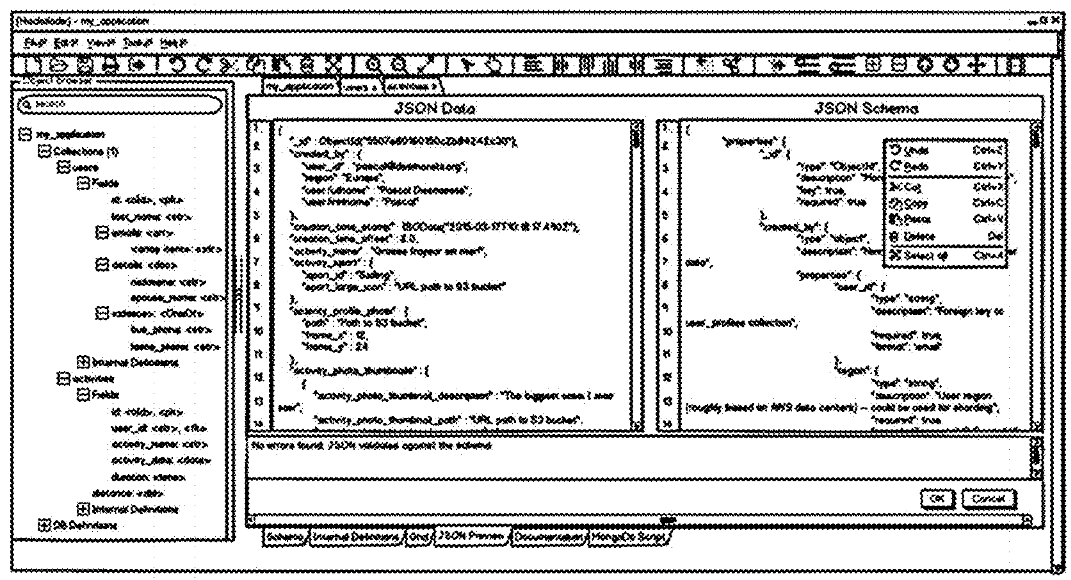
FIG. 50 shows an example JSON preview.

One difficulty with JSON Schema is to easily visualize a JSON document complying with the schema defined. To that effect, the Properties pane provides for each field a Sample entry box so the user can record an example to be used in a JSON document. This view shows, side by side, the JSON data document, and the corresponding JSON Schema as defined in the Diagram or Grid views, cfr FIG. 50.

Modifications are allowed in the JSON Schema pane, and validation of these changes is made on-the-fly so as to give immediate feedback to the user. Changes made in this preview are immediately visible in the Diagram and Grid views, and vice-versa. This should be insured by the way entries are persisted. The JSON data is also editable.

2.2.2.11 Documentation

Figure 51:
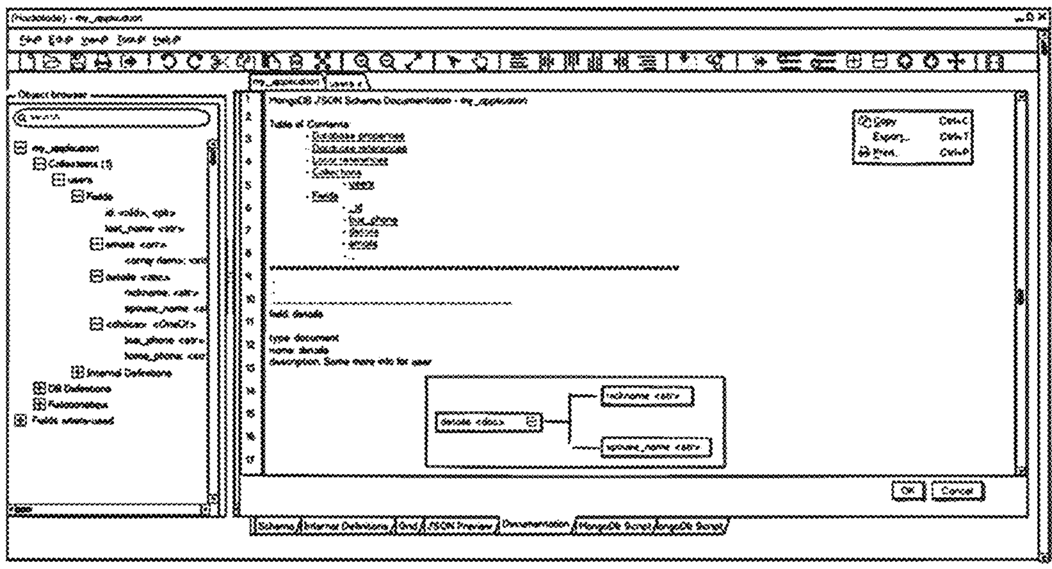
FIG. 51 shows an example documentation.

The goal with this tab is to generate a human-readable documentation of the JSON Schema created, as an equivalent implementation for JSON to something that is fairly common for XSD, cfr FIG. 51.

The documentation can be exported to RTF, PDF, Markdown, and (X) HTML formats, as well as RAML and Swagger. It is available for an individual Collection, or for the entire DB.

2.2.2.12 Database Script

Figure 52:
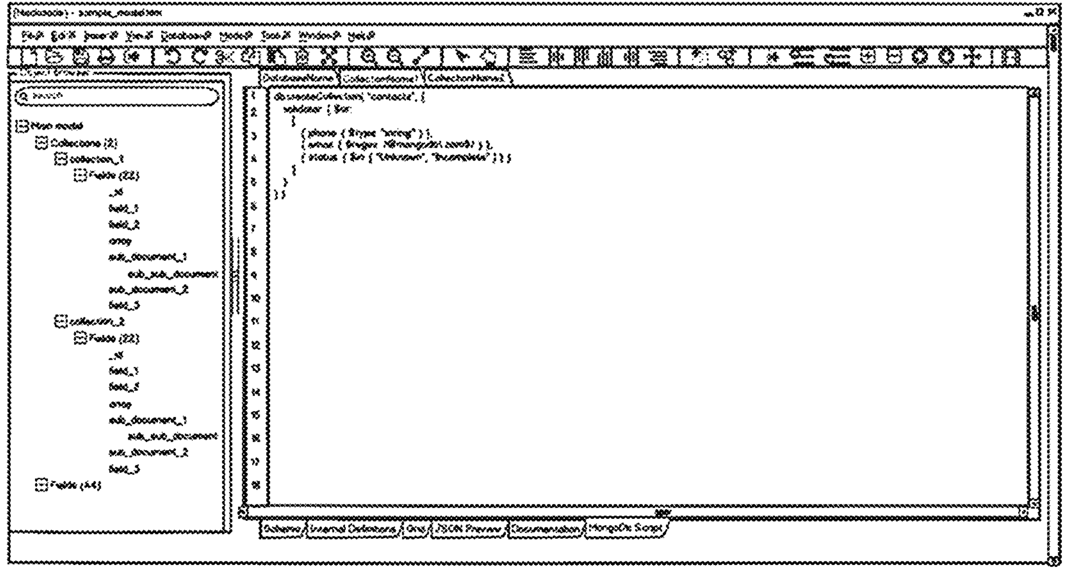
FIG. 52 shows an example database script.

With MongoDB 3.2, a document validator was introduced. The system will provide mapping between JSON Schema syntax and MongoDB validator syntax, cfr FIG. 52. Similar functionality will be made available for other vendors, where applicable.

2.2.3 Additional Functions 2.2.3.1 Open, Save, Save as, Close

These functions will be affected by the type of repository and the way persistence in performed. Other than that, the features should fulfill the functions that one could normally expect.

2.2.3.2 Reverse Engineer

This advanced feature takes as input either:

a simple JSON document, and generates the schema for that document the current model;

a JSON Schema, and fills the properties in the current model;

or connects to a NoSQL database and takes representative documents form the collections present in the database. It generates the schemas for the different collections in a workspace.

The user can then edit the model and save it independently of the source, cfr FIG. 6.

2.2.3.3 Export

Figure 53:
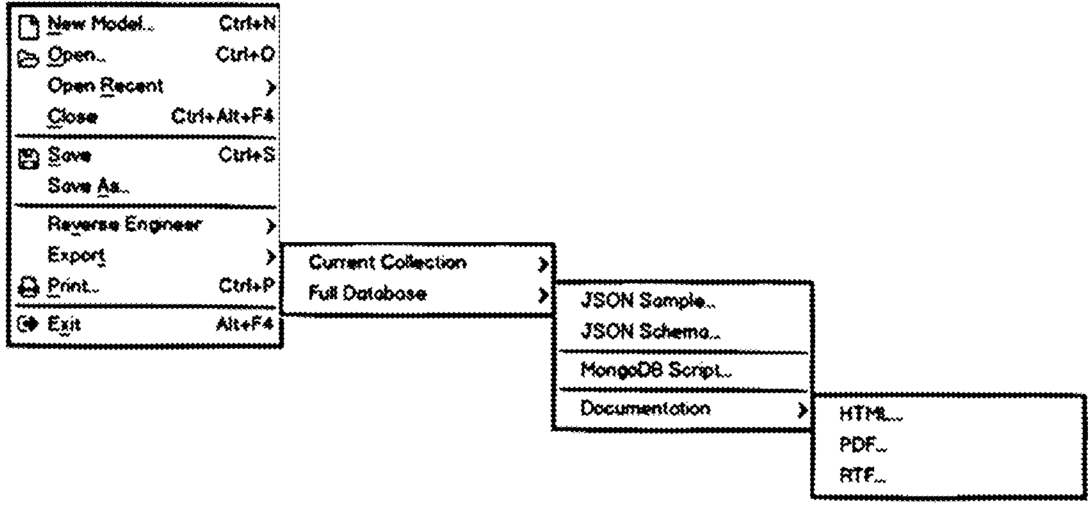
FIG. 53 illustrates the export feature.

This advanced feature lets the user export parts of the model or the model in full, in a variety of formats, cfr FIG. 53.

2.2.3.4 Print

Figure 54:
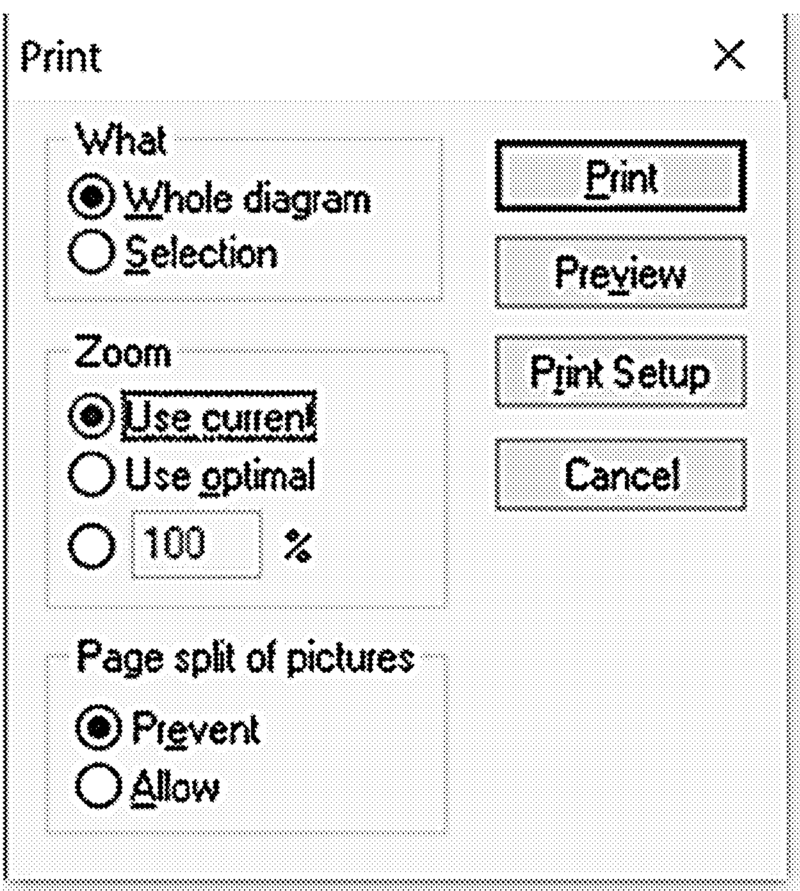
FIG. 54 shows the Print dialog.
Figure 55:
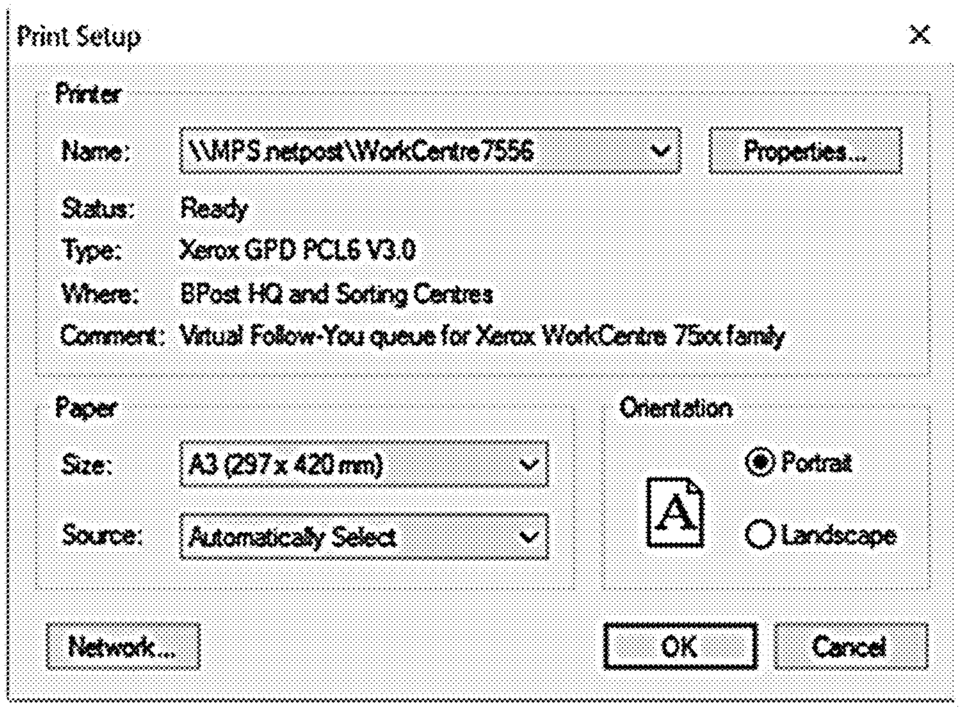
FIG. 55 shows the Print Setup dialog.

Printing is possible for diagrams, as well as for documentation, JSON documents, and schemas. The controls provided to the users should be as follows: print setup (so the printer and its properties, as well as the paper size can be selected), print preview (so the user can visualize the output prior to actual print), print selection, zoom level, and whether objects can print across page splits, cfr FIGS. 54 & 55.

2.2.3.5 Compare Models

The goal with this advanced feature is to provide a side by side view of 2 models (presumably 2 different versions of the same model), highlighting differences between them.

2.2.3.6 Options

Figures 56, 57:
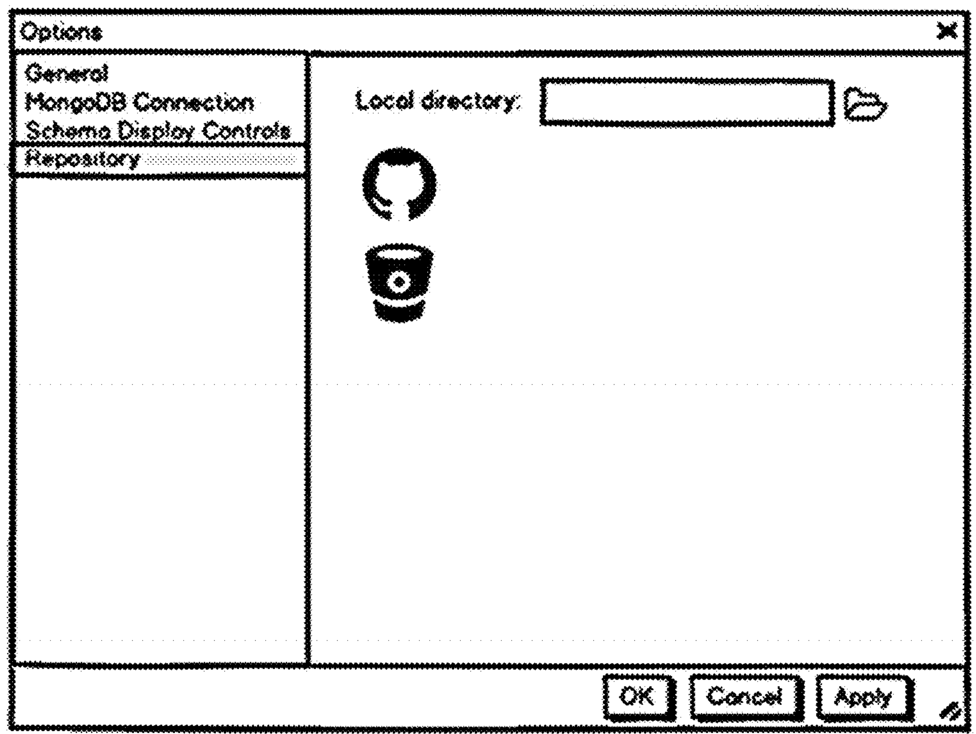
FIG. 56 shows the options interface.
FIG. 57 shows the JSON Schema display configuration.

Typically, parameters to be user-maintained appear in the course of design and development of an application, and they grow with the application, cfr FIG. 56.

For the schema display controls of the DTD diagram, several controls could be included in a JSON Schema display configuration, cfr FIG. 57.

3. Application to Relational Databases and Denormalization Suggestion Requirements In this section, the concept "denormalization" mentioned earlier in Sect. 2.2.2.2.2 is elaborated upon. In this document, the term "denormalization" refers to any conversion from a source database model to a destination database model wherein nesting takes place.

Specifically, this section discusses an embodiment of the present invention wherein a source relational database model is converted into a destination database model according to the present invention. Hereby the foreign keys present in the source relational database model are used for nesting. Specifically, the destination database model is obtained by nesting joined foreign tables.

The concept of denormalization illustrates the broad range of applicability of the present invention. While above, the applicability was illustrated mainly in case of NoSQL databases and REST APIs, relational databases and RDMS and all related aspects are equally in the scope of the present invention. In a preferred embodiment, this is done through "reverse-engineering", similar to the functionality explained above. In an alternative embodiment, this is done through "forward-engineering". In yet alternative embodiment, this is done by operating directly on a relational database and RDMS.

While denormalization is presented in this document as an embodiment of the present invention, it may also be considered as a stand-alone concept and related invention.

Specifically, the graphical user interface used in this section reflects only one embodiment of the concept of denormalization. In an alternative embodiment, denormalization as described in this document enables generating a destination database model from a source database model without necessitating a graphical user interface in any step of the generation method.

3.1 Introduction

Assuming that the function 'Reverse-Engineer DDL file' is available, an often requested additional function is to suggest a denormalized model based on an original relational model.

This document describes the process of taking a source relational model (created from scratch or through the reverse-engineering of a DDL file or RDBMS) stored with a method according to the present invention, and generating a new model while nesting joined foreign tables. After that process, the user can further edit and refine the denormalized model.

3.2 Concepts

Figures 58, 59:
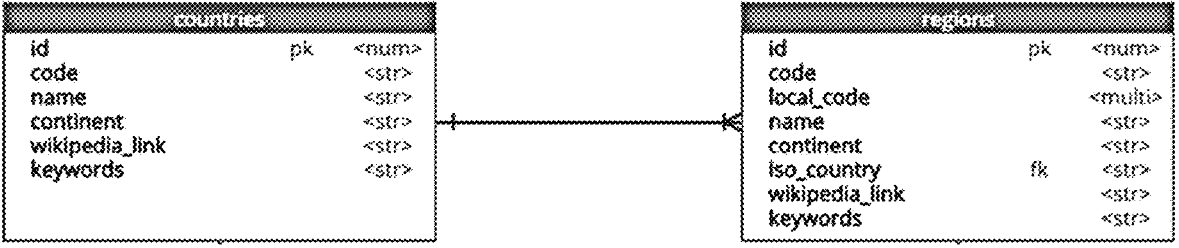
FIG. 58 shows two flat tables in a source model.
FIG. 59 illustrates a foreign key relationship.

Starting with 2 flat tables in the source model, see FIG. 58, with a foreign key relationship illustrated by FIG. 59, there are at least 2 ways and even 3 ways that denormalization could be seen, given in Sect. 3.2.1-3, respectively.

3.2.1 Sub-Document of Child Table Containing Foreign Parent Table Structure

As a flat table in a normalized source model is being copied to a collection in a denormalized destination model, if a foreign key relationship is encountered, the structure of the parent table is included as a nested sub-document of the collection.

Figure 60:
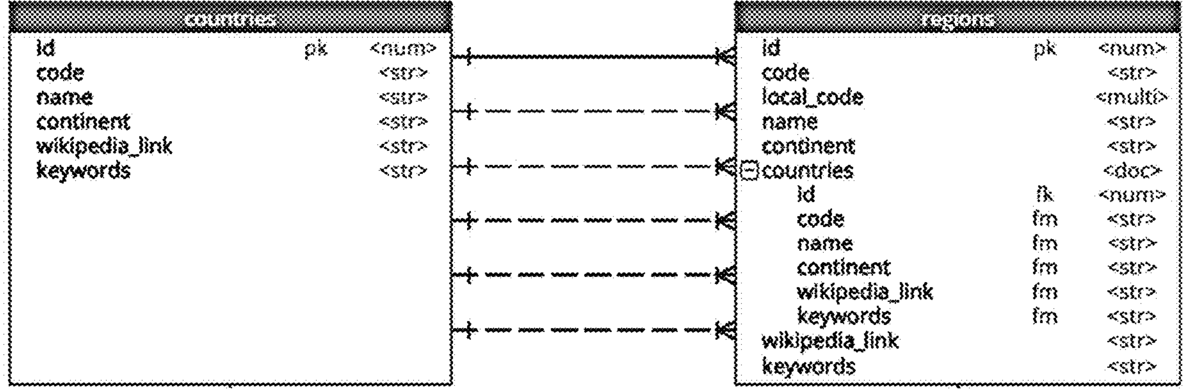
FIG. 60 shows a denormalization result.

The expected result of the new function is illustrated by FIG. 60.

Here, the parent table structure has been embedded as a sub-document structure in the child table. Foreign keys and foreign master relationships are automatically created in the embedding process.

3.2.2 Array in Parent Table Containing Child Table Structure

Figure 61:
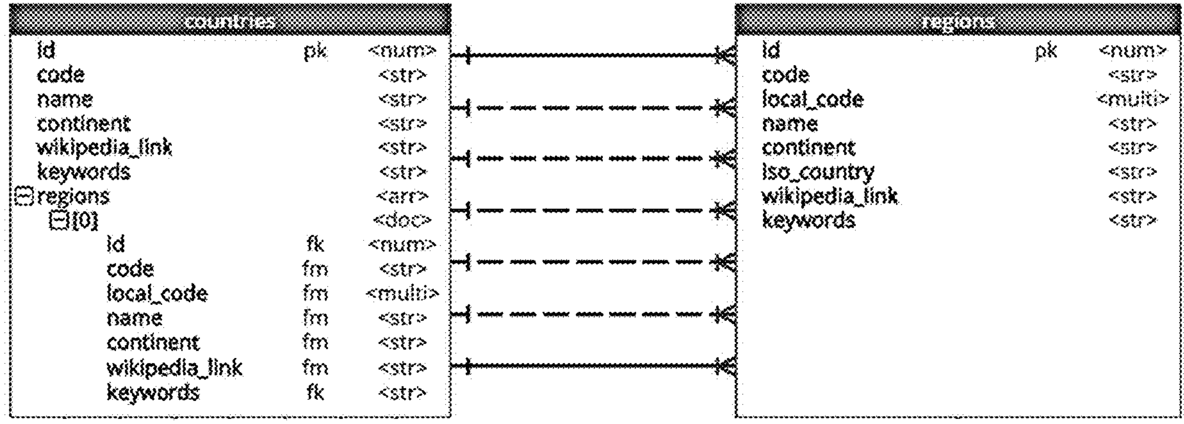
FIG. 61 shows a denormalization result.

Another way to perform denormalization is to create, in the parent table, an array with the structure of the child table, with the expected result illustrated by FIG. 61.

Remarks:

1) The child field with the original relationship is not repeated in the parent table array, so as to not create circular references
2) The parent-child relationship is inverted. Now the parent of the fields in the newly created array are the fields in the former child table.
3) As a result, the 1 . . . n cardinality is in the parent, see FIG. 62. Note how the field name would benefit from dot.notation to represent nesting.

3.2.3 Combination

Figure 63:
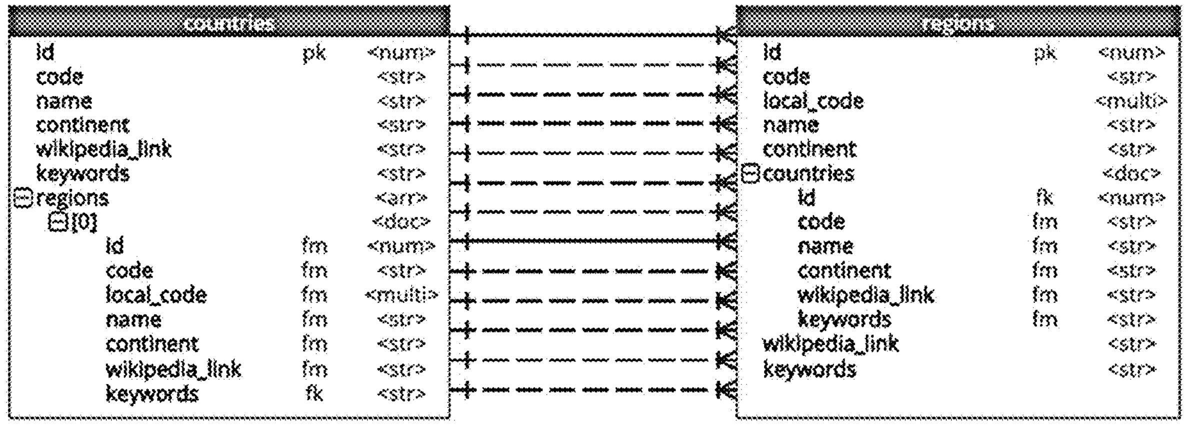
FIG. 63 shows a denormalization result.

If the 2 logics are combined, the following result is generated, illustrated by FIG. 63. Depending on how data is read, all 3 above ways to denormalize are possible.

3.2.4 Cascading

Figure 64:
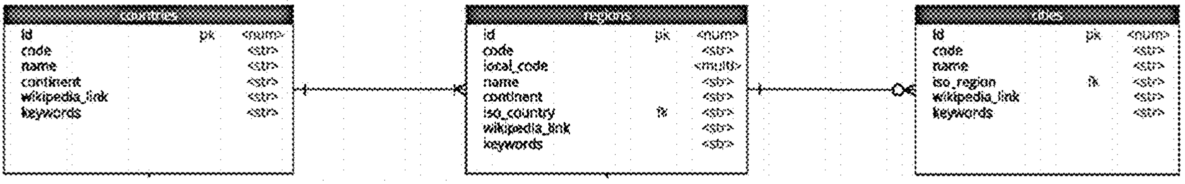
FIG. 64 shows three flat tables in a source model.
Figure 65:
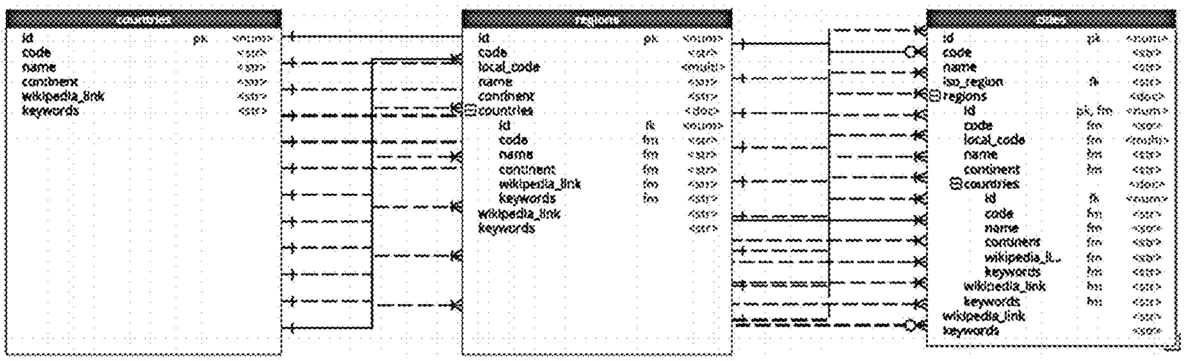
FIG. 65 shows a normalization result.

When a parent table is itself the child of another (grand-) parent, the result illustrated in FIG. 64 is obtained. It may be desirable to cascade the relationships into multiple levels of nesting, to achieve the result illustrated in FIG. 65. (It will be nice to be able to rearrange relationships to reduce elbowed lines . . . )

Figure 66:
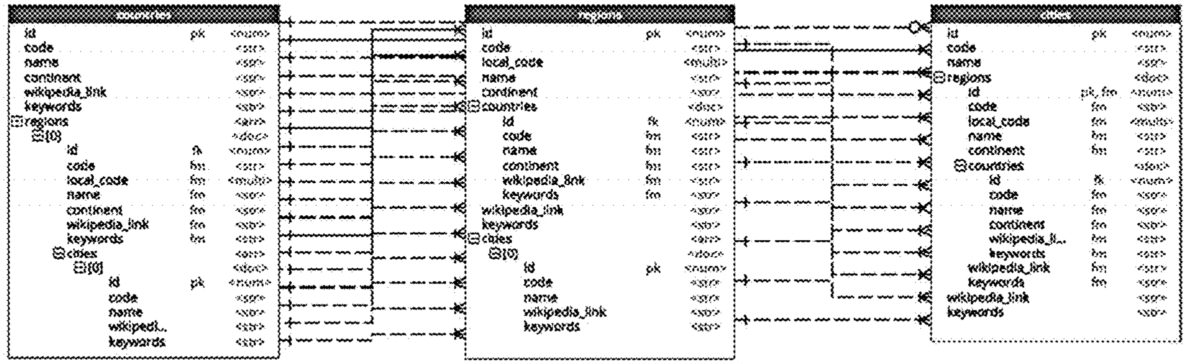
FIG. 66 shows a denormalization result.

And of course, the mirroring cascading array is possible, with the result illustrated in FIG. 66.

As this could go on and on forever in complex models, it is probably a good idea to limit the number of cascades, and let the user decide the number of cascades between 0 and a maximum of 3 for example. It is of course easier to delete an extraneous cascade than to manually create one.

3.2.5 Recursion

When a relationship exists between fields of the same table, again one can embed a child array into the parent, or embed a parent sub-document into the child. Here however, it is not suggested to do both.

Finally, there is no indication of how many times it would be necessary to cascade, without looking at the actual data.

Figures 67, 68:
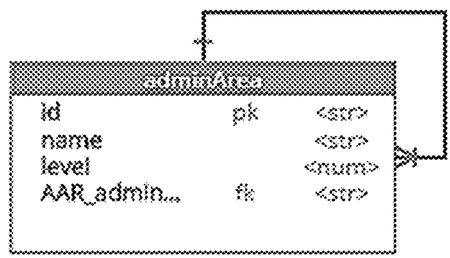
FIG. 67 shows a flat table in a source model.
FIG. 68 shows two denormalization results.

The relational table shown in FIG. 67 can be modelled in either of the 2 ways illustrated in FIG. 68.

3.2.6 Multiple Paths

Figure 69:
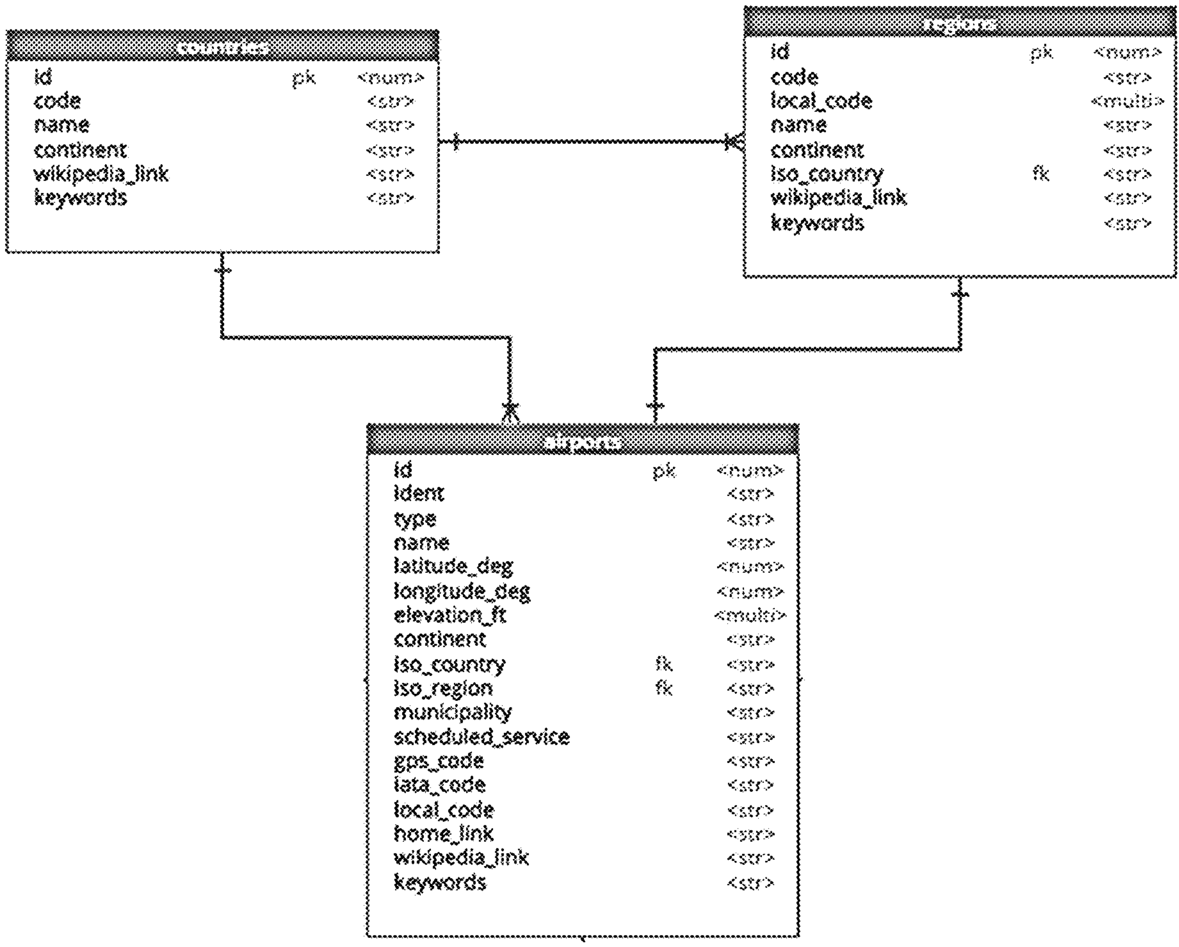
FIG. 69 shows three flat tables in a source model.

In the case shown in FIG. 69, the order in which tables are denormalized and converted can be of importance, as taking the route airports>regions>countries will provide richer, but more hierarchical, information.

3.2.7 Circular References

Circular references should be detected and avoided.

3.3. Process 3.3.1 Menu Access

Figure 70:
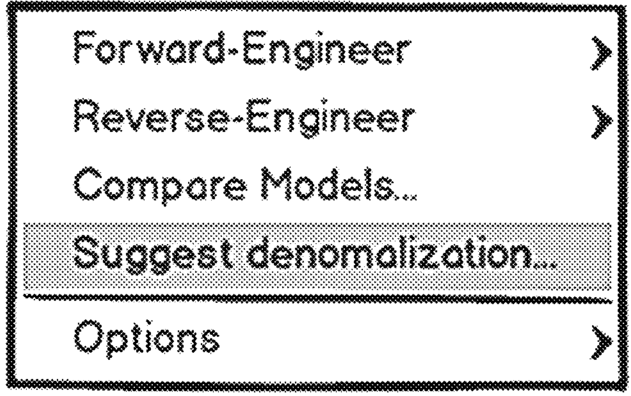
FIG. 70 illustrates the menu access.

Menu access is illustrated in FIG. 70.

3.3.2 Save Current Model

Figure 71:
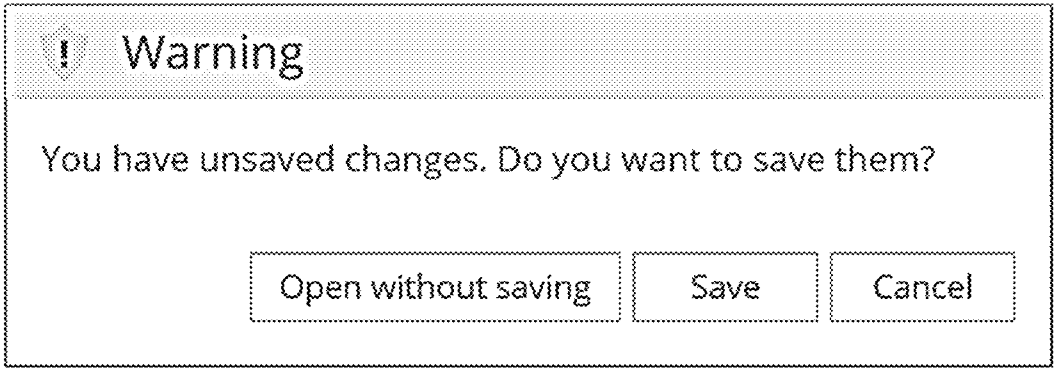
FIG. 71 shows a warning relating to saving of the current model.

The display shown in FIG. 71 occurs if changes have been made, so the denormalization suggestion can be stored in an empty model.

3.3.3 Selection and Parameters

Figures 72, 73:
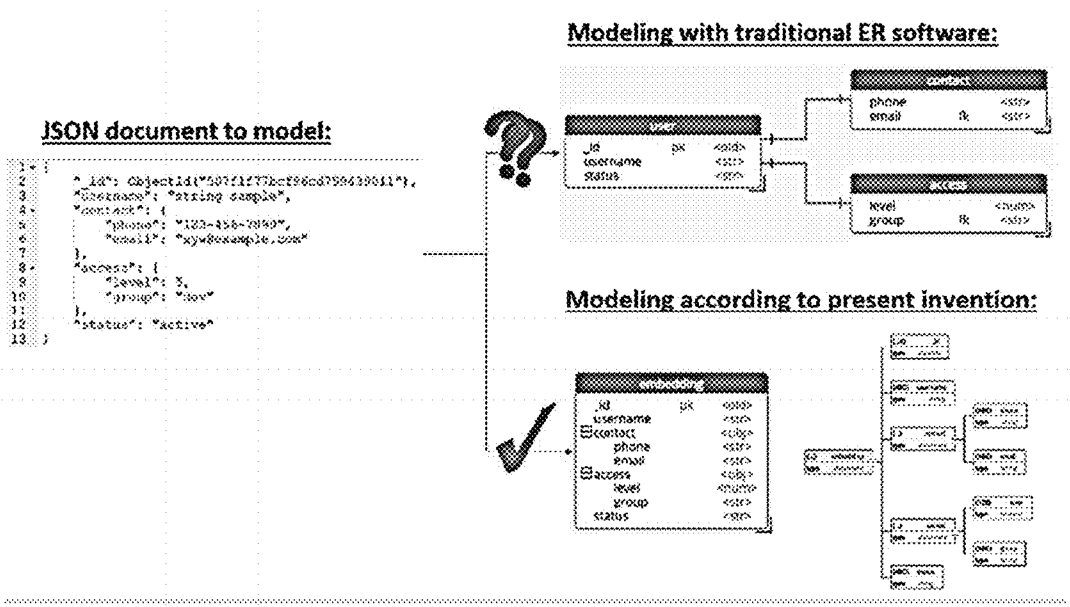
FIG. 72 shows a parameter interface relating to the denormalization process.
FIG. 73 shows an example problem with solution according the present invention.

The user can select all tables or specific tables to be denormalized, as well as set some parameters to be used during the model denormalization process. This is illustrated by FIG. 72.

3.3.4 Execution

The process will include at least the following steps:

- Copy tables from source (normalized) to destination collection (denormalized)
- Select first relationship in source
  - Embed in destination model according to chosen parameters
    - If array in parent collection:
      - Append array item with type=document
      - Copy child structure into document array item, except relationship field
    - If sub-document in child collection:
      - Replace relationship field with
      - Collection made of copied parent structure.
  - Create Foreign Key and Foreign Master relationships
  - Iterate according to Cascade and Recursion parameters
  - Go to next relationship and loop

Example 2

Figures 74, 75, 76:
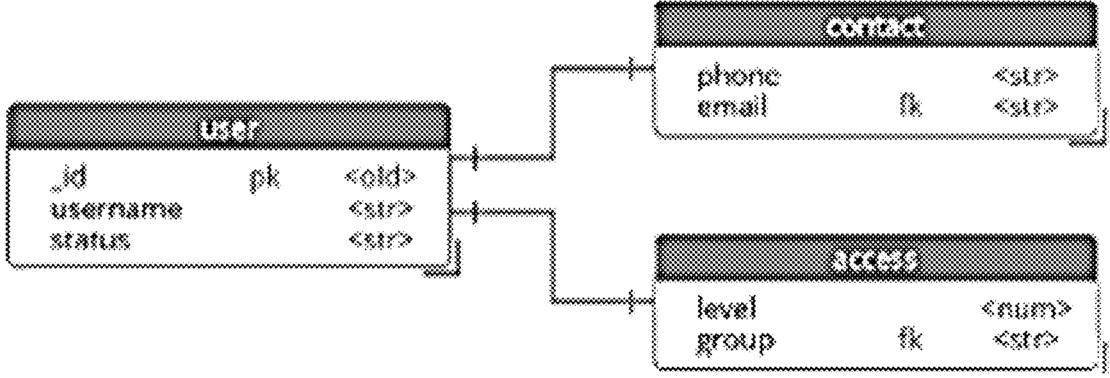
FIG. 74 shows the "JSON document to model" of the example problem.
FIG. 75 shows the "Modeling with traditional ER software" of the example problem.
FIG. 76 shows the "Modeling according to present invention" (part 1 of 2) of the example problem.
Figure 77:
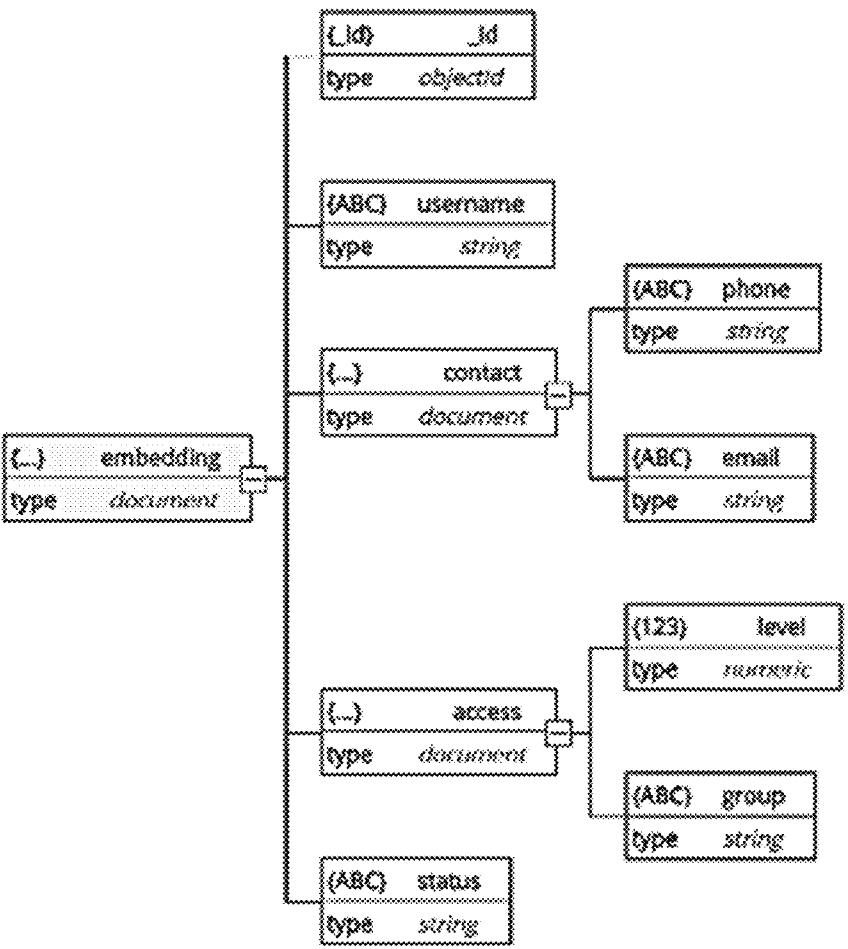
FIG. 77 shows the "Modeling according to present invention" (part 2 of 2) of the example problem.

Example 2 is illustrated by FIGS. 73 to 77. FIG. 73 shows an example problem with result according the present invention. Hereby, FIGS. 74 to 77 show magnified portions of FIG. 73. First of all, FIG. 74 shows the "JSON document to model". Furthermore, FIG. 75 shows the "Modeling with traditional ER software", whereas FIGS. 76 and 77 together show the "Modeling according to present invention" of the example problem. The problem investigated in this example is how to construct and/or edit the portion of JSON document code provided in FIG. 74, thereby supported by a GUI. As clear to the skilled person, said portion of code defines a simple JSON document relating to an individual, comprising both top-level information relating to, i.e. the fields with field names "_id", "username", "contact", "access" and "status", as well as nested information, i.e. two nested objects, relating to the field names "contact" and "access", respectively. A result according to the state of the art is given in FIG. 75, with an Entity Relationship Diagram (ERD) comprising three collections. This is opposed to the ERD as obtained with an embodiment of the present invention and shown in FIG. 76, complemented with a tree diagram shown in FIG. 77.

Overall, the present invention allows to reflect the original JSON document structure through structure (less collections, only "true" relationships) (particularly in the ERD), sequence preservation (both in the ERD and the tree diagram), interaction (both in the ERD and the tree diagram), and indentation (reflecting nesting) (particularly in the ERD), while state of the art methods fail to do so. Hence, the result of the present method is not only more true to the original JSON document definition, but also more compact in terms of ERD, allowing for a clearer and overall better overview. Additionally, also the interactive editing of the database schema model is more flexible, with richer interaction thanks to the choice between the ERD and the tree diagram. This is discussed in more detail below.

First, remark how the database schema model constructed with a state of the art method comprises a first collection for said top-level information, as well as a second and third collection for each of said two objects. This is a first problem with a state of the art method, since the separation of information across three separate objects obfuscates the unity of the underlying information. Indeed, there is no point in removing said two objects from their original context. This may mislead a user of the method into thinking that the information relating to "contact" and "access" is somehow "less closely relating" to said individual, as opposed to, e.g., "username", which seems "more closely relating" to the said individual. This difference is a misconception altogether, since "contact", "access" and, e.g., "username" actually belong to the same top-level in the original JSON document. This misconception may lead to severe errors in the construction and editing of databases. Opposed to this, the present invention preserves the original context, with "contact", "access" and "username" all on the same level, both in the ERD illustrated by FIG. 76 and the tree diagram illustrated by FIG. 77.

A second related point concerns the preservation of hierarchy and the related interaction that is enabled by a result according to the present invention. While the fields belonging to the two objects "contact" and "access" are inevitably visible in FIG. 75 (result according to the state of the art), more flexibility is enabled in FIG. 76 (according to present invention), with collapsible items, indicated with a collapse-related icon, i.e. a square containing a "−" sign when the object content is visible (as shown), and a square containing a "+" sign when the object is collapsed (not shown). This has the advantage of allowing a very compact view, displaying all top-level objects but not the details, which enhances usability. Moreover, it creates an additional way for the user to interact with the database schema model, enabling him/her to gain familiarity with a database schema model and/or explain it to others by clicking/touching the collapse-related icon. Additionally, even in non-interactive views (such as printed documentation) the insight of the end user is enhanced, since the ERD of FIG. 76 is complemented by the tree diagram of FIG. 77. This allows a complementary approach, e.g. by showing a collapsed view for the ERD (i.e., without showing the content of objects), complemented with the tree diagram which indeed shows all detail.

Another advantage of the present invention lies in the preservation of sequence. Both the ERD and the tree diagram show the original sequence among field names on every level, as defined in the JSON document. For the result according to the state of the art this sequence is not preserved: as clear from FIG. 75, it can no longer be determined whether, e.g., "contact" was in first, second, third, fourth or fifth position in the list at top level. This obfuscation of sequence leads to incomplete interaction with the database schema model, another problem that is solved by the present invention.

A further advantage of the present invention is the purposeful use of indentation in the ERD. As visible on FIG. 76, fields belonging to an object are indented with respect to the object name, which serves at least two purposes. On the one hand, it serves to easily confine the object's content in a visual manner. On the other hand, it mimics the typical layout of JSON document code as illustrated in FIG. 74. Therefore, a user with prior experience with JSON is likely to have little difficulty in understanding the ERD according to the present invention, and is hence less inclined to make mistakes in his/her interaction with the database schema model.

Furthermore, remark the presence of two "relationships" in the database schema model constructed with a state of the art method, both of which seem relationships in the sense of RDBMSes, but in fact concern "nesting relationships", which further obfuscate the unity of the underlying information. Indeed, by adhering to a "flat-table-only" representation, the user constructing database schema models with a state of the art method is faced with a whale of an entity relationship diagram, lacking any sense of overview. This is particularly true if it concerns a database schema model comprising "true" relationships such as foreign key relationships, such as the foreign key relationship linking two collections in FIG. 58. In a method according to the prior art, the denormalization of a relational database schema model as described in this document would lead to a dramatically complicated ERD, with a confusing mix of nesting relationships and "true" relationships. Opposed to this, the method according to the present invention only creates relationships when necessary, i.e. none in the case of the present example, and only a limited number in the case of FIG. 58, illustrated e.g. in FIGS. 60 and 61. As a result, the user interacting with a database schema model according to the present invention keeps a better overview of the relevant relationships, making less errors on average as a consequence.

Example 3

Figure 78:
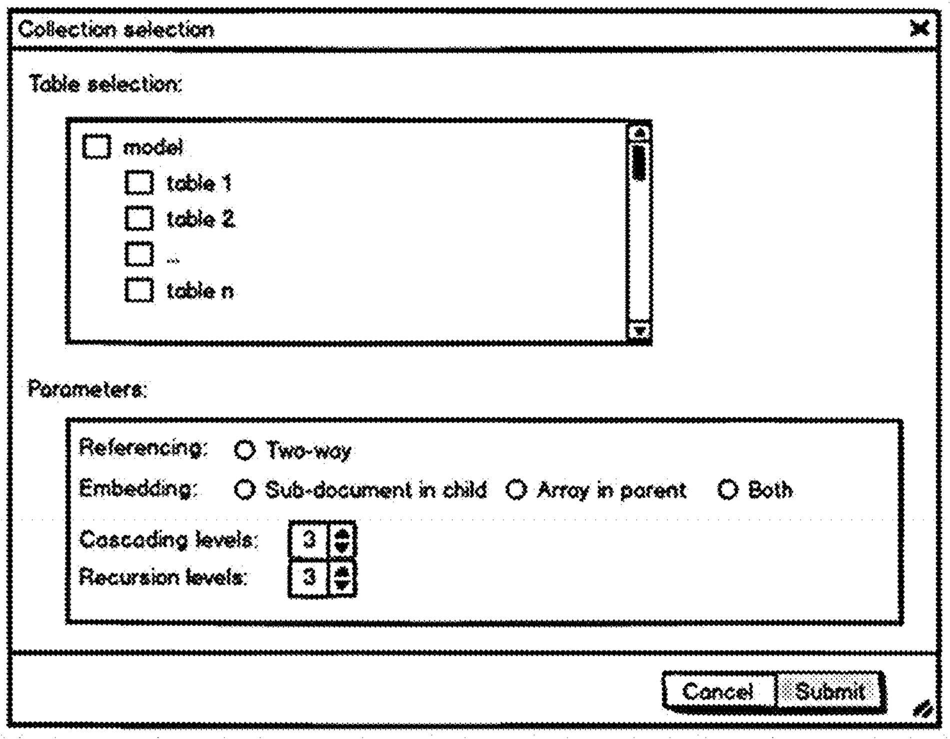
FIG. 78 shows an example interface relating to referencing and denormalization.
Figure 79:
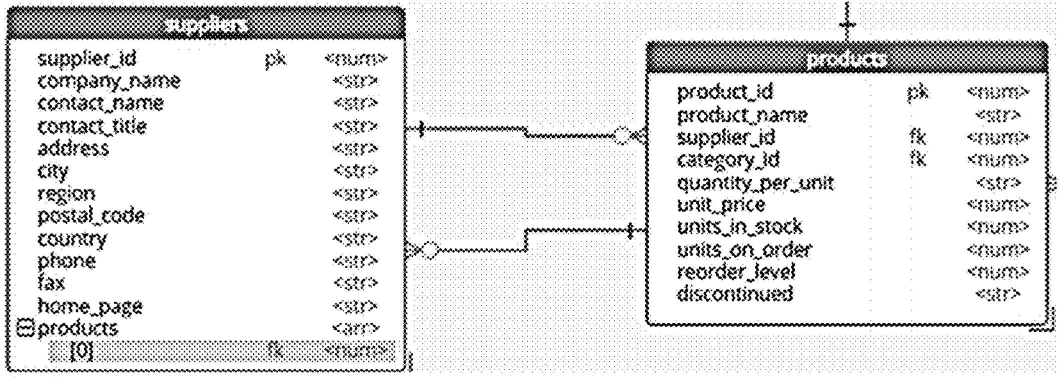
FIG. 79 shows an example relating to referencing and denormalization.

FIGS. 78 and 79 show an example relating to referencing and denormalization. Particularly, FIG. 78 shows an example interface that complements the interface of FIG. 72 introduced in Sect. 3.3.3 of Example 1, allowing the user to select all collections (tables) or specific collections (tables) to be denormalized, now with the additional option to choose two-way referencing. The difference between referencing and embedding is as follows. With embedding, when an array is denormalized in parent (and also for that side when "both" is selected), an array is created made of a sub-document with all the fields of the child. Referencing, on the other hand, answers the need to bring only the keys to the parent, and not all the associated fields. That means that on the parent side, there would only be a simple array of foreign keys referencing the primary key of the child. In the corresponding ERD according to the present invention, only an array of simple fields is shown. This is illustrated in FIG. 79.

Example 4

Figure 80:
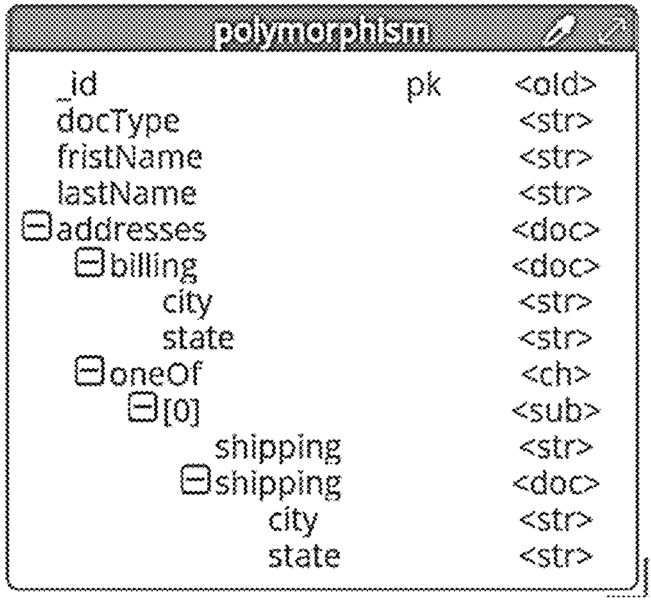
FIG. 80 shows an example ERD.
Figure 81:
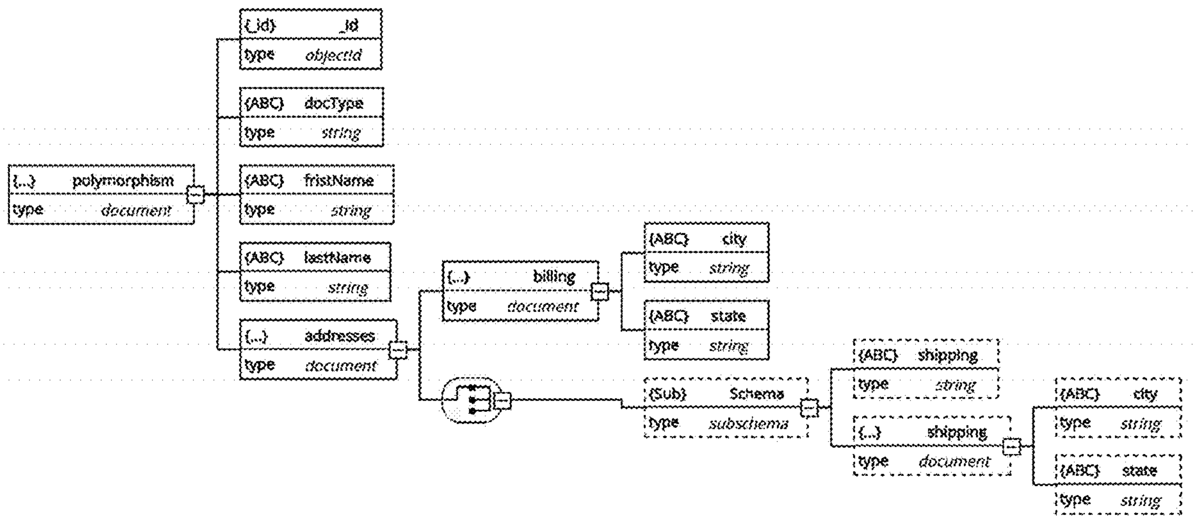
FIG. 81 shows an example tree diagram.

FIGS. 80 and 81 show an example ERD and associated tree diagram according to an embodiment of the present invention, respectively. Together these figures illustrate the capability of the present invention to deal with an important and useful feature of JSON as applicable to NoSQL and Big Data, namely polymorphism. Polymorphism relates to the ability to deal with evolving and flexible schemas, both at the level of the general document structure, and at the level of the type of a single field. This is known as 'schema combination', and can be represented in JSON Schema with the use of subschemas and keywords: anyOf, allOf, oneOf, not. FIGS. 80 and 81 illustrate an ERD and associated tree diagram comprising a field that evolved from being just a string type, to a sub-document, or with the co-existence of both field types. Prior art methods would have a hard time dealing graphically with such subschemas, whereas the representation in FIGS. 80 and 81 is clear and self-evident.

Example 5—Example Embodiments with GraphQL

According to separate aspects, the invention may relate to applications for a database system, a REST API, or a combination thereof. According to a further aspect, which is not intended to limit the scope of the invention in any way, the invention may relate to GraphQL instead of database systems and/or instead of REST APIs.

According to yet other aspects, the invention may relate to applications combining GraphQL with a database system, or with a REST API, or with both a database system and an API. Merely for the sake of highlighting applications with GraphQL and its difference with regards to other applications (such as applications with a database system and/or with a REST API), below, embodiments which include GraphQL are described so as to be contrasted with other embodiments, such as embodiments with REST and without GraphQL. It is emphasized that this is merely for the sake of insight in relation to GraphQL, and not to be construed as limiting the invention with respect to its applicability beyond GraphQL. Particularly, everything described under the heading "Example embodiments with GraphQL-detailed description" is not to be construed as limiting the invention in any way when it comes to aspects of the invention that do not involve GraphQL, such as embodiments with applications for a database system, a REST API, or a combination thereof. For embodiments not involving GraphQL, even when REST is mentioned, everything under the heading "Example embodiments with GraphQL-detailed description" is non-limiting.

Example Embodiments with GraphQL—Detailed Description

GraphQL is a relatively recent API technology, introduced by Facebook in 2015 and open-sourced the same year. Despite its youth compared to REST, which has been around since the early 2000s, GraphQL has quickly gained widespread adoption in modern web development. As opposed to REST APIs, GraphQL prevents over-fetching and under-fetching, making it particularly appealing for applications requiring dynamic and efficient data fetching. The rapid rise of GraphQL reflects its alignment with the evolving needs of developers building highly interactive and data-driven applications.

The skilled person will appreciate that GraphQL and database systems relate to different approaches. This said, also GraphQL and REST are two fundamentally different and distinct approaches to building APIs, each with its own characteristics. GraphQL is a query language and runtime for APIs that allows clients to request exactly the data they need, while REST relies on predefined endpoints that return fixed data structures. For this reason, these different approaches may benefit from the non-traditional ERD structure according to the invention (i.e., different from Chen's definition of ERDs, see below, which provides flat tables and does not include any form of hierarchy within a table (and hence, no nesting) in different ways. Here are seven key differences between GraphQL and REST:

1. Data Fetching: In GraphQL APIs, clients can specify the exact fields they need in a single query, whereas REST APIs often require multiple requests to different endpoints to fetch related data.
2. Over-fetching/Under-fetching: GraphQL prevents over-fetching (receiving unnecessary data) and under-fetching (not receiving enough data), which are common in REST due to rigid endpoint responses.
3. Versioning: REST APIs typically require versioning (e.g., /v1/users), while GraphQL avoids this by evolving schemas without breaking changes.
4. Endpoints: REST uses multiple endpoints for different resources, while GraphQL uses a single endpoint to serve all queries and mutations.
5. Flexibility: GraphQL provides more flexibility, allowing clients to define their data shape, whereas REST has fixed data structures determined by the server.
6. Performance: REST may lead to over-fetching data or multiple round trips for related resources, while GraphQL minimizes these issues by allowing nested queries.
7. Error Handling: In REST, errors are typically tied to HTTP status codes, whereas GraphQL includes error details in the response, regardless of HTTP status.

Correspondingly, embodiments with GraphQL may advantageously offer adaptability for modern applications, whereas embodiments with REST may advantageously offer simplicity for traditional use cases.

When comparing GraphQL and REST in terms of graphical user interface (GUI) and the use of traditional Entity-Relationship Diagrams (ERDs) (i.e., ERDs as introduced and defined by Peter Chen in 1976 in his seminal paper titled "The Entity-Relationship Model-Toward a Unified View of Data", ACM Transactions on Database Systems, 1(1), 9-36, doi: 10.1145/320434.320440), several differences emerge:

1. GUI Tools: GraphQL already has GUI tools like GraphiQL, Apollo Sandbox, and GraphQL Playground, which allow developers to write, test, and visualize queries interactively. These tools make GraphQL APIs easier to explore and debug. In contrast, REST APIs often rely on external tools like Postman or Swagger for similar purposes, but they lack the dynamic schema introspection and query-building capabilities of GraphQL.
2. Entity-Relationship Diagrams (ERDs): (traditional) ERDs can be used in REST API design to visualize relationships between entities since REST endpoints often map to resources in the database. While ERDs are still relevant for GraphQL, the flexible nature of its schema, which allows for combining multiple entities into a single query, means that may be harder to tie ERDs directly to the database. Instead, GraphQL schemas focus on defining types, queries, and relationships, which can be documented through schema visualization tools specific to GraphQL, which, in prior art methods and systems, may have limited or very limited support for ERDs, and, if any, always in accordance with Chen's definition of ERDs, with flat tables and without any form of hierarchy within a table (no nesting).

Correspondingly, embodiments of the invention with GraphQL may advantageously offer an interactive and visual developer experience that surprisingly includes an ERD which moreover is a non-traditional ERD modified to include nested elements in order to satisfy the needs of modern applications. In contrast, without limiting the invention in any way with respect to its applicability with REST, embodiments with REST may provide closer task alignment for tasks with resource-oriented structure that includes an ERD which, surprisingly, is a non-traditional ERD modified to include nested elements in order to satisfy the needs of modern applications.

Below, more detail is given regarding example GraphQL plugin requirements, followed by details on example GraphQL schema reference.

GraphQL Plugin Requirements

Just like the Swagger/OpenAPI plugins, the plugin for GraphQL must be of a different breed than database or file format plugins. Specifically, it must include 2 concepts:

- structure
- operations for requests and responses, both using structures

In the Swagger/OpenAPI, the distinction is clear in the specification. Structure is defined in definitions/components while operations are defined in paths. Consequently, we have a tab for the API Model, and tabs for the Schema ERD View of the Definitions/Components tab.

In GraphQL SDL it is all mixed up.

When it comes to operations, it is no surprise that GraphQL supports:

- queries (equivalent to a GET request in REST)
- mutations (equivalent to POST, PUT and DELETE)
- subscriptions (also available in AsyncAPI and with webhooks in OpenAPI 3.1)

Looking at the other tools available to design GraphQL schemas, it is an ambition of the invention to provide the same kind of user-friendliness/intuitiveness that was provided earlier regarding nested objects in JSON and NoSQL databases. In other words, it is the intention to provide an alternative to the normalized ERDs by embedding instead of referencing. This is made harder by the GraphQL SDL specification which is entirely normalized.

In particular, a disconnect is observed between the fact that both requests and responses contain nested objects while structures are 100% normalized. GraphQL responses are enveloped in JSON. Readability and comprehension of ERDs are further hindered by the proliferation of boxes as models grow in size: the GitHub GraphQL API only has 28 query entry points, but a traditional ERD would show 1387 boxes . . . . To understand the full structure of an entity, the reader must follow so many arrows, it's not even funny.

Consider this simple schema:

```
type Query { order(id: String!): Order }
type Order {
  id:String
  orderDate:String
  customers:Customer!
  orderLines:[OrderLine]!
}
type Customer {
  custID:String
  name:Date
  addresss:Address
}
type Address {
  street:String
  city:String
  zip:String
}
type OrderLine {
  seq:Int
  item:String
```

-continued

```
  description:String
  qty:Int
  unitPrice:Float
}
```

Figure 82:
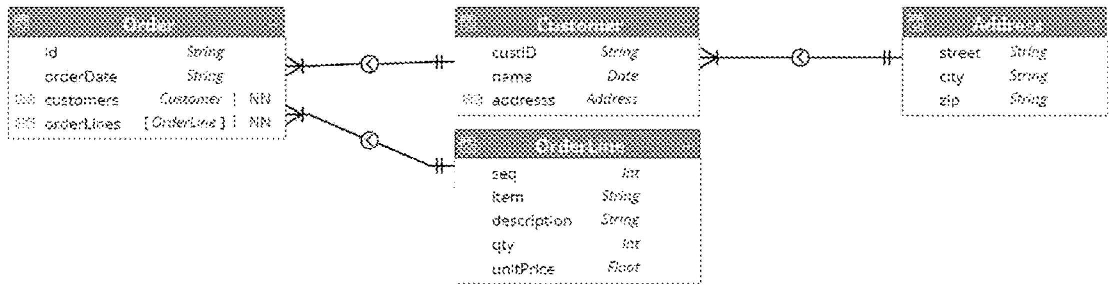
FIGS. 82 to 102 illustrate example embodiments relating to GraphQL.
Figure 83:
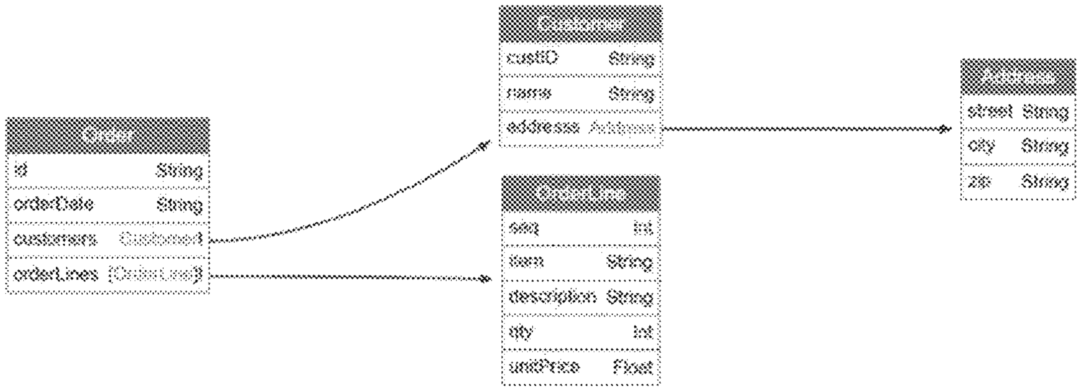
Figure 84:
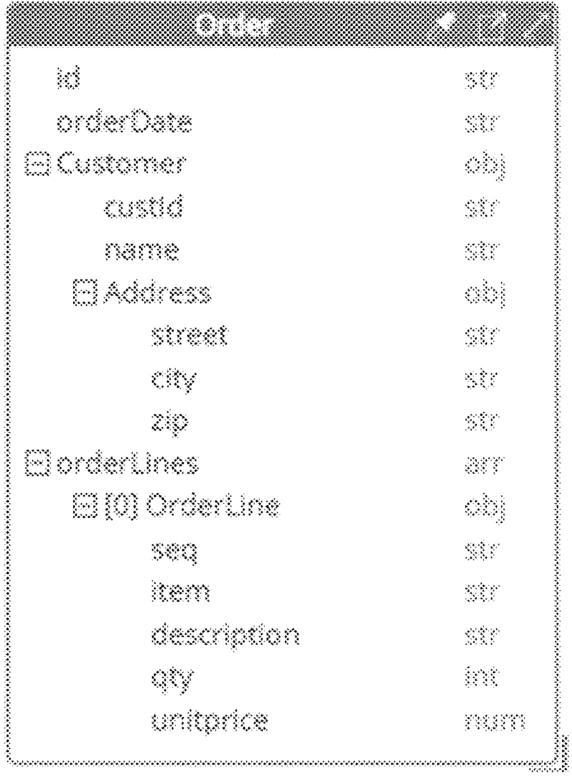
Figure 85:
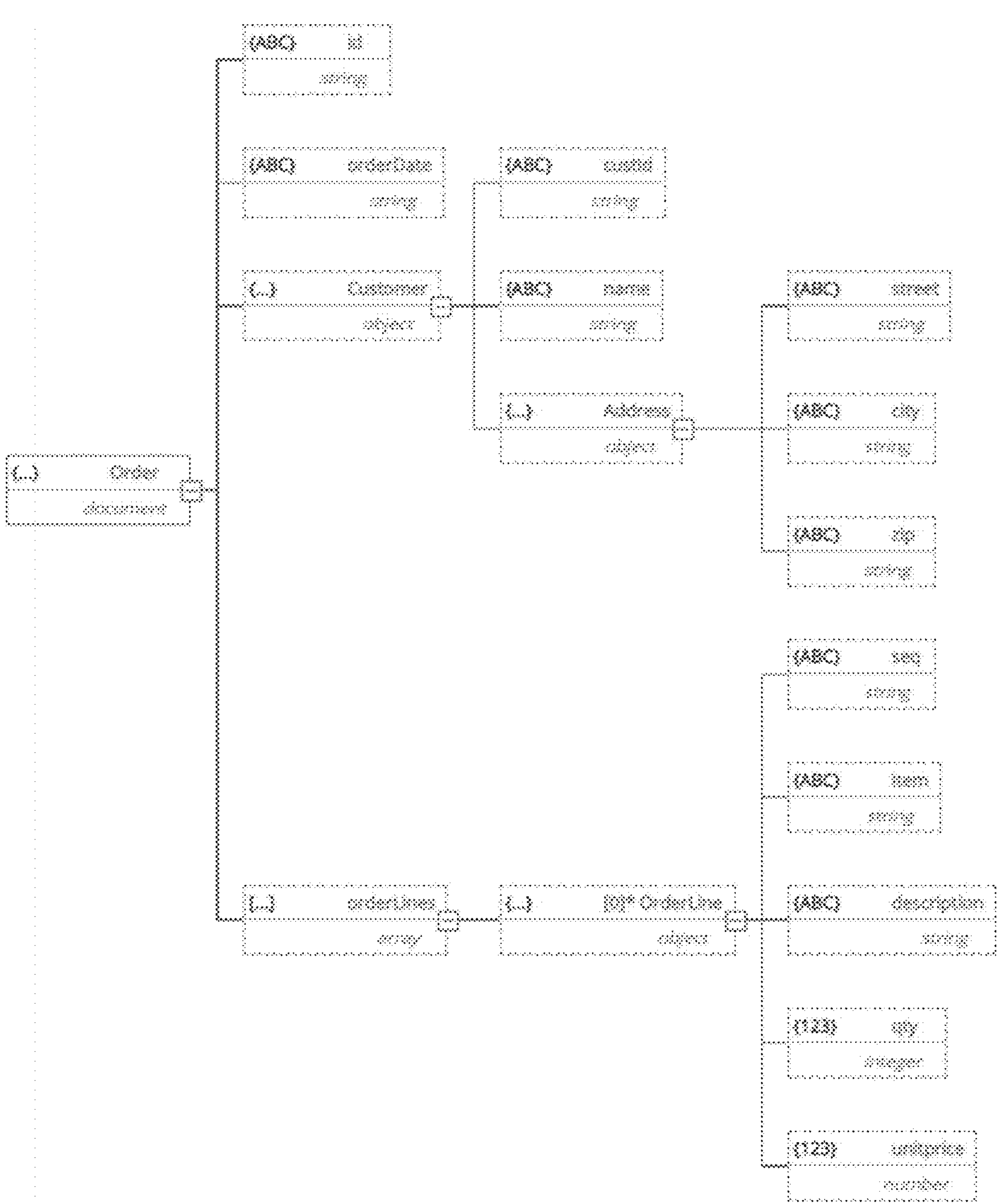

Existing tools show this kind of normalized picture, illustrated in FIG. 82; or this one in another tool, see FIG. 83. Instead, the invention may propose to show this unified picture, illustrated by FIG. 84. This may correspond to the tree view for individual entities shown on FIG. 85.

Granted, the pictures of the existing tools more closely match the physical schema described in the SDL. But for a human trying to understand the aggregate concept, and moreover without knowledge of the syntax, the approach according to the invention is more user-friendly for a "business" person who does nor necessarily care about the technical implementation. Or even for a data modeler, who's not a developer.

Besides, if we now take a look at this example query:

```
{
  order(id: "12345") {
    id
    orderDate
    customers {
      custID
      name
      address {
        street
        city
        zip
      }
    }
    orderLines {
      seq
      item
      description
      qty
      unitPrice
    }
  }
}
with this result:
{
  "data": {
    "order": {
      "id": "12345",
      "orderDate": "2022-01-01",
      "customers": {
        "custID": "ABC123",
        "name": "John Smith",
        "address": {
          "street": "123 Main St.",
          "city": "New York",
          "zip": "10001"
        }
      },
      "orderLines": [
        {
          "seq": 1,
          "item": "Widget",
          "description": "A shiny widget",
          "qty": 10,
          "unitPrice": 5.99
        },
        {
          "seq": 2,
          "item": "Gadget",
          "description": "A useful gadget",
          "qty": 5,
          "unitPrice": 9.99
        }
      ]
    }
```

-continued

```
        }
    }
```

we observe that both the query and the result contain nested objects (with the response being in JSON), so it seems useful to insulate the user from the normalized form of the technical implementation.

Adding mutations, the situation is similar to queries:

```
type Mutation {
  createOrder(input: OrderInput!): Order
  updateOrder(id: String!, input: OrderInput!): Order
  deleteOrder(id: String!): Order
}
input OrderInput {
  orderDate: String
  customers: CustomerInput!
  orderLines: [OrderLineInput]!
}
input CustomerInput {
  custID: String
  name: Date
  address: AddressInput
}
input AddressInput {
  street: String
  city: String
  zip: String
}
input OrderLineInput {
  seq: Int
  item: String
  description: String
  qty: Int
  unitPrice: Float
}
```

Relating to spec, following is listed.

https://spec.graphql.org/October2021 https://github.com/graphql/graphql-spec https://graphql.org/learn/schema/ https://www.prisma.io/blog/graphql-sdl-schema-definition-language-6755bcb9ce51.

https://www.digitalocean.com/community/tutorials/graphql-graphql-sdl

In relation to structure, following is noted.

In general for databases and storage formats, we have a structure of Model>Containers>Entities>Attributes. We also find at the model level: relationships and model definitions.

With Swagger/OpenAPI, we introduced a different structure with Resources (for Requests and Responses) which deviates from the standard database or storage format.

For GraphQL, we need to further deviate from the OpenAPI structure. Specifically, we will need to support the concept of federation with subgraphs/supergraph. Using Apollo Federation, users can define a single GraphQL schema that represents the combined API of all of the individual GraphQL services in the federation. This allows clients to access data from multiple services in a single GraphQL request, as if they were all part of a single API.

Without diving into the details, it means that a model could contain multiple graph schemas. Definitions must be specific to a container, and probably also relationships. Also, just like in OpenAPI, there are different categories of definitions (called objects in GraphQL.)

The required property in GraphQL is marked with an exclamation point ("!"). In the ERD, let's use the ! instead of the star * that we're using elsewhere.

In relation to Object Browser, following is noted.

The OB illustrates the structure. A model can be made of multiple containers, each container representing a graph API, and hence an SDL file. Each graph container is made of operations (queries, mutations and subscriptions) as well as entity/type objects. To make constructions and maintenance easy, we also provide definitions for reusable objects that are specific to the SDL syntax, made of each SDL syntax root keyword: scalar, enum, type, interface, input, union, extend, and directive.

Figures 86, 87:
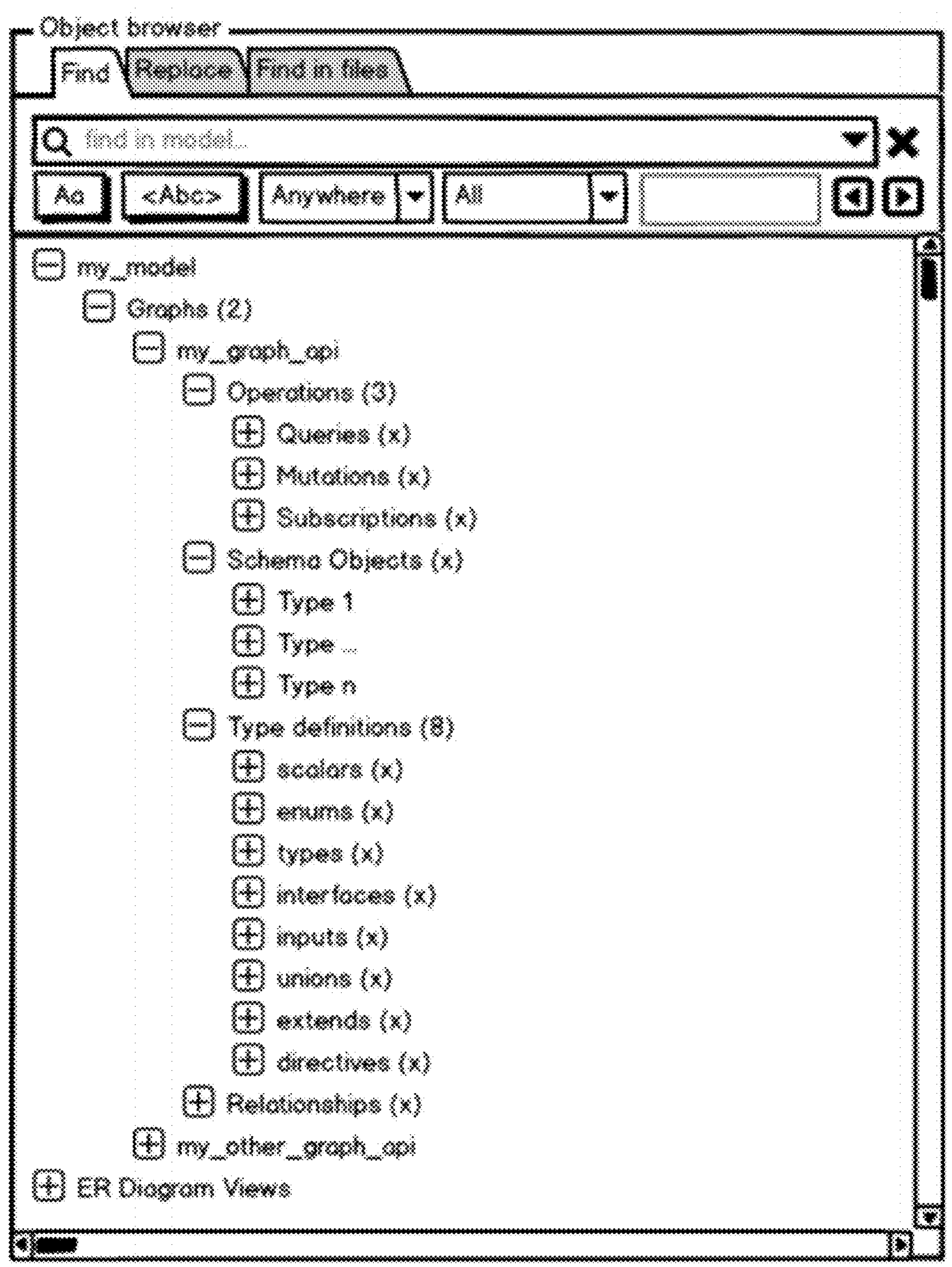

Only ERD Views are at the model level, as users might want an ERDV across graphs, see FIG. 86.

In relation to lower central tabs, following is noted.

With reference to FIG. 87, it is provided to have 2 ERD tabs, just like we now have Swagger OpenAPI: one for the Operations and one for the Schema objects. Both are across multiple containers.

We also have a tab for the Type definitions (as seen also in the OB above), with a drop down to select the container concerned.

The last tab is for the artifact output, i.e. the GraphQL SDL, also with a drop down to select the container concerned.

In relation to functional requirements, following is noted.

For sake of simplicity in the requirements, examples going forward use a single graph. The invention is not limited thereby, multiple graphs may be involved.

In relation to functional requirements—type definition tabs, following is noted.

Figure 88:
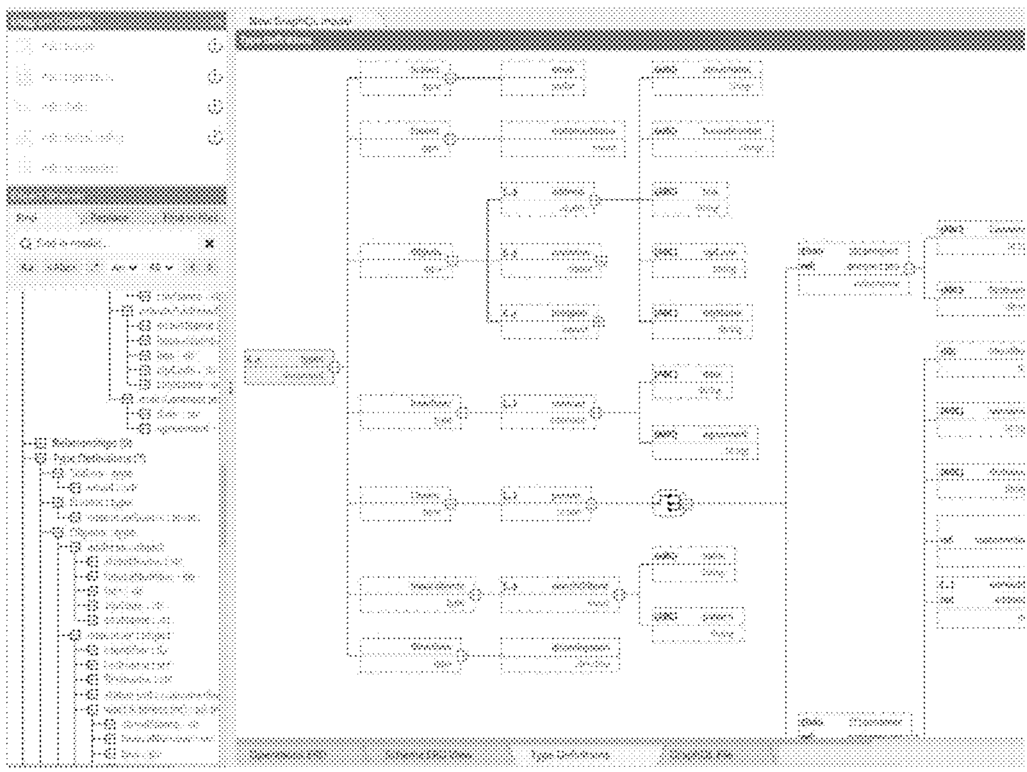

Just like in OpenAPI, the definitions tab ("Type definitions") is preset with categories, to which the user can add objects of different nature, and which will be used elsewhere. The categories are different in the case of GraphQL, one for each of the keywords in the SDL syntax: scalars, enums, types, interfaces, unions, inputs, extends and directives. This is illustrated by FIG. 88.

Note also that the behavior will be different than in OpenAPI. In OpenAPI, only the schemas category contained elements that could be used in paths. Here a type can reference any and all of the objects in the other categories. Also, we will allow creation of objects in the different categories from the ERD tabs, and these objects will have to fall in the proper category of objects in this tab.

In the most basic use case, a user will create a couple of custom scalars, a few enums, at least one interface, maybe a union or 2. Then he will create the necessary types leveraging these reusable types. Along the way, inputs will be created so they can be leveraged in operations.

Type objects can contain:

- fields with build-in scalar datatypes
- fields with custom scalar datatypes declared in the objects tab or created on the fly fields referencing enums declared in the objects tab or created on the fly
- implements of interfaces declared in the objects tab or created on the fly
- implements of unions declared in the objects tab or created on the fly
- references to inputs declared in the objects tab or created on the fly Let's walk through the creation of a GraphQL schema . . . .

Basic Use Case

Figure 89:
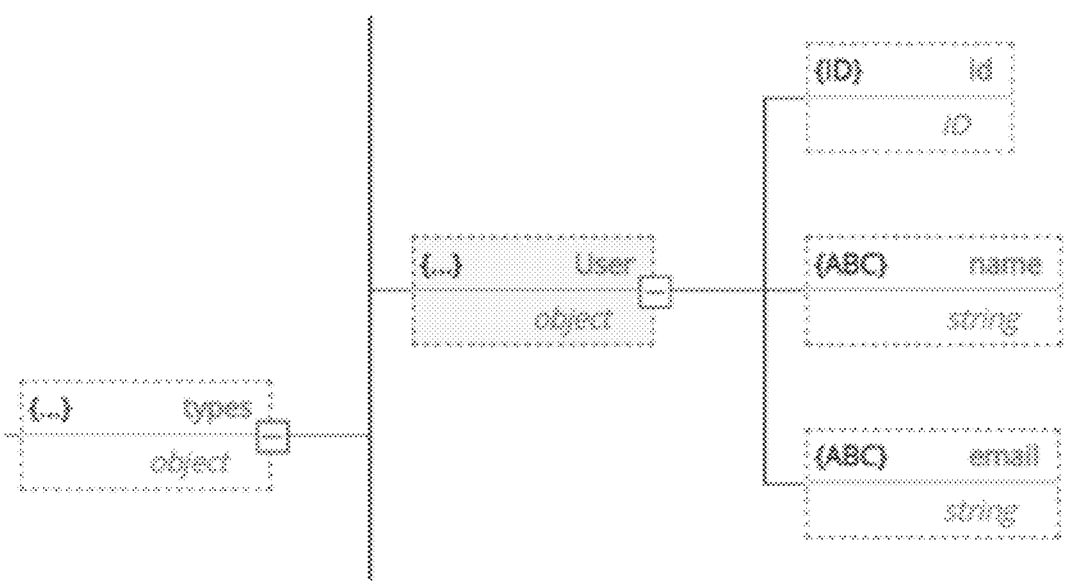

If the user wants to create a schema for this simple entity:

```
type User {
  id: ID!
  name: String!
  email: String!
}
```

the expected result is this entity, illustrated in FIG. 89.

Figure 90:
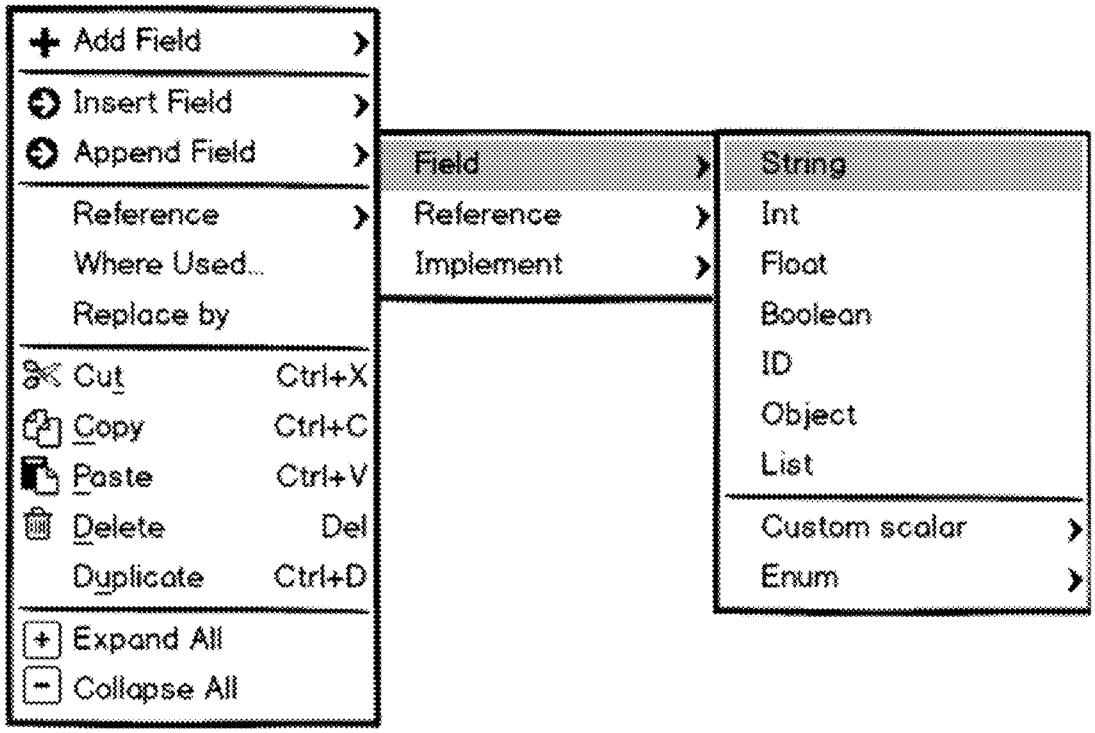

The contextual menu allows the user to add/insert/append the simple scalar fields needed, see FIG. 90.

Adding custom scalars and enums

```
type User {
  id: ID!
  name: String!
  email: String!
  birth Date: Date
  status: Status!
}
scalar Date
enum Status {
  alive
  deceased
}
```

Figure 91:
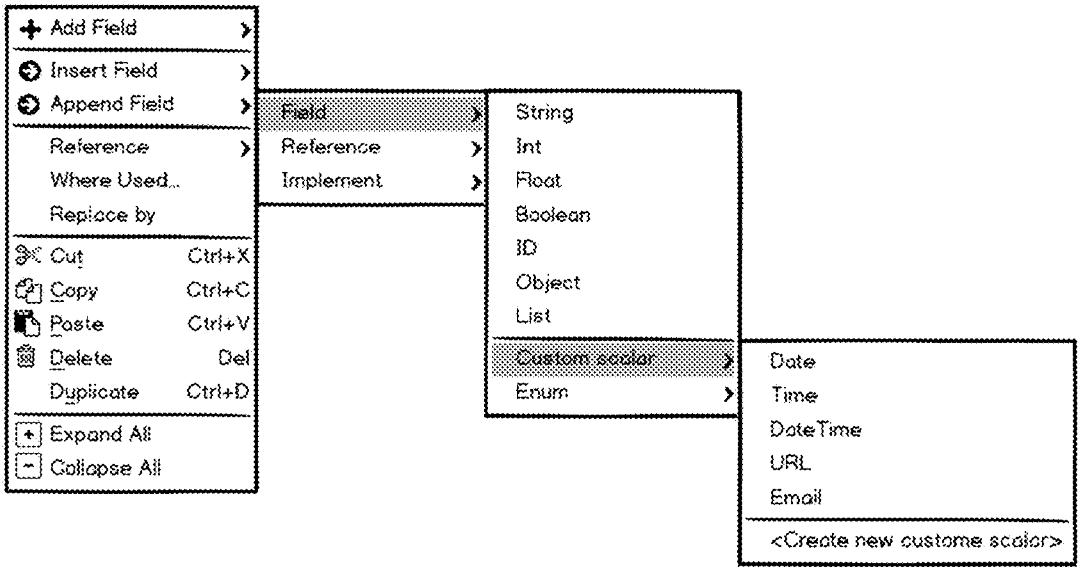

To add a field with a custom scalar datatype, the user can choose between an existing one or create one on the fly (which will get added to scalar category and be in the list of existing custom scalars the next time around), see FIG. 91.

Figure 92:
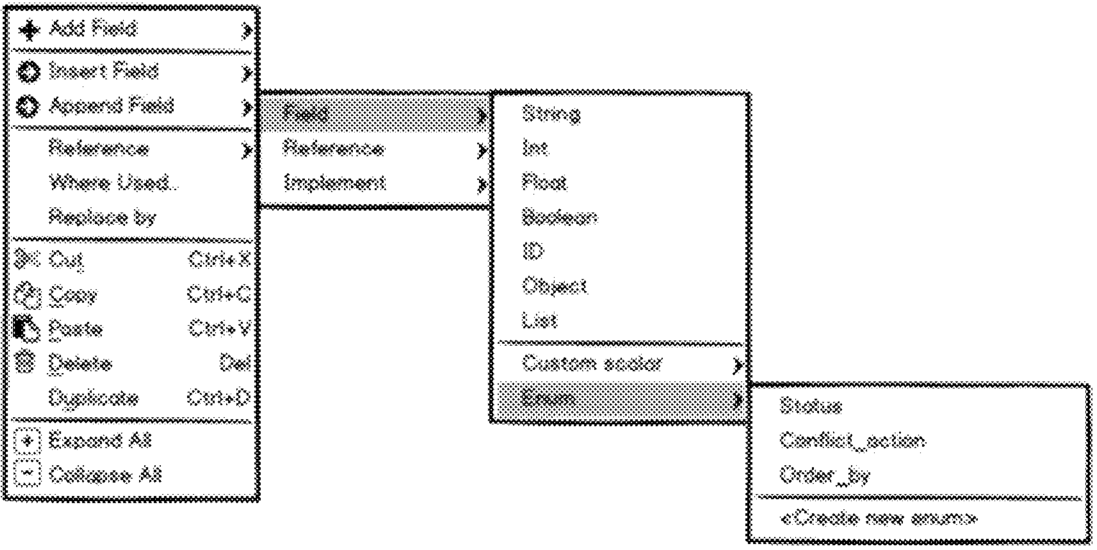

Same for enums, see FIG. 92.

In both cases (custom scalar and enum) a reference gets created to represent the underlying definition.

Add references to type and input objects

These are more traditional references to definitions, except the possibility to create one on-the-fly. Another point is that it is possible to reference an object, and also an array of objects. In the example below address is a reference to the Address object definition, whereas children is a reference to an array (list) of the Child definition.

```
type User {
  id: ID!
  name: String!
  email: String!
  birthDate: Date
  status: Status!
  address: Address
  children: [Child]
}
type Address {
  street: String!
  city: String!
}
type Child {
  name: String!
  age: Int
}
scalar Date
enum Status {
  alive
  deceased
}
```

Figure 93:
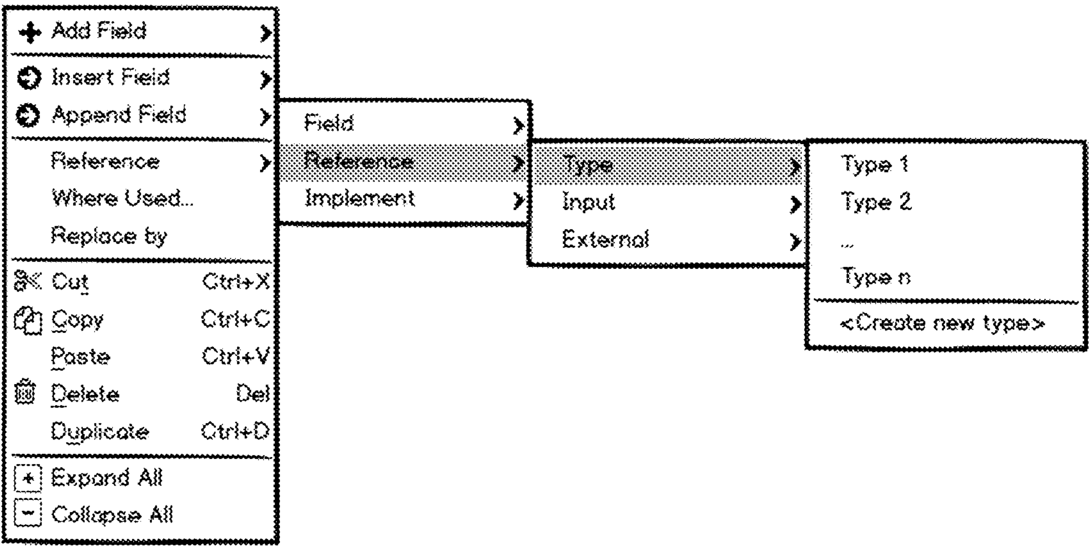

Reference is thereby made to FIG. 93.

Add implements

A GraphQL "implement" includes all the fields of an interface type. It is a sort of reference, but flat to the children of an object, i.e. not to the parent object which would nest the children.

```
interface TimeStamps {
  creationTS: Date
  modifTS: Date
}
type User implements TimeStamps{
  id: ID!
  name: String!
  email: String!
  birth Date: Date
  status: Status!
  creationTS: Date
  modifTS: Date
}
scalar Date
enum Status
  alive
  deceased
}
```

An interface in GraphQL defines a set of fields that a type must implement. This allows you to create a flexible, reusable structure that can be shared across multiple types. Interfaces are useful when you have multiple types that share a common set of fields, but may also have additional fields that are specific to each type. By implementing an interface, a type guarantees that it will include the fields defined in the interface, which can be helpful for clients that need to rely on a certain set of fields being present in the response.

Figure 94:
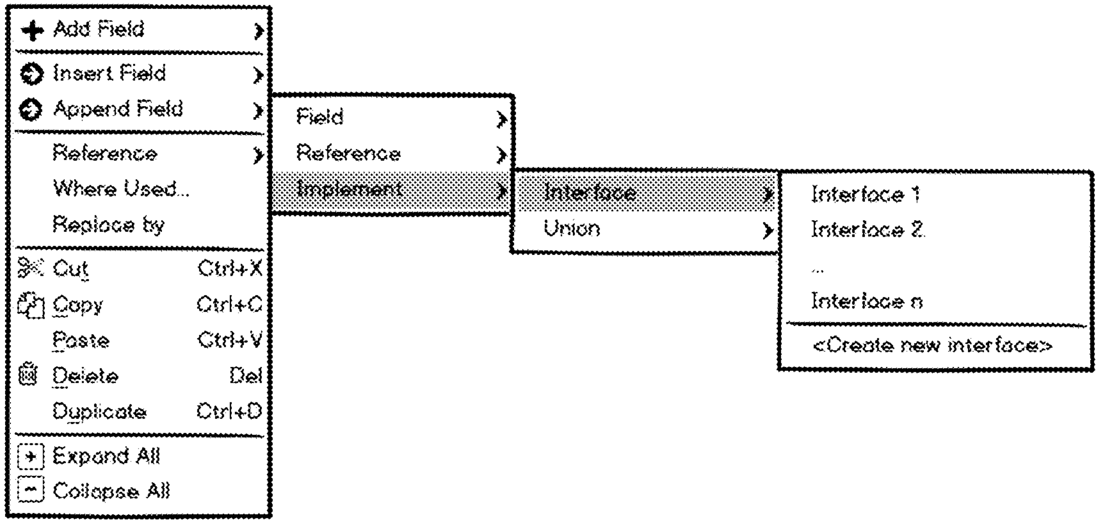

Reference is thereby made to FIG. 94.

When implementing a union, things are a bit trickier. A union is like a oneOf choice for us, except that it is declared separately. Meaning that we need to reference a oneOf definition.

```
union Person = Adult | Student
type Adult {
  work: String!
}
type Student {
  school: String!
}
interface TimeStamps {
  creationTS: Date
  modifTS: Date
}
type User implements TimeStamps & Person{
  id: ID!
  name: String!
  email: String!
  birthDate: Date
  status: Status!
  ... on Adult {
  work: String!
  }
  ... on Student {
  school: String!
  }
  creationTS: Date
  modifTS: Date
  address: Address
  children: [Child]
}
type Address {
  street: String!
  city: String!
}
type Child {
  name: String!
  age: Int
}
```

-continued

```
scalar Date
enum Status {
  alive
  deceased
}
```

In relation to functional requirements—Operations ERD, following is noted.

In this tab, we want to show the operations in a way similar to the API Model tab in Swagger/OpenAPI. We want to show operations with requests and responses, per container.

Queries

Each query in an SDL is made of a request query with parameters plus a response with a schema.

```
type User {
  id: ID!
  name: String!
  email: String!
  birthDate: Date
  status: Status!
  address: Address
  children: [Child]
}
type Address {
  street: String!
  city: String!
}
type Child {
  name: String!
  age: Int
}
scalar Date
enum Status {
  alive
  deceased
}
type Query {
  userById(id: ID!): User
  usersByNameAndDate(name: String!, birthDate: Date): [User]
  userByInput(input: UserInput!): User
  userByDirective(id: ID!, @include(if: Boolean) includeAddress: Boolean): User
  usersByInputDep(input: UserInput): [User] @deprecated(reason: "Use
'usersByNameAndDate' query with individual fields instead.")
}
input UserInput {
  name: String
  birthDate: Date
  status: Status
}
```

In relation to functional requirements-Schema ERD, following is noted.

In this tab, we want to show the ERD for the parent entities declared in the Objects tab. As today in Swagger/OpenAPI, changes made in this tab must be reflected dynamically in the Objects tab, and vice-versa.

Note also, as mentioned earlier, that we can have one or more containers.

Display Options

Figure 95:
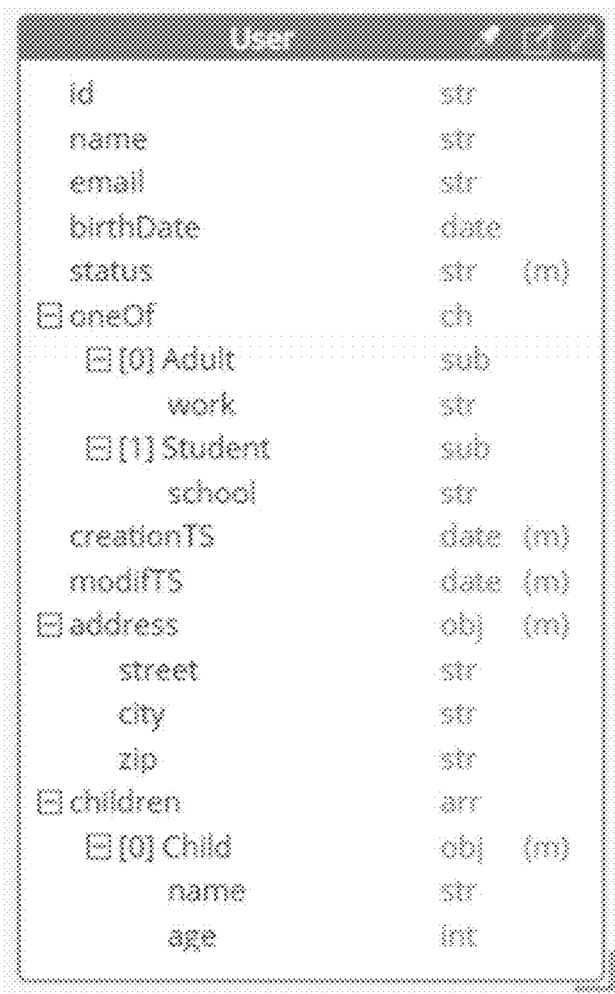

By default, the ERD display of the above exercise, which was for a single parent entity, will be a single box. Of course there can be multiple boxes in an ERD if there are more than 1 parent. This requires that we identify that parent entity out of all the different types in the definitions. Reference is made to FIG. 95.

Figure 96:
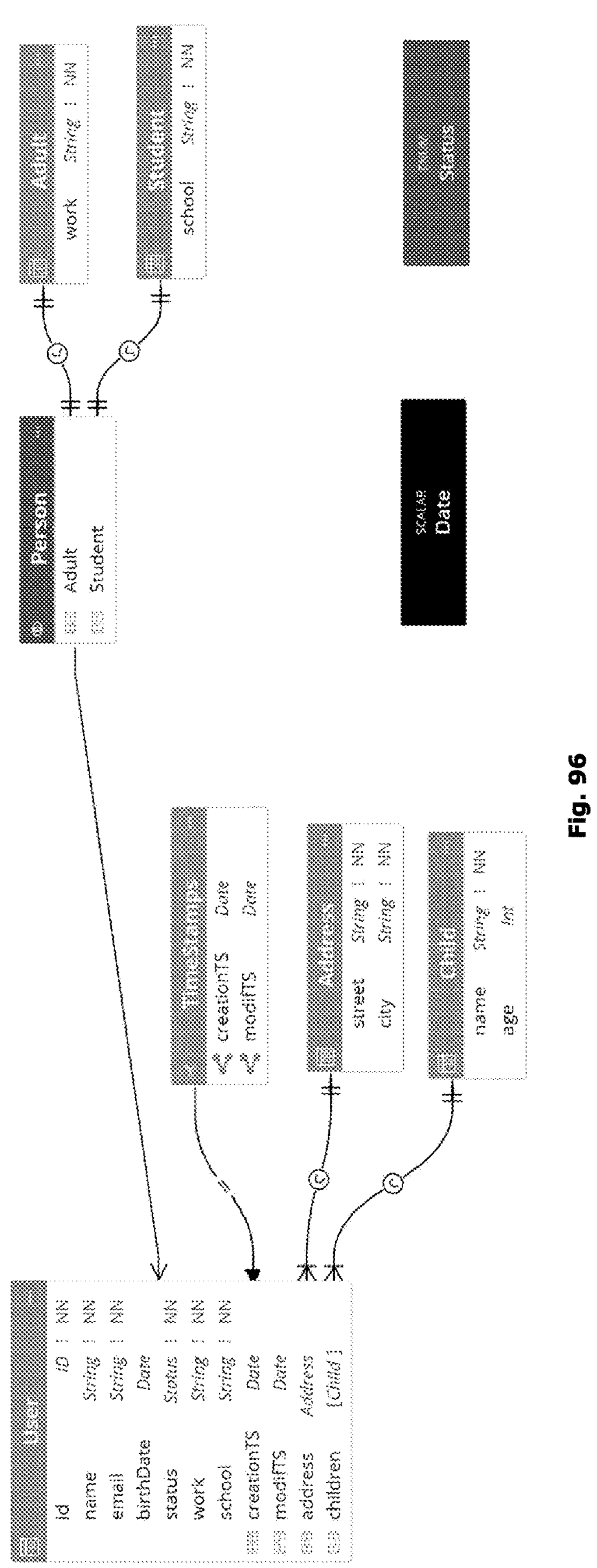

Optionally, we should foresee at a later stage that the exploded view should also be available, in case users request it. Reference is made to FIG. 96.

Alternatively, we could provide a PP flag to set whether a type should get displayed in their ERD even though it is a child already embedded in the parent?

The users will tell us what needs to be done in addition to the default nested approach we will provide originally.

In this example, there are five queries defined:

userById returns a User object based on the provided id argument.

userByNameAndDate returns a list of User objects based on the provided name and birthDate arguments.

userByInput returns a User object based on the provided input argument, which is an input type with fields for name, birthDate, and status.

userByDirective returns a User object based on the provided id argument, and also includes the address field if the includeAddress directive is true.

usersByInputDep returns a list of users by inputting an UserInput object, marked with the @deprecated directive, which indicates that it should not be used in favor of the users query with individual fields.

The output structure for each of these queries will be a User object with the selected fields included. For example, a query for userById might return a User object with only the id, name, and email fields, while a query for userByInput with a UserInput that includes all three fields might return a User object with all six fields.

Figure 97:
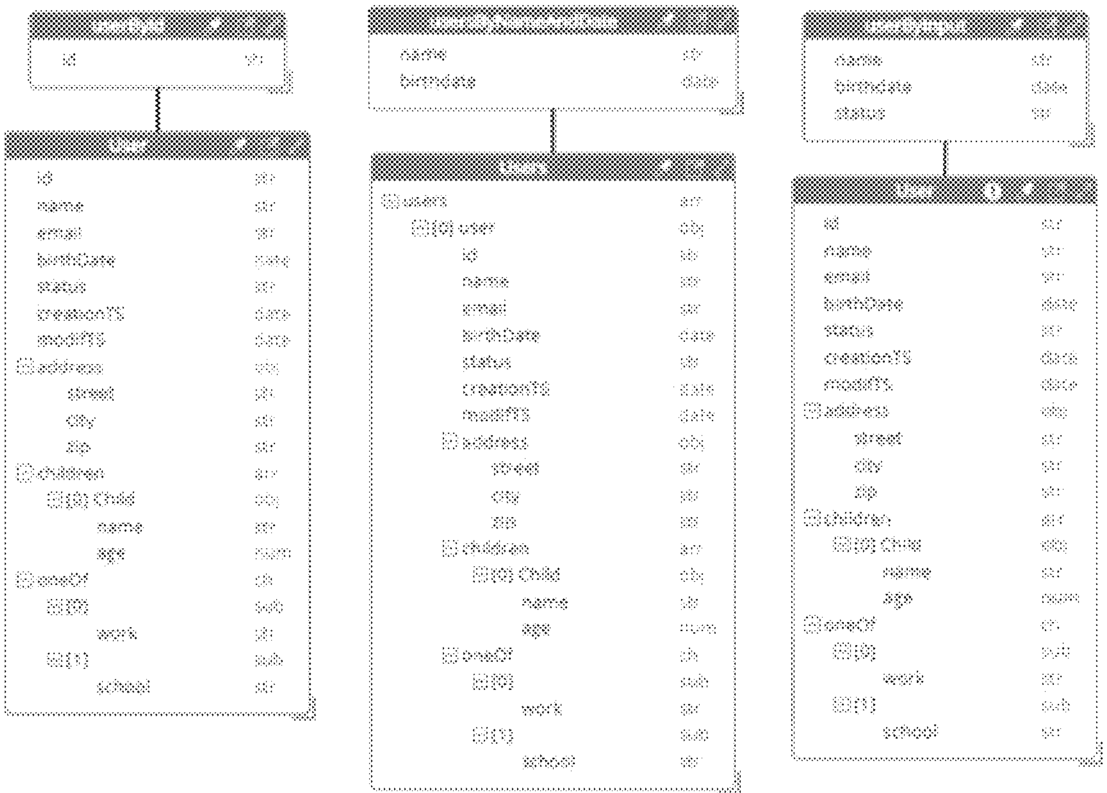

Here's an example of how to display 3 of the 5 queries above. As for Swagger/OpenAPI, we should allow to display on the right instead of below according to display options. Reference is made to FIG. 97.

Mutations

Mutations have a similar structure, as described in the reference. We must have a different icon in the left of the entity title bar to distinguish from queries and subscriptions.

Subscriptions

Subscriptions are a way to push data from the server to the client in real-time. In GraphQL, subscriptions are declared as a root type in the schema alongside the query and mutation types. Here is an example of how subscriptions can be declared in a GraphQL schema:

```
type Subscription {
  newMessage: Message
}
```

In this example, the Subscription type has a field called newMessage that returns a Message type. This means that the client can subscribe to notifications for new messages by using this field in a subscription query.

Subscription fields can also accept arguments in the same way that query and mutation fields do. For example:

```
type Subscription {
  newMessage(roomId: ID!): Message
}
```

In this example, the newMessage field accepts a required argument called roomId. This allows the client to specify which room they want to subscribe to notifications for.

Subscriptions can also use the @ directives to specify conditions that must be met before the subscription is triggered. For example:

```
type Subscription {
  newMessage(roomId: ID!): Message @auth
}
```

In this example, the @auth directive specifies that the client must be authenticated in order to subscribe to notifications for new messages in the specified room.

ERD subscription boxes also need a different icon in the left of the entity title bar to distinguish from queries and mutations.

Following resources may be of relevance relating to reverse engineering.

GraphQL official SDK:

https://github.com/graphql/graphql-js https://graphql.org/graphql-js/

ANTLR: https://github.com/antlr/grammars-v4/blob/master/graphql/GraphQL.g4

Apollo client: https://github.com/apollographql/apollo-client

Rerlay client: https://relay.dev/

GraphQL playground:

https://www.graphqlbin.com/v2/new https://github.com/graphql/graphql-playground

GraphiQL: https://github.com/graphql/graphiql https://github.com/ardatan/graphql-tools https://github.com/charlypoly/graphql-to-json-schema More tools and libraries: https://graphql.org/code/

Introspection is a powerful feature of GraphQL that allows to dynamically discover and explore the capabilities of a GraphQL API. The schema can be examined to get information about its types, fields, and other elements. In GraphQL, this is done by querying the _schema and _type introspection fields, which are provided by the GraphQL server.

There is a better solution below, but in theory this is how you can use introspection to get the schema of a GraphQL API:

```
{
  _schema {
    types {
      name
      kind
      fields {
        name
        type {
          name
          kind
        }
      }
    }
  }
}
```

This query will return a list of all the types in the schema, along with their fields and field types. You can use similar queries to get information about a specific type or field, or to explore other aspects of the schema.

With https://github.com/kamilkisiela/graphql-inspector run the graphql-inspector introspect-schema [API_ENDPOINT] command to retrieve the schema of the API.

Here is an example of using GraphQL Inspector to retrieve the schema of a GraphQL API:

$ graphql-inspector introspect-schema https://my-api-.com/graphql

Successfully introspected schema from https://my-api-.com/graphql graphql-inspector can output the introspection results in JSON format. It can also output the results in SDL format. You can specify the desired output format using the—output option when running the inspect-schema command. For example, to output the introspection results in JSON format, you can use the—output json option. To output the results in SDL format, you can use the—output sdl option.

It is technically possible to turn off introspection, supposedly for security reasons. It is therefore necessary to handle the error that could possibly occur, so as to display a user-friendly dialog.

Conversion Between the Different Formats:

https://www.apollographql.com/blog/backend/schema-design/three-ways-to-represent-your-graphql-schema/

Handling of Comments

Comments are used to add documentation or notes to a type or field. They are generally placed above the type or field that they are documenting. Here is an example of how to include a comment in GraphQL SDL:

```
# This is a comment that explains the purpose of the 'User' type
type User {
  # This is a comment that explains the purpose of the 'id' field
  id: ID!
  name: String!
}
```

Comments in GraphQL SDL start with a # symbol and continue until the end of the line. They can be placed at the beginning of a line, or after some whitespace.

Comments can also span multiple lines by using the """ (triple quotes). For example:

```
"""
This is a multi-line comment. It can span
multiple lines and is ignored by the GraphQL
server.
"""
type Query {
 users: [User]
}
```

It is important to note that comments in GraphQL SDL are only for documentation and do not affect the functionality of the GraphQL schema. They are not included in the actual GraphQL execution.

Following resources may be of relevance relating to forward engineering.

In the tab GraphQL SDL, visible at model-level as well as for each entity tab, one may generate the SDL. In embodiments, FE to file with .graphql extension is provided.

In embodiments, application to the Apollo Schema Registry is provided.

Additional library: https://github.com/walmartlabs/json-to-simple-graphql-schema As usual, the best way to test forward-engineering is to check the output of a model that has been reverse-engineered, and to compare side-by-side input and output.

Validator

This may relate to https://github.com/cjoudrey/graphql-schema-linter to validate GraphQL schema definitions against a set of rules.

https://graphql.org/graphql-js/validation/

Embodiments may relate to:

Import from JSON doc/schema, DDL, XSD, import/export with Excel

Derive from Polyglot without template, convert to Polyglot

Model-driven API generation

Derive from Polyglot with template

Apply to and RE from Apollo Schema Registry:
https://studio.apollographql.com/
https://www.apollographql.com/docs/graphos/schema/cli-registration/

Schema evolution:
https://www.apollographql.com/docs/graphos/delivery/schema-checks/

(End of GraphQL Plugin Requirements)

GraphQL Schema Reference

GraphQL is an API standard that provides a more efficient, powerful and flexible alternative to REST. It was developed and open-sourced by Facebook and is now maintained by a large community of companies and individuals from all over the world.

At its core, GraphQL enables declarative data fetching where a client can specify exactly what data it needs from an API. Instead of multiple endpoints that return fixed data structures, a GraphQL server only exposes a single endpoint and responds with precisely the data a client asked for.

GraphQL is often confused with being a database technology. This is a misconception, GraphQL is a query language for APIs—not databases. In that sense it's database agnostic and effectively can be used in any context where an API is used.

The name comes from the fact the tool is a unified interface to access the application data graph.

In GraphQL, you define a schema for your API that specifies the types of data that can be queried, the fields that each type has, and the relationships between different types. Then, you can use GraphQL queries to request specific data from the API, and the server will return only the data that is specified in the query. This allows for more flexibility and control over the data that is returned, as the client can request exactly the data that it needs, rather than getting a fixed set of data from a REST endpoint.

GraphQL vs REST

Over the past decade, REST has become the standard for designing web APIs. It offers some great ideas, such as stateless servers and structured access to resources. However, REST APIs have shown to be too inflexible to keep up with the rapidly changing requirements of the clients that access them.

GraphQL was developed to cope with the need for more flexibility and efficiency! It solves many of the shortcomings and inefficiencies that developers experience when interacting with REST APIs.

One of the most common problems with REST is that of over- and underfetching. This happens because the only way for a client to download data is by hitting endpoints that return fixed data structures. It's very difficult to design the API in a way that it's able to provide clients with their exact data needs.

Some key differences between REST and GraphQL include:

1. Data fetching: In REST, you typically fetch data by making requests to specific endpoints, whereas in GraphQL, you define the data that you want to retrieve in a single query and the server returns exactly that data.
2. Flexibility: GraphQL allows you to request exactly the data that you need, whereas in REST, you are typically limited to the data that is returned by a specific endpoint.
3. Versioning: In REST, you often need to create new endpoints or make changes to existing ones to add new functionality, whereas in GraphQL, you can add new fields or types to your schema without breaking existing clients.

GraphQL Schema Definition Language (SDL)

The schema is one of the most important concepts when working with a GraphQL API. It specifies the capabilities of the API and defines how clients can request the data. It is often seen as a contract between the server and client.

GraphQL uses a strong type system to define the capabilities of an API. All the types that are exposed in an API are written down in a schema using the GraphQL Schema Definition Language (SDL).

Once the schema is defined, the teams working on frontend and backends can do their work without further communication since they both are aware of the definite structure of the data that's sent over the network.

Frontend teams can easily test their applications by mocking the required data structures. Once the server is ready, the switch can be flipped for the client apps to load the data from the actual API.

Other Tools

As seen below, the schema of GraphQL is highly normalized, and it seems that it was done on purpose.

It is explained that the normalization was done on purpose for performance purposes of the caching mechanism: "A more beneficial approach is to normalize the data beforehand. That means that the (potentially nested) query result gets flattened and the store will only contain individual records that can be referenced with a globally unique ID."

It may be viewed by many to be easier that way given. Because of their familiarity with RDBMS?

As a result the tools for data modeling GraphQL schemas are a close representation of the schema syntax structure.

Having already challenged this approach for NoSQL, it may be described as user-unfriendly, ugly, not scalable, inconsistent with the fact that responses nest objects in JSON, etc. . . .

GraphQL Voyager https://github.com/IvanGoncharov/graphql-voyager https://ivangoncharov.github.io/graphql-voyager/

Figure 98:
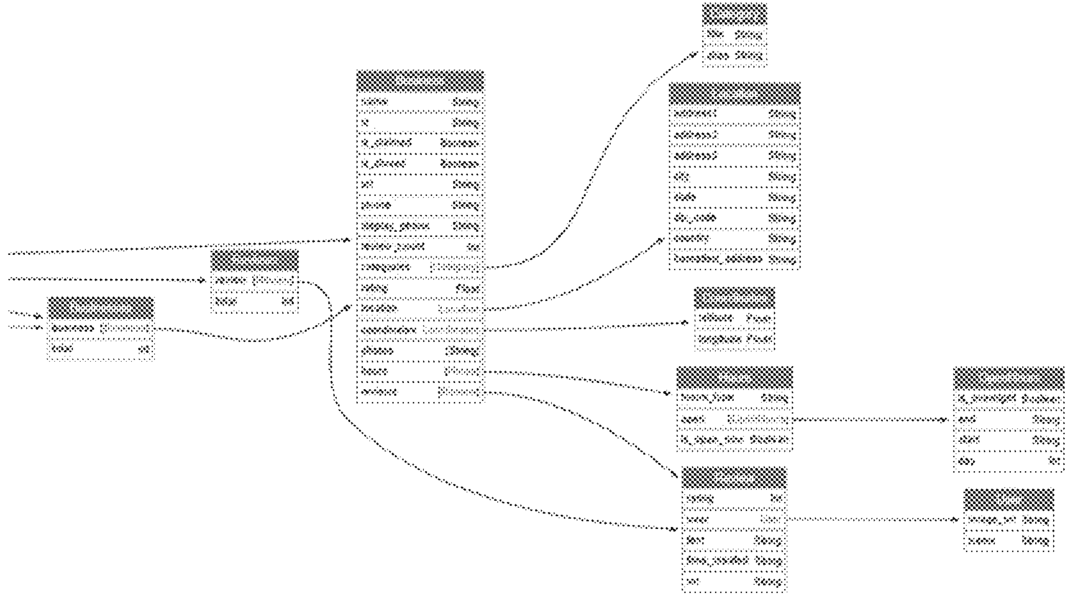

FIG. 98 illustrates how GraphQL Voyager represents the Yelp API, with zero nesting. All nested objects and arrays get their own box in the ERD.

GraphQL Visualizer http://nathanrandal.com/graphql-visualizer/

Figure 99:
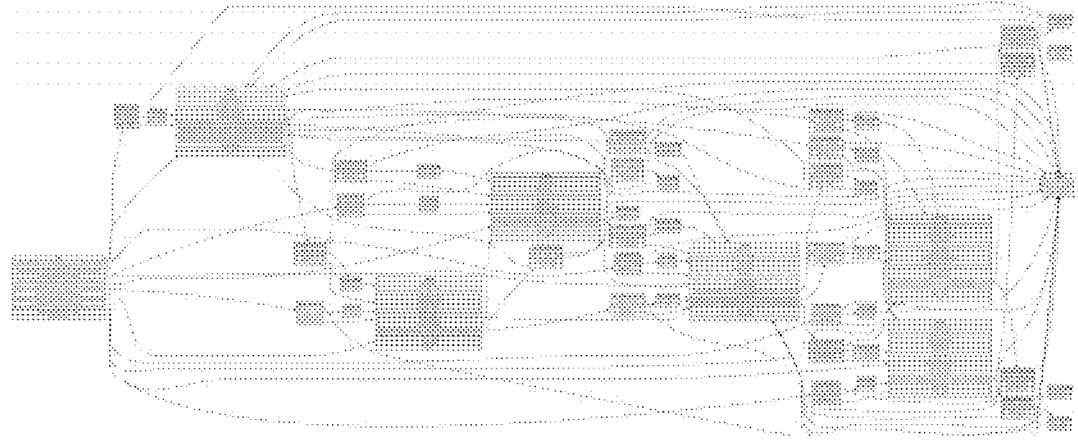

FIG. 99 illustrates how GraphQL Visualizer handles this. Same approach here, showing howing complex and impractical this quickly becomes . . . .

GraphQL Editor https://app.graphqleditor.com/

Figure 100:
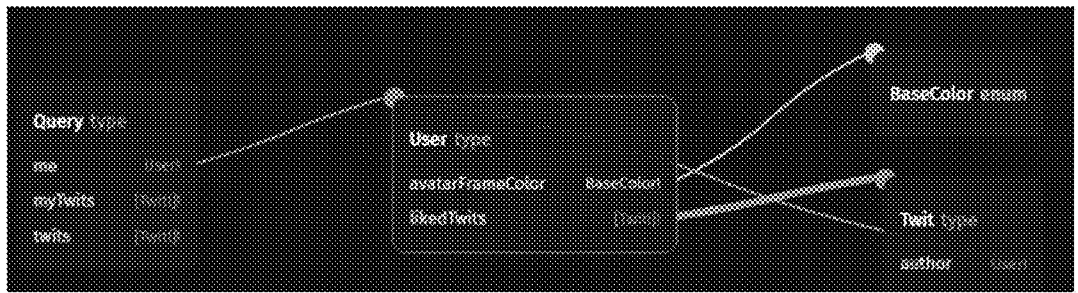

FIG. 100 illustrates how GraphQL Editor handles this. Similar approach, but with much interaction required between code and ERD.

Galaxy Modeler

Figure 101:
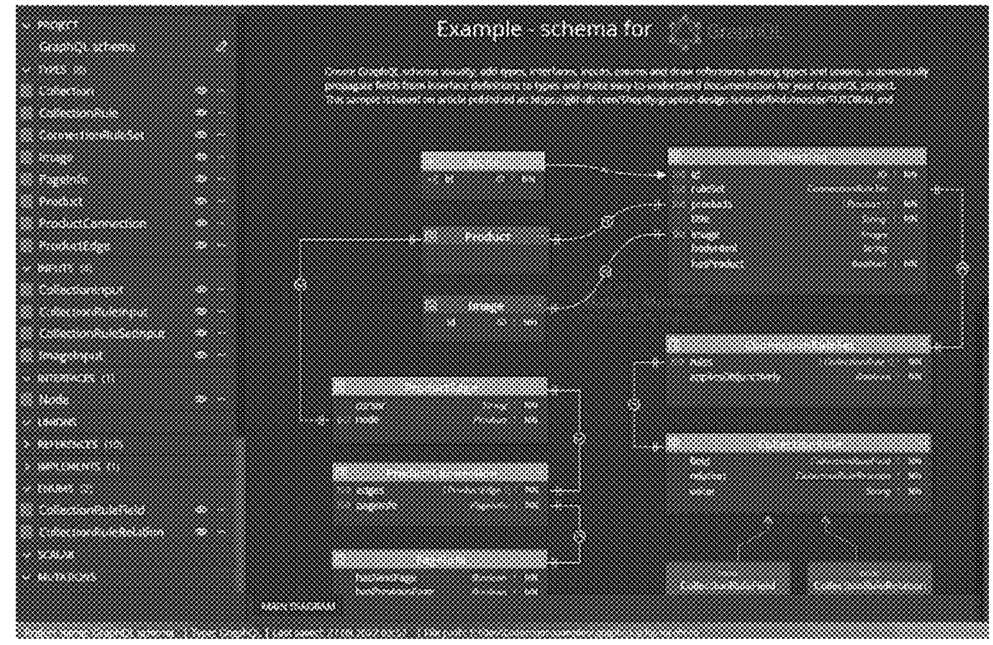

Traditional normalized ERD approach for https://www.datensen.com/data-modeling/galaxy-modeler-for-graphql.html. FIG. 101 illustrates this. They closely follow the spec, which requires users to understand the spec and syntax.

Apollo Studio https://studio.apollographql.com/

Figure 102:
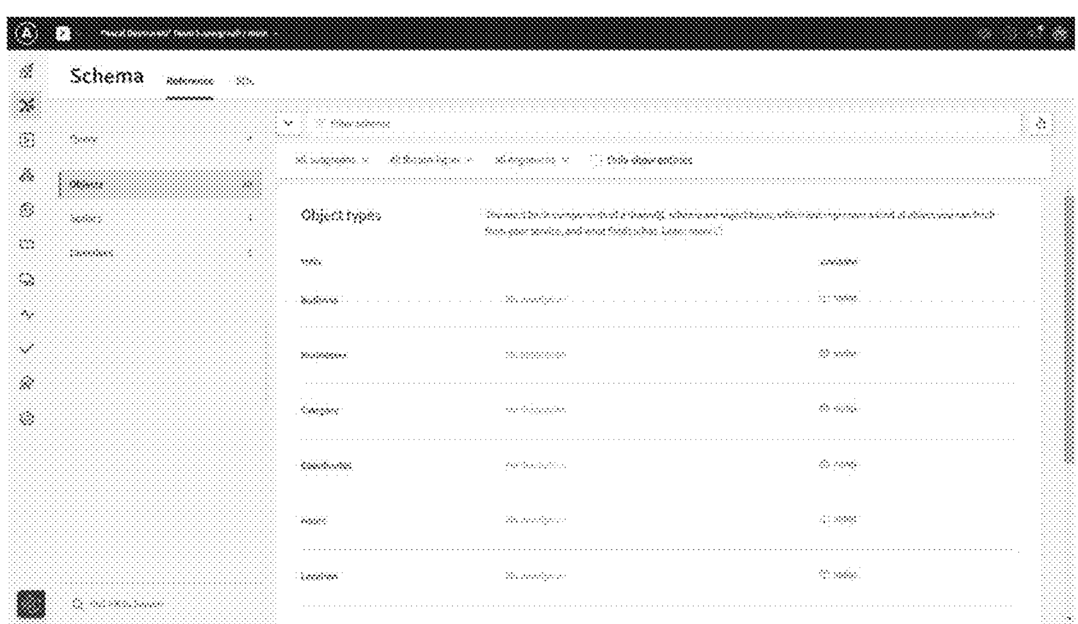

The tool includes a schema registry, but while it outputs SDL, it is not graphical. And it also treats each subobject and array as its own entity. See FIG. 102.

Concepts and Terminology

Terminology nightmare, again . . . .

The word "type" is used all over the place in the spec, articles and books, and may designate many different things: root types (for queries, mutations and subscriptions), object types (for what we would call entities/collections/tables, but also for subobjects), abstract types (for what we would call definitions and also oneOf choices), data types (which can be scalar or custom scalar.)

Schema https://www.apollographql.com/blog/graphql/basics/graphql-explained/

Every GraphQL server has two core parts that determine how it works: a schema and resolve functions.

The schema is a model of the data that can be fetched through the GraphQL server. It defines what queries clients are allowed to make, what types of data can be fetched from the server, and what the relationships between these types are. For example:

A simple GraphQL schema with three types: Author, Post and Query

In GraphQL schema notation, it looks like this (somewhat similar to multi-message in ProtoBuf.):

```
type Author {
  id: Int
  name: String
  posts: [Post]
}
```

-continued

```
type Post {
  id: Int
  title: String
  text: String
  author: Author
}
type Query {
  getAuthor(id: Int): Author
  getPostsByTitle(titleContains: String): [Post]
}
schema {
  query: Query
}
```

This schema is quite simple: it states that the application has three types-Author, Post and Query. The third type—Query—is just there to mark the entry point into the schema. Every query has to start with one of its fields: getAuthor or getPostsByTitle. You can think of them sort of like REST endpoints, except more powerful.

Author and Post reference each other. You can get from Author to Post through the Author's "posts" field, and you can get from Post to Author through the Posts' "author" field.

The schema tells the server what queries clients are allowed to make, and how different types are related, but there is one critical piece of information that it doesn't contain: where the data for each type comes from. That's what server resolve functions are for. Resolve functions are not in the scope of a data modeling tool, so we'll ignore this part.

Here are some principles of a GraphQL schema:

1. Types: The schema defines the types of data that can be queried.
2. Fields: Each type has a set of fields that define the data that can be retrieved for that type. Fields can be of different types, such as strings, integers, or other object types.
3. Arguments: Fields can accept arguments, which allow you to specify additional criteria for the data that you are requesting. For example, an argument for orderBy to specify the order in which the posts should be returned.
4. Queries: the schema defines the entry point for queries in a GraphQL API, queries which are used to retrieve data from a GraphQL server.
5. Mutations: The schema also defines mutations, which are operations that can change data on the server. For example, to create, update, or delete.
6. Resolvers: The schema defines the functions (called "resolvers") that are responsible for fetching the data for each field. When a GraphQL query is executed, the appropriate resolver is called to retrieve the data for each field.

The syntax for writing schemas is called Schema Definition Language (SDL).

Here is an example of how we can use the SDL to define a simple type called Person:

```
type Person {
  name: String!
  age: Int!
}
```

This type has two fields, they're called name and age and are respectively of type String and Int. The ! following the type means that this field is required.

It's also possible to express relationships between types. In the example of a blogging application, a Person could be associated with a Post:

```
type Post {
 title: String!
 author: Person!
}
```

Conversely, the other end of the relationship needs to be placed on the Person type:

```
type Person {
 name: String!
 age: Int!
 posts: [Post!]!
}
```

Note that there is a one-to-many-relationship between Person and Post since the posts field on Person is actually an array (or list) of posts.

Example

Here is an example of a GraphQL schema that defines a User type with fields for id, name, and email, and a Post type with fields for id, title, body, and author, where author is an object type of User:

```
type User {
 id: ID!
 name: String!
 email: String!
 posts: [Post!]!
}
type Post {
 id: ID!
 title: String!
 createAt: Date
 body: String!
 author: User!
}
```

In this example, the User type has a field called posts that is a list of Post objects, and the Post type has a field called author that is a User object. This defines a one-to-many relationship between users and posts, where each user can have multiple posts, and each post has a single author.

Here is an example of a GraphQL query that requests data for a user with the id of 1 and all of their posts, sorted by the createdAt field in descending order:

```
query {
 user(id: 1) {
  id
  name
  email
  posts(orderBy: "createdAt_DESC") {
   id
   title
   body
  }
 }
}
```

And here is an example of the GraphQL response output for this query:

```
{
 "data": {
  "user": {
 "id": "1",
 "name": "John Smith",
 "email": "john@example.com",
 "posts": [
  {
   "id": "1",
   "title": "My First Post",
   "body": "This is the body of my first post."
   },
   {
    "id": "2",
    "title": "My Second Post",
    "body": "This is the body of my second post."
   }
  ]
  }
 }
}
```

In this example, the query requested data for a user with the id of 1 and all of their posts, sorted by the createdAt field in descending order. The server returns the data for the user's id, name, and email fields, as well as a list of the user's posts, each with the id, title, and body fields. The author field on each post is not included in the query, so it is not included in the response.

Operations

The Query type in a GraphQL schema is similar to the "operations" (i.e., requests) defined in an OpenAPI (formerly known as Swagger) specification.

In an OpenAPI specification, an "operation" represents a request that can be made to a server, along with the parameters and response that are expected for the request. An operation is typically defined as a combination of a HTTP method (e.g., GET, POST, PUT, etc.) and a path (e.g., "/users").

In a GraphQL schema, the Query type serves a similar purpose, but it is defined in a more flexible and expressive way. Instead of using HTTP methods and paths to define operations, a GraphQL schema uses fields and arguments to define the data that can be queried.

For example, consider the following OpenAPI specification for a simple API that retrieves a list of users:

```
openapi: 3.0.0
info:
 title: User API
 version: 1.0.0
paths:
 /users:
  get:
   summary: Retrieve a list of users
   operationId: listUsers
   responses:
    '200':
     description: A list of users
     content:
      application/json:
       schema:
        type: array
        items:
         $ref: '#/components/schemas/User'
components:
 schemas:
  User:
   type: object
```

-continued

```
properties:
  id:
    type: string
    description: The unique identifier for the user
  name:
    type: string
    description: The name of the user
  email:
    type: string
    description: The email address of the user
```

This OpenAPI specification defines a single operation, listUsers, which is accessed via a GET request to the/users path. It returns a list of User objects in the response.

Here is the equivalent GraphQL schema for the same API:

```
type Query {
  users: [User!]!
}
type User
  id: ID!
  name: String!
  email: String!
}
```

In this GraphQL schema, the "Query" type has a single field called users, which returns a list of User objects. To retrieve the list of users, a client can submit a GraphQL query like this:

```
query {
  users
    id
    name
    email
  }
}
```

Fetching Data with Queries

When working with REST APIs, data is loaded from specific endpoints. Each endpoint has a clearly defined structure of the information that it returns. This means that the data requirements of a client are effectively encoded in the URL that it connects to.

The approach that's taken in GraphQL is radically different. Instead of having multiple endpoints that return fixed data structures, GraphQL APIs typically only expose a single endpoint. This works because the structure of the data that's returned is not fixed. Instead, it's completely flexible and lets the client decide what data is actually needed.

That means that the client needs to send more information to the server to express its data needs—this information is called a query.

One of the major advantages of GraphQL is that it allows for naturally querying nested information. For example, if you wanted to load all the posts that a Person has written, you could simply follow the structure of your types to request this information:

```
{
  allPersons
    name
    age
    posts
      title
    }
```

-continued

```
    }
  }
```

Queries with Arguments

In GraphQL, each field can have zero or more arguments if that's specified in the schema. For example, the allPersons field could have a last parameter to only return up to a specific number of persons. Here's what a corresponding query would look like:

```
{
  allPersons(last: 2) {
    name
  }
}
```

The allPersons field in this query is called the root field of the query. Everything that follows the root field, is called the payload of the query.

Here are some examples of common arguments that are used in a "Query" type:

id: A unique identifier for a specific object.

limit: The maximum number of results to return.

offset: The number of results to skip before returning results.

sort: The field or fields to sort the results by.

order: The order in which to sort the results (e.g. ascending or descending).

filter: A set of conditions to filter the results by.

find: Used to search for specific data based on specific criteria, typically a user input.

There can be others like: where, distinct_on, order_by, etc.

Writing Data with Mutations

Next to requesting information from a server, the majority of applications also need some way of making changes to the data that's currently stored in the backend. With GraphQL, these changes are made using so-called mutations. There generally are three kinds of mutations:

creating new data updating existing data deleting existing data

Mutations follow the same syntactical structure as queries, but they always need to start with the mutation keyword. Here's an example for how we might create a new Person:

```
mutation {
  createPerson(name: "Bob", age: 36) {
    name
    age
  }
}
```

Notice that the mutation also has a root field—in this case it's called createPerson.

It is possible to also query information when sending mutations, which can be a very powerful tool to retrieve new information from the server in a single roundtrip!

Realtime Updates with Subscriptions

Another important requirement for many applications today is to have a realtime connection to the server in order to get immediately informed about important events. For this use case, GraphQL offers the concept of subscriptions.

When a client subscribes to an event, it will initiate and hold a steady connection to the server. Whenever that particular event then actually happens, the server pushes the corresponding data to the client. Unlike queries and mutations that follow a typical "request-response-cycle", subscriptions represent a stream of data sent over to the client.

Subscriptions are declared in SDLs as a root type in the schema alongside the query and mutation types. Here is an example of how subscriptions can be declared in a GraphQL schema:

```
type Subscription {
  newMessage: Message
}
```

In this example, the Subscription type has a field called newMessage that returns a Message type. This means that the client can subscribe to notifications for new messages by using this field in a subscription query.

Subscription fields can also accept arguments in the same way that query and mutation fields do. For example:

```
type Subscription {
  newMessage(roomId: ID!): Message
}
```

In this example, the newMessage field accepts a required argument called roomId. This allows the client to specify which room they want to subscribe to notifications for.

Subscriptions can also use the @ directives to specify conditions that must be met before the subscription is triggered. For example:

```
type Subscription {
  newMessage(roomId: ID!): Message @auth
}
```

In this example, the @auth directive specifies that the client must be authenticated in order to subscribe to notifications for new messages in the specified room.

Schema Implications

Generally, a schema is simply a collection of GraphQL types. However, when writing the schema for an API, there are some special root types:

type Query { . . . } type Mutation { . . . } type Subscription { . . . }

The Query, Mutation, and Subscription types are the entry points for the requests sent by the client. To enable the allPersons-query that we saw before, the Query type would have to be written as follows:

```
type Query {
  allPersons: [Person!]!
}
```

allPersons is called a root field of the API. Considering again the example where we added the last argument to the allPersons field, we'd have to write the Query as follows:

```
type Query {
  allPersons(last: Int): [Person!]!
}
```

If a document contains only one operation and that operation is a query which defines no variables and contains no directives then that operation may be represented in a short-hand form which omits the query keyword and operation name.

Similarly, for the createPerson-mutation, we'll have to add a root field to the Mutation type:

```
type Mutation {
  createPerson(name: String!, age: Int!): Person!
}
```

Notice that this root field takes two arguments as well, the name and the age of the new Person.

Finally, for the subscriptions, we'd have to add the newPerson root field:

```
type Subscription {
  newPerson: Person!
}
```

Putting it all together, this is the full schema for all the queries and mutation that you have seen in this chapter:

```
type Query {
  allPersons(last: Int): [Person!]!
  allPosts(last: Int): [Post!]!
}
type Mutation {
  createPerson(name: String!, age: Int!): Person!
  updatePerson(id: ID!, name: String!, age: String!): Person!
  deletePerson(id: ID!): Person!
}
type Subscription {
  newPerson: Person!
}
type Person
{
  id: ID!
  name: String!
  age: Int!
  posts: [Post!]!
}
type Post
  title: String!
  author: Person!
}
```

Structure of an SDL

Here is a list of keywords used in the GraphQL SDL to define a GraphQL schema:

- schema: Used to define the root types for a GraphQL API. The root types are the entry points for a GraphQL API and include the "Query," "Mutation," and "Subscription" types.
- type: Used to define an object type in the schema. An object type represents a group of fields that can be queried together.
- interface: Used to define an interface in the schema. An interface is a collection of fields that can be implemented by one or more object types.
- union: Used to define a union type in the schema. A union type represents a set of object types that can be returned from a field.

scalar: Used to define a custom scalar type in the schema, i.e. a type other than the built-in scalar types such as a String, Int, Float, Boolean, and ID.

enum: Used to define an enumeration type in the schema. An enumeration type represents a set of named values that can be returned from a field.

input: Used to define an input object type in the schema. An input object type represents a group of fields that can be used as arguments in a mutation.

extend: Used to extend an existing type or interface in the schema. This can be used to add additional fields to an existing type or interface.

directive: Used to define a custom directive in the schema. A directive is used to modify the behavior of a GraphQL API and can be applied to fields, arguments, and other elements of a GraphQL schema. Directives are declared in the schema, but passed by the server to the client so the client can apply them.

Referencing another type vs implementing an interface

Implementing an interface allows you to create a set of shared fields that multiple types must implement, and it also allows you to query these types using the interface as a common denominator.

On the other hand, referencing another type simply means that you are using that type as a subobject in your own type definition, and it does not enforce any specific field requirements or allow you to query the types using a common denominator.

Here is an example that illustrates the difference between implementing an interface and referencing another type in GraphQL:

```
interface Node {
  id: ID!
}
type User implements Node {
  id: ID!
  name: String!
  email: String!
}
type Post
  id: ID!
  title: String!
  body: String!
  author: User!
}
```

In this example, the Node interface is defined with a single field, id. The User type implements the Node interface, which means that it must include the id field in its definition. The Post type includes a field, author, of type User. This means that the Post type is referencing the User type, but it is not implementing the Node interface.

Using Extend Vs Interface

There can sometimes some confusion between extend and interface.

The extend keyword is used to add additional fields or types to an existing type in a GraphQL schema. This can be useful when you want to add new functionality to an existing type without modifying the original type definition.

Here is an example of how the "extend" keyword can be used in a GraphQL schema to add additional fields or types to an existing type:

```
type Product {
  id: ID!
  name: String!
```

-continued

```
  price: Float!
  createdAt: DateTime!
  updatedAt: DateTime!
}
extend type Product
  description: String
  imageUrl: String
}
This is NOT valid:
type Animal {
  species: String
}
type Pet extends Animal {
  owner: Owner
  name: String
}
whereas this is:
interface Animal {
  species: String
}
type Pet implements Animal {
  species: String
  owner: Owner
  name: String
}
```

There are a few reasons why you might use the extend keyword instead of simply adding the fields directly to an existing type in GraphQL:

One reason is that "extend" allows you to add fields to a type without modifying the original type definition. This can be useful if you want to add additional fields to a type that is defined in a library or third-party package, for example.

Another reason is that "extend" allows you to add fields to a type in a more modular way. Instead of modifying the original type definition, you can define the additional fields in a separate block of code and use the "extend" keyword to add them to the type. This can make your code easier to read and maintain, as it allows you to keep the original type definition separate from any additional fields.

Finally, "extend" allows you to add fields to a type in a way that is more flexible and resilient to changes. For example, if you add fields directly to an existing type and then that type is modified in a later version of a library or third-party package, your code may break. However, if you use the "extend" keyword to add fields to the type, your code will not be affected by any changes to the original type definition.

You can extend pretty much everything declared in an existing schema, i.e. not just types.

Clearly this has specific rules:

What you're extending must be already declared.

Anything you add must not already apply to the original definition.

And comes at a great cost:

As opposite to what extend concept implies for other languages, in SDL there's no place for inheritance, subclassing, etc., you're actually extending the original thing . . . by modifying it. E.g. you cannot do something like type MyType extends MyOtherType, you just extend type MyType and now the original MyType has been modified with the new thing you added to it.

Again, extend is a modifier.

Data types

In GraphQL, there are two different kinds of types.

Scalar types represent concrete units of data.

The GraphQL spec has five predefined scalars: as String, Int, Float, Boolean, and ID.

Custom scalar types: you can also define your own custom scalar types to represent specific kinds of data or to add custom validation rules. To specify the format of a scalar type, you can define a custom scalar type resolver function that is responsible for parsing, serializing, and validating the value of the type. The resolver function can use regular expressions or other validation methods to ensure that the value is a string in the correct format. \

```
' ' ' graphql
scalar Email
type Query {
  users: [User]
}
type User {
  id: ID!
  name: String!
  email: Email!
}
' ' '
\
```

Here are some examples of custom scalar types that are commonly used in GraphQL APIs:

'Date': A date without a time (e.g., "2022 Dec. 27").

'Time': A time without a date (e.g., "12:34:56").

'DateTime': A date and time (e.g., "2022-12-27T12:34:56Z").

'URL': A URL (e.g., "[https://example.com] (https://example.com/)").

'Email': An email address (e.g., "[user@example.com] (mailto: user@example.com)").

'PhoneNumber': A phone number (e.g., "+1 555 555 1212").

JSON

Markdown\

Object types have fields that express the properties of that type and are composable. In addition to scalar types, you can also define fields with the following types:

Object: Represents an object with fields. An object type must define a list of fields that it contains.

List: Represents a list of items. A list type must specify the type of the items that it contains.\

\

Here is an example of a GraphQL schema that defines a "User" type with fields of various types:

```
type User {
  id: ID!
  name: String!
  email: String!
  age: Int
  height: Float
  isActive: Boolean
  posts: [Post!]!
}
type Post {
  id: ID!
  title: String!
  body: String!
}
```

In this example, the User type has fields of type ID, String, Int, Float, and Boolean, as well as a field of type List that contains items of type Object.

Note the normalization and how complex data types are done through referencing, and not embedding. If your backend data store is a database like MongoDB that stores data in a nested format, you will need to "normalize" the data in your GraphQL schema to match the structure of the data in the database.

This means that you will need to define separate object types in your schema for each level of nested data in the database, and use the "Object" and "List" types to connect the objects together in the schema.

Note also the ! exclamation point which indicates non-null/required.

Scalars

A scalar type represents a primitive value that can be passed as an argument or returned as a field in a GraphQL query. Scalar types do not have any fields or subtypes. Some built-in scalar types in GraphQL are Int, Float, String, Boolean, and ID.

Here is an example of a scalar type in GraphQL SDL:

Scalar Date

In this example, the Date scalar represents a date value. It can be used as an argument or returned as a field in a GraphQL query.

```
type Event {
  startDate: Date
  endDate: Date
}
type Query {
  getEvent(id: ID!): Event
}
input CreateEventInput {
  name: String!
  startDate: Date
  endDate: Date
}
type Mutation
{
  createEvent(input: CreateEventInput!): Event
}
```

In this example, the Date scalar is used as a field in the Event type and as an argument in the CreateEventInput input type. It can be passed as an argument to the createEvent mutation and returned as a field in the getEvent query.

Enums

GraphQL allows you to define enumerations types (short enums), a language feature to express the semantics of a type that has a fixed set of values. We could thus define a type called Weekday to represent all the days of a week:

```
enum Weekday {
  MONDAY
  TUESDAY
  WEDNESDAY
  THURSDAY
  FRIDAY
  SATURDAY
  SUNDAY
}
```

Interfaces

An interface can be used to describe a type in an abstract way. It allows you to specify a set of fields that any concrete type, which implements this interface, needs to have.

In many GraphQL schemas, every type is required to have an id field. Using interfaces, this requirement can be expressed by defining an interface with this field and then making sure that all custom types implement it:

```
interface Node {
   id: ID!
}
type User implements Node {
   id: ID!
   name: String!
   age: Int!
}
```

it is possible for an interface in a GraphQL schema to extend another interface, which means that it includes all of the fields defined on the other interface as well as any additional fields that are specific to the extending interface.

It is possible to implement multiple interfaces for a single type in GraphQL schema.

Here is an example of a type that implements two interfaces:

```
interface A {
   a: Int
}
interface B {
   b: String
}
type C implements A & B {
   a: Int
   b: String
}
```

In this example, the type C implements both the A and B interfaces. This means that C must have fields a and b, with the correct data types as defined in the interfaces.

Unions

Union types can be used to express that a type should be either of a collection of other types. They are best understood by means of an example. Let's consider the following types:

```
type Adult {
   name: String!
   work: String!
}
type Child {
   name: String!
   school: String!
}
```

Now, we could define a Person type to be the union of Adult and Child:

union Person=Adult|Child

A union type represents a set of object types that can be returned from a field. When you reference a union type in a concrete type, you can specify that the concrete type can be a member of the union. This is useful when you want to define a common set of fields that are shared across multiple object types.

It's important to note that a type that implements a union type must include all the fields of all the object types included in the union. In this case, the Pet type includes the name and breed fields, which are present in both Cat and Dog. This ensures that you can query the Pet type for all the fields that may be present in a Cat or a Dog object.

Here is an example of how you could define a union type and reference it in a concrete type:

```
union EmployeeType = Hourly | Salaried
type Hourly {
hourly_rate: Float
}
type Salaried {
annual_salary: Int
}
type Employee implements EmployeeType {
id: String!
name: String!
hourly_rate: Float
annual_salary: Int
}
```

It defines a union type EmployeeType with two member types Hourly and Salaried.

It also defines a Employee type that implements the EmployeeType union and has fields id, name, hourly_rate, and annual_salary.

The EmployeeType union allows you to specify that an Employee can be either an Hourly or a Salaried employee. The Employee type specifies that all employees have an id, a name, and either an hourly_rate (for Hourly employees) or an annual_salary (for Salaried employees).

Here is an example of a query and response using this schema:

Query:

```
{
  employees {
    _typename
    . . . on Hourly {
      hourlyRate
    }
    . . . on Salaried {
      annualSalary
    }
  }
}
Response:
{
  "data": {
    "employees": [
      {
        "_typename": "Hourly",
        "hourlyRate": 15.50
      },
      {
        "_typename": "Salaried",
        "annualSalary": 60000
      }
    ]
  }
}
```

In this example, the query asks for a list of employees and returns their type (using the _typename field) and either their hourlyRate (for Hourly employees) or their annualSalary (for Salaried employees). The response shows that there are two employees, one of type Hourly and one of type Salaried.

Inputs

An input type is a type that describes the structure and types of data that can be used as input for a GraphQL operation, such as a query or mutation. Input types are used to define the arguments that can be passed to a field when executing a GraphQL operation.

Input types are defined using the "input" keyword, followed by the name of the input type and a set of fields within curly braces. The fields within the input type define the structure and types of the input data that can be passed to the GraphQL operation.

Here is an example of an input type definition in GraphQL SDL:

```
input AddressInput {
  street: String
  city: String!
  state: String
  zip: String
}
```

In this example, the input type "AddressInput" defines four fields: "street", "city", "state", and "zip". The "street" and "city" fields are required and have a type of String, while the "state" and "zip" fields are optional and also have a type of String.

Input types can be used as arguments in field definitions within a GraphQL type. For example, the following GraphQL type has a field that takes an "AddressInput" as an argument:

```
type Customer {
  id: ID!
  name: String!
  address: AddressInput
}
```

In this example, the "address" field of the "Customer" type expects an input of type "AddressInput" to be passed as an argument when executing a GraphQL operation.

it is possible for an input to reference another input as a subobject or a list. Here is an example of how this can be done in a GraphQL schema:

```
input AddressInput {
  street: String!
  city: String!
  state: String!
  zip: String!
}
input CustomerInput {
  name: String!
  email: String!
  addresses: [AddressInput]
}
```

In this example, the CustomerInput input type includes a field called addresses that is a list of AddressInput objects. This allows a customer to have multiple addresses associated with their account.

Directives

Directives are used to modify the behavior of a field or operation. They are used to provide additional information about how a field or operation should be executed, such as whether a field should be included in the response based on certain conditions.

Directives can be specified in a GraphQL schema. In a GraphQL schema, directives are used to provide additional information about a field or operation and how it should be executed.

The built-in directives are:

- @deprecated: Indicates that a field or enum value is deprecated and should no longer be used.
- @include: Controls whether a field should be included in the response based on a runtime argument.
- @skip: Controls whether a field should be excluded from the response based on a runtime argument.

In addition to the built-in directives, it is also possible to define custom directives in a GraphQL schema. Custom directives allow you to specify additional behavior for fields or operations that is not provided by the built-in directives.

To specify a directive in a schema, you use the "directive" keyword, followed by the name of the directive and a list of arguments. Here is an example of a schema that defines a custom directive called "@upperCase" and uses it to indicate that a field should be returned in uppercase:

```
directive @upperCase on FIELD_DEFINITION
type User {
  id: ID!
  name: String
  email: String! @upperCase
}
```

In this example, the "email" field of the "User" type is marked with the "@upperCase" directive, which indicates that the field should be returned in uppercase.

To use the directive in a query, you simply include it in the field that you are querying, like this:

```
query {
    user(id: 1) {
    id
    name
    email
  }
}
```

When the query is executed, the server will apply the directive to the "email" field and return the field in uppercase.

It's important to note that directives are not executed by the GraphQL server itself, but rather by the code that implements the schema. The server will pass the directive along with the rest of the query to the code that handles the query, and it is up to that code to interpret and apply the directive as needed.

Directives include zero or more arguments, each argument being defined by a field and a datatype.

A directive argument is defined in the same way as a field argument, with a name and a type. Here's an example of a directive with multiple arguments:

```
directive @deprecated(
  reason: String = "No longer supported",
  since: String = "v1.0.0"
) on FIELD_DEFINITION | ENUM_VALUE
type Query {
  getUser(id: ID!): User @deprecated(reason: "Use getUsers instead")
  getUsers: [User]
}
enum Role {
  ADMIN @deprecated(reason: "Use SUPER_ADMIN instead",
  since: "v2.0.0")
  SUPER_ADMIN
  USER
}
```

In this example, the getUser field and the ADMIN value of the Role enum are both marked as deprecated using the @deprecated directive. The reason and since arguments are optional and can be customized for each usage of the directive.

The Directives are applicable to the following elements:

ARGUMENT_DEFINITION: applied to an argument definition within a field definition
ENUM: applied to an enum type definition
ENUM_VALUE: applied to an enum value definition
FIELD: applied to a field definition.
FIELD_DEFINITION: applied to a field definition within an object type definition
FRAGMENT_DEFINITION: applied to a fragment definition.
FRAGMENT_SPREAD: applied to a fragment spread
INLINE_FRAGMENT: applied to an inline fragment
INPUT_FIELD_DEFINITION: applied to an input field definition within an input object type definition
INPUT_OBJECT: applied to an input object type definition
INTERFACE: applied to an interface type definition.
MUTATION: applied to a mutation operation definition.
OBJECT: applied to an object type definition.
QUERY: applied to a query operation definition.
SCALAR: applied to a scalar type definition.
SCHEMA: applied to the schema definition
SUBSCRIPTION: applied to a subscription operation definition.
UNION: applied to a union type definition.
VARIABLE_DEFINITION: applied to a variable definition Directives can be combined with field arguments in a type definition, for example of a field definition with arguments and a directive applied to it:

```
type Query {
  user(id: ID!): User @isAuthenticated (permission: "ADMIN")
}
type User {
  id: ID!
  name: String!
  email: String!
  posts(limit: Int = 10, offset: Int = 0): [Post] @cacheControl
  (maxAge: 300)
}
```

In this example, the user field has an argument id, which is required (denoted by the ! after the type). The posts field has two optional arguments, limit and offset, with default values of 10 and 0, respectively. Both the user in the query and posts fields also have directives applied to them: isAuthenticated and cacheControl, respectively. The isAuthenticated directive has an argument permission, while the cacheControl directive has an argument maxAge.

Extensions

Schema extensions allow you to add additional fields and types to an existing schema. This can be useful when you want to extend the functionality of an existing schema without making breaking changes to the existing schema or the clients that depend on it.

To define a schema extension, you use the "extend" keyword followed by the type or field that you want to extend, and then define the additional fields or types as you would in a regular schema. Here is an example of a schema extension that adds a new field called "bio" to the "User" type:

```
extend type User {
  bio: String
}
```

In this example, the "bio" field is added to the "User" type and is of type "String." The "bio" field can then be queried just like any other field on the "User" type.

Here is an example of a GraphQL query that uses the "bio" field from the schema extension:

```
query {
  user(id: 1) {
    id
    name
    email
    bio
  }
}
```

And here is an example of the GraphQL response output for this query:

```
{
  "data": {
    "user": {
      "id": "1",
      "name": "John Smith",
      "email": "john@example.com",
      "bio": "I am a software developer
      and love to build things with code."
    }
  }
}
```

In this example, the query requests data for a user with the "id" of 1, including the "bio" field that was added through the schema extension.

To extend an interface in a GraphQL schema, you can use the "extend" keyword and specify the name of the interface you want to extend. Here is an example of a GraphQL schema that includes two interfaces, Node and Entity, with the Entity Interface extending the Node interface:

```
interface Node {
  id: ID!
  name: String!
}
interface Entity extends Node {
  createdAt: String!
  updatedAt: String!
}
type User implements Entity {
  id: ID!
  name: String!
  createdAt: String!
  updatedAt: String!
  email: String!
}
type Post implements Entity {
  id: ID!
  name: String!
  createdAt: String!
  updatedAt: String!
  title: String!
  body: String!
  author: User!
}
```

In this schema, the "Entity" interface extends the "Node" interface, which means that it includes all of the fields defined on the "Node" interface as well as two additional fields: "createdAt" and "updatedAt." The "User" and "Post" types both implement the "Entity" interface, which means that they include all of the fields defined on the "Node" and "Entity" interfaces.

Errors

{% hint style="info"%}

This section is for information only. It is not in the scope of a data modeling tool.

{% endhint %}

The errors payload is outside the GraphQL schema, meaning clients don't get any of the benefits of the GraphQL type system. That means errors are harder to consume but also harder to evolve.

It's helpful to divide errors into two very broad categories to understand what goes where:

Developer/Client Errors: Something went wrong during the query (Timeout, Rate Limited, Wrong ID Format, etc.). These are often errors that the developer of the client application needs to deal with.

User Errors: The user/client did something wrong (Trying to pay for a checkout twice, Email is already taken, etc.) these things are part of the functionality our API provides.

For user-facing errors that are part of our business/domain rules, the current best practice is to look at designing these errors as part of our schema rather than treating them as exceptions/query level errors.

approach is for payload types to include something like a userErrors field:

```
type SignUpPayload { userErrors: [UserError!]!
account: Account } type
UserError { # The error message message: String!
# Indicates which field cause the error, if any
#
# Field is an array that acts as a path to the error
#
# Example:
#
# ["accounts", "1", "email"]
#
field: [String!]
# An optional error code for clients to match on.
code: UserErrorCode
}
```

Something that makes errors as data a bit annoying, as compared to error mechanisms like status codes, is that clients don't have to query the userErrors field. This means that some clients might be getting a null account back, but have no idea why this happens. Part of the solution is educating clients on your APIs best practices, but there is no guarantee that clients will be aware of errors if they don't specifically include that field.

(End of GraphQL Schema Reference)

(End of "Example Embodiments with GraphQL-Detailed Description")

The invention claimed is:

1. A method for constructing a database schema model by a user by means of a computer, comprising steps of:

(a) providing a set of collections and optionally one or more relationships linking at least two collections of said set of collections, each collection of said set of collections being associated with a schema definition displayed by a respective single entity box on an entity relationship diagram on a graphical interface on said computer, and each collection comprising at least one object and/or one field;

(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;

(c) automatically generating by means of said computer said schema model for a database or Application Programming Interface;

wherein at least one collection of said of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer, wherein the at least one collection being displayed by the single entity box that comprises the nested object is associated with a single JavaScript Object Notation JSON) document or Binary JSON (BSON) document;

wherein said database schema model is formatted according to any format or combination of formats selected from: JavaScript Object Notation (JSON) Schema, Binary JSON (BSON), YAML Ain't Markup Language (YAML), Mongoose, RESTful API Modeling Language (RAML), Swagger, Apache AVRO, Parquet; and wherein a sequence among said lower level nodes fields in the nested object is identical to a sequence of corresponding fields in the single JSON document or Binary JSON document.

2. The method according to claim 1, wherein a tree diagram that corresponds to said set of collections is displayed on said graphical user interface on said computer, said tree diagram having two levels or more in view of said set of collections comprising a nested object, and wherein said schema definition is editable via said tree diagram on said graphical user interface.

3. The method according to the claim 1, wherein said set of collections comprises at least two collections;

wherein the step (b) comprises generating and/or editing one or more relationships linking at least two collections belonging to said set of collections via said entity relationship diagram on said graphical user interface on said computer; and in the step (b) at least one of said one or more relationships links a first field belonging to a first collection, the first collection belonging to said set of collections to a second field, the second field belonging to a second collection belonging to said set of collections.

4. The method according to claim 1, wherein said schema definition is a "JavaScript Object Notation" (JSON) schema definition.

5. The method according to claim 1, wherein said one or more objects comprise an array and/or a sub-document.

6. The method according to claim 3, wherein said at least one of said one or more relationships is a foreign key relationship; and/or said first collection and said second collection are linked by more than one relationship generated and/or edited in step (b); and/or said first field belonging to said first collection is linked to both said second field and a third field belonging to said second collection by a first and second relationships, respectively.

7. The method according to claim 1, wherein said automatic generation in step (c) automatically generates a human-readable manual for said database schema model based at least partly on a logical link defined by said one or more relationships.

8. The method according to claim 1, wherein said providing in step (a) comprises generating one or more of said set of collections on said graphical user interface on said computer.

9. The method according to claim 1, wherein said providing in step (a) comprises denormalizing a relational database schema model provided by the user, said denormalizing comprising extracting said set of collections from a set of tables belonging to said relational database schema model, as well as any foreign key relationships belonging to said relational database schema model, for inclusion in said database schema model.

10. The method according to claim 9, wherein said denormalizing in step (a) further comprises processing a foreign key relationship between a parent collection comprising a primary key and a child collection comprising a foreign key, said processing comprising any or any combination of following: including a nested sub-document in said child collection, said nested sub-document comprising one or more relationships to said parent collection; including a nested array in said parent collection, said nested array comprising one or more relationships to said child collection.

11. The method according to claim 10, wherein said processing of a foreign key relationship comprises selecting one or more denormalization preferences on said graphical user interface on said computer, said denormalization preferences comprising any or any combination of following: a table selection; an embedding preference with respect to said including of said nested sub-document in said child collection and/or of said nested array in said parent collection; a maximum number of cascading levels, a maximum number of recursion levels.

12. A computer system for constructing a database schema model upon input of a user, said computer system comprising a processor, non-volatile memory, program code present on said non-volatile memory for execution on said processor, a graphical interface, wherein a computer is configured to carry out steps of:

(a) providing a set of collections and optionally one or more relationships linking at least two collections of said set of collection, each collection of said set of collections being associated with a schema definition displayed by a respective single entity box on an entity relationship diagram on a graphical interface on said computer, and each collection comprising at least one object and/or one field;

(b) editing one or more collections of said set of collections by means of said graphical user interface, each collection of the one or more collections associated with the schema definition displayed by the single entity box on the entity relationship diagram on the graphical interface on said computer and comprising the at least one object and/or one field;

(c) automatically generating by means of said computer said schema model for a database or Application Programming Interface;

wherein at least one collection of said set of collections comprises a nested object comprising lower level nodes, each lower level node of said lower level nodes being displayed on said graphical user interface in the single entity box of the collection that comprises said nested object, wherein lower level nodes fields belonging to the nested object are displayed indented, said indentation being defined within the respective single entity box in the entity-relationship diagram on the graphical interface on said computer;

wherein the at least one collection being displayed by the single entity box that comprises the nested object is associated with a single JavaScript Object Notation (JSON) document or Binary JSON (BSON) document;

wherein said database schema model is formatted according to any format or combination of formats selected from: JavaScript Object Notation (JSON) Schema, Binary JSON (BSON), YAML Ain't Markup Language (YAML), Mongoose, RESTful API Modeling Language (RAML), Swagger, Apache, AVRO, Parquet; and wherein a sequence among said fields in the nested object is identical to a sequence of corresponding fields in the single JSON document or Binary JSON document.

* * * * *